(12) United States Patent
Menon et al.

(10) Patent No.: US 12,238,155 B2
(45) Date of Patent: Feb. 25, 2025

(54) METHOD AND SYSTEM FOR DELIVERING REAL-TIME CONTENT USING BROADCASTING AND UNICASTING

(71) Applicant: Siden, Inc., New York, NY (US)

(72) Inventors: Narayan Parappil Menon, Syosset, NY (US); Boris Bogatin, Glenside, PA (US); Ankur Verma, San Diego, CA (US)

(73) Assignee: Siden, Inc., New York, NY (US)

( * ) Notice: Subject to any disclaimer, the term of this patent is extended or adjusted under 35 U.S.C. 154(b) by 0 days.

(21) Appl. No.: 17/741,301

(22) Filed: May 10, 2022

(65) Prior Publication Data
US 2022/0368747 A1   Nov. 17, 2022

Related U.S. Application Data

(63) Continuation-in-part of application No. 17/580,817, filed on Jan. 21, 2022, and a continuation-in-part of application No. 17/353,989, filed on Jun. 22, 2021.
(Continued)

(51) Int. Cl.
H04L 65/611 (2022.01)
H04L 65/80 (2022.01)

(52) U.S. Cl.
CPC .......... *H04L 65/611* (2022.05); *H04L 65/80* (2013.01)

(58) Field of Classification Search
CPC .............................. H04L 65/611; H04L 65/80
See application file for complete search history.

(56) References Cited

U.S. PATENT DOCUMENTS

| 5,652,759 A | 7/1997 | Stringfellow, Jr. |
| 9,456,247 B1 | 9/2016 | Pontual et al. |

(Continued)

FOREIGN PATENT DOCUMENTS

| CN | 1984118 A | 6/2007 |
| CN | 105391516 A | 3/2016 |

(Continued)

OTHER PUBLICATIONS

International Search Report and Written Opinion dated Aug. 1, 2022 in corresponding PCT Application No. PCT/US2022/028725.
(Continued)

*Primary Examiner* — Joshua D Taylor
(74) *Attorney, Agent, or Firm* — Harness, Dickey & Pierce, P.L.C.

(57) ABSTRACT

A method and system of broadcasting includes determining an identified content for a broadcast to a broadcast group that may include a plurality of devices in a service area. The method also includes determining a priority for the identified content for the plurality of devices, determining radio conditions for each of the plurality of devices in the service area; and determining an available network capacity of a network for broadcasting in the service area; determining a spectral efficiency for the broadcast to achieve a performance target, said. The method also includes performance target based on the priority for the identified content, the radio conditions and the available network capacity. The method also includes broadcasting the identified content to the plurality of devices in the service area based on the spectral efficiency for the broadcast.

69 Claims, 24 Drawing Sheets

Related U.S. Application Data

(60) Provisional application No. 63/187,186, filed on May 11, 2021.

(56) References Cited

U.S. PATENT DOCUMENTS

| | | | |
|---|---|---|---|
| 10,433,022 | B2 | 10/2019 | Norin et al. |
| 2004/0064325 | A1 | 4/2004 | Syed et al. |
| 2005/0120380 | A1* | 6/2005 | Wolfe ................ H04N 21/4126 725/62 |
| 2007/0002871 | A1 | 1/2007 | Pekonen et al. |
| 2007/0094023 | A1 | 4/2007 | Gallino et al. |
| 2007/0179854 | A1* | 8/2007 | Ziv ........................ G06Q 30/02 705/14.27 |
| 2008/0167943 | A1* | 7/2008 | O'Neil ................... G06Q 30/08 705/7.29 |
| 2008/0244657 | A1 | 10/2008 | Arsenault et al. |
| 2008/0273591 | A1 | 11/2008 | Brooks et al. |
| 2009/0040957 | A1 | 2/2009 | Anschutz |
| 2009/0109937 | A1* | 4/2009 | Cave ................ H04W 74/0866 370/336 |
| 2010/0023972 | A1 | 1/2010 | Summers et al. |
| 2010/0082561 | A1* | 4/2010 | Rauber ................ G06F 16/435 707/E17.001 |
| 2011/0044227 | A1 | 2/2011 | Harrang et al. |
| 2011/0059706 | A1 | 3/2011 | Harel et al. |
| 2013/0066936 | A1 | 3/2013 | Krishnan et al. |
| 2013/0254815 | A1 | 9/2013 | Pfeffer et al. |
| 2014/0334318 | A1 | 11/2014 | Pica et al. |
| 2015/0040162 | A1* | 2/2015 | Kotecha ............. H04N 21/6582 725/44 |
| 2015/0074285 | A1* | 3/2015 | Gahm ..................... H04L 47/11 709/231 |
| 2016/0028448 | A1 | 1/2016 | Park et al. |
| 2016/0080446 | A1* | 3/2016 | Karthikeyan ...... H04N 21/2408 709/219 |
| 2016/0087752 | A1* | 3/2016 | Xia ....................... H04L 1/0026 370/329 |
| 2016/0360255 | A1 | 12/2016 | Pontual et al. |
| 2018/0138958 | A1 | 5/2018 | Asplund et al. |
| 2018/0139508 | A1* | 5/2018 | Norin ................ H04N 21/2365 |
| 2019/0223029 | A1 | 7/2019 | Clarke et al. |
| 2019/0273801 | A1 | 9/2019 | Luft |
| 2019/0335342 | A1* | 10/2019 | Jacinto .................. H04W 24/02 |
| 2020/0037035 | A1* | 1/2020 | Kaufman ............. H04N 21/252 |
| 2020/0107386 | A1* | 4/2020 | Van Phan ......... H04W 28/0215 |
| 2020/0195745 | A1 | 6/2020 | Demsey |
| 2020/0243985 | A1 | 7/2020 | Petersson et al. |
| 2020/0296155 | A1 | 9/2020 | McGrath et al. |
| 2020/0328804 | A1 | 10/2020 | Xu et al. |
| 2020/0358646 | A1 | 11/2020 | Lincoln et al. |
| 2020/0374713 | A1 | 11/2020 | Bogatin et al. |
| 2021/0067814 | A1 | 3/2021 | Bogatin et al. |
| 2021/0098873 | A1 | 4/2021 | Veysoglu et al. |
| 2021/0099749 | A1 | 4/2021 | Bogatin et al. |
| 2021/0127167 | A1 | 4/2021 | Kaufman et al. |

FOREIGN PATENT DOCUMENTS

| | | | |
|---|---|---|---|
| EP | 1030465 | A1 | 8/2000 |
| EP | 3456083 | B1 | 3/2020 |
| JP | 2001-313599 | A | 11/2001 |
| JP | 2002-152153 | A | 5/2002 |
| JP | 2003-169363 | A | 6/2003 |
| JP | 2010-027004 | A | 2/2010 |
| JP | 2015-532033 | A | 11/2015 |
| KR | 2011-0093993 | A | 8/2011 |
| WO | WO-03058967 | A1 | 7/2003 |
| WO | WO-2011/139305 | A1 | 11/2011 |
| WO | WO-2013103828 | A1 | 7/2013 |
| WO | WO-2018/001897 | A1 | 1/2018 |

OTHER PUBLICATIONS

Symeon Chatzinotas et al., "Cellular-Broadcast Service Convergence through Caching for CoMP Cloud RANs", Arxiv. Org, Cornell University Library, 201 Olin Library Cornell University Ithaca, NY 14853, Apr. 30, 2015.

International Search Report and Written Opinion dated Aug. 19, 2022 in corresponding PCT Application No. PCT/US2022/031517.

Chinese Office Action dated Apr. 3, 2020 in corresponding Chinese Application No. 2017800705362.

Datami website; http://www.datami.com/; 9 pages.

International Search Report and Written Opinion dated Mar. 21, 2022 in corresponding PCT Application No. PCT/US2021/053154.

International Search Report and Written Opinion dated Jul. 17, 2020 in corresponding PCT/US2020/034247.

International Search Report and Written Opinion dated Dec. 9, 2020 in corresponding PCT Application No. PCT/US2020/053313.

International Search Report and Written Opinion dated Apr. 21, 2022 in corresponding PCT Application No. PCT/US2022/013293.

International Search Report and Written Opinion mailed Jun. 21, 2022, in corresponding International Application No. PCT/US2022/021306.

International Search Report dated Feb. 3, 2022 in corresponding PCT Application No. PCT/2021/055714.

Interntional Search Report dated Oct. 21, 2021 in corresponding PCT Application No. PCT/US2021/041116.

Japanese Office Action dated Dec. 1, 2020 in corresponding Japanese Application No. 2019-547232.

Non-Final Office Action regarding U.S. Appl. No. 15/811,958 dated Oct. 10, 2018.

Notice of Allowance regarding U.S. Appl. No. 15/811,958 dated May 22, 2019.

Partial International Search Report for corresponding PCT/US2017/061760, Mar. 20, 2018, 13 pages.

Pixeom website; https://pixeom.com/; 10 pages.

Requirement for Restriction Election regarding U.S. Appl. No. 15/811,958 dated Jun. 7, 2018.

Yao Jingjing et al., "On Mobile Edge Caching", IEEE Communications Surveys & Tutorials, vol. 21, No. 3, Mar. 29, 2019, pp. 2525-2553.

International Search Report dated Nov. 4, 2022 in corresponding PCT Application No. PCT/US2022/037896.

International Search Report and Written Opinion dated Mar. 14, 2023 in corresponding PCT Application No. PCT/US2022/046640.

* cited by examiner

METHOD AND SYSTEM FOR DELIVERING REAL-TIME CONTENT USING BROADCASTING AND UNICASTING

RELATED APPLICATIONS

This application is a continuation-in-part of Ser. No. 17/353,989 filed of Jun. 22, 2021 (1-CPE) and a continuation in part of Ser. No. 17/580,817 filed on Jan. 21, 2022, the disclosures of which are incorporated by reference herein. This application is a non-provisional of U.S. Application 63/187,186 filed on May 11, 2021, the disclosure of which is incorporated by reference herein. This application incorporates by reference herein the entire disclosures of U.S. application Ser. No. 17/580,817, filed Jan. 21, 2022, U.S. Ser. No. 17/700,436, filed Mar. 21,2022, U.S. provisional Ser. No. 63/051,582, filed on Jul. 14, 2020, U.S. Ser. No. 63/050,699, filed on Jul. 10, 2020, U.S. Ser. No. 17/095,686, filed on Nov. 11, 2020, U.S. Ser. No. 16/588,763, filed Sep. 30, 2019, U.S. Pat. No. 10,433,22 and U.S. Ser. No. 17/353, 989, filed Jun. 22, 2021, Ser. No. 17/580,817, filed Jan. 21, 2022.

TECHNICAL FIELD

The present disclosure relates generally to content distribution systems and, more specifically, to a method and system for strategically determining using radio quality metrics for determining how to communicate data through a communication system.

BACKGROUND

The statements in this section merely provide background information related to the present disclosure and may not constitute prior art.

The provisioning of increasingly higher speed wireless data connectivity has been the focus of wireless carrier infrastructure growth for several decades and has accelerated with the rapidly rising demand by consumers to stream video to each or any of their devices, irrespective of where they are. The increasing wireless performance, together with both users' desires to consume more bandwidth intensive video content over the Internet, at lower marginal cost per bit, and wireless providers desire to serve more of the users' demands including in the home and also to large screen devices (i.e. TVs, laptops), is placing a requirement on wireless networks to accommodate a markedly higher level of capacity for handling this exploding video data traffic demand over wireless networks.

Cellular wireless networks have traditionally employed unicast delivery schemes to enable content to reach users. With unicast delivery, a set of radio and network resources is allocated to each stream of content being delivered to a user. If several users happen to be consuming the same content simultaneously, a unicast delivery scheme requires a multiplicity of such radio and network resources to be assigned, to enable delivery to the multiplicity of users.

The unicast transmissions occupy spectrum resources which are, at that point in time, not used to serve other users, except if they are reusable on parallel antenna paths, beams, sectors, or geographies. Furthermore, the content requested by the select users varies in its content relevance to other users in the same geographies. Sometimes the same exact content as other users want to watch is unicasted at that very time. Sometimes the same exact content as other users want to watch at a different time is requested and unicasted. Sometimes somewhat less relevant content is communicated to other users.

Given the never-ending scarcity of radio resources in wireless networks, unicast can become a sub-optimal, inefficient way to deliver content to users. Hence, cellular networks introduced broadcast as a means to deliver simultaneously consumed content more efficiently. 3GPP introduced, starting with the 3G (UMTS) architecture and evolving into LTE, broadcast capability—termed as (Multimedia Broadcast Multicast Services) MBMS. MBMS introduced a new sub-architecture and several new functional components to enable broadcast delivery, using a single set of radio and network resources to deliver a stream of content to a multiplicity of users. This is evolving into a multicast/broadcast standard in 5G, referred to as 5G Multicast Broadcast Service (5G MBS).

One of the limitations that cellular broadcast solutions suffer from is that it works on a "least common denominator" principle, in that, it typically leverages a lower radio spectral efficiency level (measured in bits per second per hertz, or bps/Hz) that caters to the poorer-covered users. The idea behind this has been to maximize broadcast coverage. Operating at higher spectral efficiency levels would, of course, afford a radio-advantaged user a higher throughput; but this would provide little or no broadcast coverage to radio-disadvantaged users, i.e., with devices experiencing lower signal interference and noise ratio (SINR) conditions than needed to receive the broadcast successfully.

At the same time, in today's broadcast, no performance feedback is obtained from participating devices. Hence, the broadcast system is unable to adjust spectral efficiency, e.g., gauge that the participating devices are predominantly in strong radio conditions, and hence be able to increase spectral efficiency.

Operating broadcast in a fixed manner at such a "disadvantaged" spectral efficiency means every participant gets a low throughput. In particular, the radio-advantaged users can get sub-optimal performance. For a real-time content stream (e.g., live streaming of an event or streaming of stored video), this would necessitate delivering at a lower bitrate than ideal—which would mean a lower-quality user experience (the service may be forced to choose a lower bitrate version of the content to stream). For a non-real-time application (e.g., audio/video download, feed etc.), this would mean a longer time taken to deliver the file(s).

The other "gap" in the way content is distributed over broadcast today lies in the fact content distribution networks do not provide any material integration with wireless broadcast systems. CDNs today operate "over-the-top" with no insight into the state of the radio network, the use of radio resources, or efforts to optimize the use of spectral resources. This results in an inability to select the appropriate target throughputs (i.e., tendency to under-achieve or over-target throughputs), or to adjust content delivery parameters to optimally cater to network conditions and to the receiving users' radio reception conditions.

Content distribution schemes do not factor in radio conditions feedback and are unable to adjust broadcasts to "suit the audience", e.g., adjust spectral efficiency levels—or even control which users/devices have strong enough radio conditions to justify being included in a broadcast. In fact, content distribution schemes are generally not aware of underlying broadcast networks being used, and do not provide any specific integration with them.

SUMMARY

The present disclosure provides a method for broadcasting content to user devices taking into consideration the radio network state determine which resources are to be used in delivering content.

At a high level broadcast networks are employed to efficiently communicate content to from content distribution systems by enabling a radio-optimized, broadcast-cognizant application of content distribution, and content distribution aware selection of broadcast transmission parameters to facilitate a cohesive, holistic blending of content distribution and radio layers.

In the system the selection of optimal broadcast spectral efficiency parameters, may be based on cognizance of the radio conditions experienced by the target device population.

Radio and broadcast network awareness may be applied to adjust target throughputs and other broadcast parameters. The radio and broadcast network awareness may adjust content distribution parameters including selection of users and content assets to include in broadcast sessions. Content cognizance may be used to select the optimal radio distribution parameters. Feedback from smart devices may be used to make the right radio distribution choices such as selecting unicast or broadcast distribution and selecting distribution parameters such as target throughputs. Prior broadcast success rate statistics may be used determine which devices are likely to receive a broadcast, and to adjust content distribution parameters including selection of content assets to include in the broadcast session. A target broadcast session may be subdivided into multiple mini-sessions to improve broadcast robustness and delivery effectiveness and yield. Subdividing larger content assets into smaller files or "chunks" may be used to improve broadcast robustness—delivery effectiveness and yield to lower delivery error rates. Mechanisms may be used to monitor effectiveness and yield obtained from a broadcast session and to recover from errors detected on broadcast sessions. An over-the-top (above the radio and IP layers) protocol may be used to orchestrate and manage content distribution over the radio network.

The above-mentioned functions may be applied to both broadcast and multicast scenarios. Further the above-mentioned functions may be applied to real-time delivery (e.g., streaming, live events) and to non-real-time distribution (e.g., pre-positioning/caching of content or downloads). "Over-the-top", i.e., at the content distribution layer, which works above the IP layer in contrast to the more transport-layer schemes adopted by wireless networks, enables the system to be cognizant of the specific assets being distributed, the application and content level popularity, and usage and delivery success characteristics. Such systems are far more aware of aspects like the assets it is delivering, device consumption patterns with response to these assets, asset popularity levels and the like, which is far more than traditional broadcast functionalities that sit at the transport layer and are simply purveyors of this content.

By gathering performance feedback from devices, this system is further able to adjust its decisions on delivery mode to be used (broadcast vs. unicast). For example, the broadcast mode may be enabled if the distribution system determines there are sufficient participating devices experiencing radio conditions better than a defined threshold. Additional users can be pulled into the broadcast segment of an ongoing transmission if those devices exhibit radio conditions better than the defined threshold. In this manner, the system always selects the most spectrally efficient mode of delivery. When broadcast is used, the system adjusts transmission parameters to optimize the spectral efficiency and delivery success of the broadcast session.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect is a method of broadcasting that includes determining an identified content for a broadcast to a broadcast group that may include a plurality of devices in a service area. The method also includes determining a priority for the identified content for the plurality of devices, determining radio conditions for each of the plurality of devices in the service area; and determining an available network capacity of a network for broadcasting in the service area; determining a spectral efficiency for the broadcast to achieve a performance target, said. The method also includes performance target based on the priority for the identified content, the radio conditions and the available network capacity. The method also includes broadcasting the identified content to the plurality of devices in the service area based on the spectral efficiency for the broadcast. Other embodiments of this aspect include corresponding computer systems, apparatus, and computer programs recorded on one or more computer storage devices; each is configured to perform the actions of the methods.

Implementations may include one or more of the following features. The method may include determining a target throughput from the spectral efficiency and wherein broadcasting may include broadcasting the identified content to the plurality of devices in the service area based on the spectral efficiency corresponding to the target throughput. Broadcasting the identified content may include broadcasting the identified content based on the target throughput. The method may include determining the performance target by determining a maximized population coverage across the plurality of devices in the service area. The method may include determining the performance target by determining a maximized population coverage across the plurality of devices with the priority for the identified content above a priority threshold, determining the priority for the identified content is based on at least one of a wishlist or a content device indicator, determining the priority is based on at least one of content popularity, a likelihood of content consumption, content popularity profiles, viewing patterns of the plurality of devices in the service area and similarities to other viewers, determining the available network capacity may include determining dormant capacity and where broadcasting may include broadcasting the identified content using the dormant capacity of the network, determining the available network capacity may include determining dormant capacity available for broadcasting and where broadcasting may include broadcasting the identified content using the dormant capacity of the network. The method may include communicating performance feedback from the plurality of devices to a content distribution system and broadcasting the identified content using an alternate spectral efficiency for the broadcast based on the performance feedback. When the performance feedback is above a performance threshold, increasing the spectral efficiency to a second spectral efficiency greater than the spectral efficiency. When the performance feedback is less than the performance threshold, decreasing the spectral efficiency to a third spectral efficiency less than the spectral efficiency. The method includes broadcasting a second content to the plurality of devices in the service area using the second spectral efficiency or the third spectral efficiency, determining the spectral efficiency may include determining a modulation scheme and a coding scheme for the broadcast. Determining the available network capacity may include determining the available network capacity based on a quality of service by determining, by the network, a total capacity of the network and subtracting a high quality of service network allocation and may include allocating a lower quality of service network allocation to broadcasting to at least a portion of the available network capacity. The method may include forming the broadcast group from a plurality of intermediate devices, a first intermediate device of the plurality of intermediate devices associated with a first user device communicating content therethrough for real-time consumption and a second intermediate device of the plurality of intermediate devices storing the identified content and communicating the identified content to a second user device for non-real-time consumption at a future time after the identified content is stored in second intermediate device. The method may include forming the broadcast group from a plurality of user devices. Determining radio conditions for each of the plurality of devices in the service area may include determining at least one of a signal-to-noise ratio, a signal-interference-and-noise ratio and a channel quality indicator. Broadcasting the identified content may include establishing a plurality of broadcast sessions for portions of the identified content and broadcasting the identified content using the broadcast sessions. Broadcasting the identified content using the broadcast sessions may include broadcasting the identified content using the broadcast sessions comprises ensuring that at least portions of the identified content may be received successfully rather than an entire content not being received. Broadcasting the identified content may include communicating the identified content using broadcast sessions based on the target throughput. Establishing the plurality of broadcast sessions may include establishing at least one broadcast session based on the available network capacity. The method may include determining a first session of the plurality of broadcast sessions is missing at a first device of a plurality of devices and transmitting the first session to the first device. Broadcasting the identified content may include dividing the identified content into a plurality of chunks and broadcasting the chunks to the plurality of devices. The method may include determining a missing chunk at a device of the plurality of devices and requesting the missing chunk using a chunk identifier. The method may include unicasting the missing chunk to the device. The method may include determining a missing chunk at at least some of the plurality of the devices and requesting the missing chunk using a chunk identifier. The method may include broadcasting the missing chunk to the at least some of the devices. Requesting a missing chunk may include requesting the missing chunk using an over-the-top protocol between devices and a content distribution system. Broadcasting the identified content may include broadcasting a livestream for real-time consumption. Broadcasting the identified content may include broadcasting a livestream for real-time consumption by user devices and storing the livestream for non-real-time consumption in a future. Broadcasting the identified content may include multicasting the identified content. For each cell of a plurality of cells of the service area of a first network, receiving a capacity usage report from the cell; determining an available cell capacity of the cell based on the capacity usage report; determining a target available capacity utilization goal of the cell based on the available cell capacity; determining an overall target available capacity utilization goal of the plurality of cells in the service area of the first network, based on the target available capacity utilization goal of each cell of the plurality of cells of the service area; may include determining a target throughput for communicating the identified content based on the spectral efficiency and the overall target available capacity utilization goal of the plurality of cells; and where broadcasting the identified content may include broadcasting the identified content to the plurality of devices in the service area based on the target throughput. The overall target available capacity utilization goal is an average target available capacity determined across all cells in the service area or a minimum target available capacity determined across all cells in the service area. Broadcasting the identified content may include establishing a plurality of broadcast sessions for portions of the identified content and broadcasting the identified content using the broadcast sessions. The method may include communicating performance feedback by determining at least one of a percentage of devices receiving the identified content and percentage of a target throughput achieved across the plurality of cells of the service area during the broadcast. The method may include changing the overall target available capacity utilization goal to a second overall target available capacity utilization goal different from the overall target available capacity utilization goal based on the performance feedback, to match an achieved capacity utilization across the plurality of cells of the service area during the broadcast; and broadcasting a second content to the plurality of devices in the service area using the second overall target available capacity utilization goal. Broadcasting may include broadcasting the identified content using an alternate number of broadcast sessions to achieve the second overall target available capacity utilization goal. Broadcasting may include broadcasting the identified content to the plurality of devices based on selected modulation and coding scheme. Broadcasting the identified content may include broadcasting the identified content based on the target throughput. The performance target may include a maximized throughput across the plurality of devices in the service area. The performance target may include a maximized population coverage across the plurality of devices with a priority for the identified content above a priority threshold. Determining the priority for the identified content for the plurality of devices may include aggregating the priority for each of a plurality of identified content for each device to form a processed user list; identifying from the processed user list, priority devices with aggregate priority greater than a priority threshold; determining radio conditions of the priority devices; identifying a weakest radio condition from the radio conditions corresponding to a weakest device; and determining a target spectral efficiency for the weakest device based on the weakest radio condition; determining broadcast capacity available for broadcasting the identified content; for each cell of a plurality of cells of the service area of a first network, receiving a capacity usage report from the cell; determining an available cell capacity of the cell based on the capacity usage report; determining a target available capacity utilization goal of the cell based on the available cell capacity; determining an overall target available capacity utilization goal of the cells in the service area of the first network, based on a target capacity utilization goal of cells of the service area; determining a target throughput for the broadcast based on the target spectral efficiency and overall target available capacity utilization goal; and where broadcasting the identified content may include broadcasting the identified content based on the target throughput. Determining the priority for the identified content is based on at least one of a wishlist or a content device indicator. Determining the priority is based on at least one of content popularity, a likelihood of content consumption, content popularity profiles, viewing patterns of the plurality of devices in the service area and similarities to other viewers. Broadcasting may include broadcasting the selected content to the plurality of devices. The method may include: determining a broadcast content list may include a plurality of identified content; determining a target spectral efficiency for the broadcast; forming a modified device list for devices successfully receiving broadcasted content, different from the devices in the potential device list; modifying the broadcast content list to a different content list based on the modified device list; and broadcasting the identified content in the different content list to devices in the modified device list. The modified device list is less than a number of devices in the service area. Implementations of the described techniques may include hardware, a method or process, or computer software on a computer-accessible medium.

One general aspect includes a system for broadcasting. The system also includes a content distribution system programmed to determine an identified content for a broadcast to a broadcast group may include a plurality of devices in a service area. The system also includes the content distribution system programmed to determine a priority for the identified content for the plurality of devices, the content distribution system programmed to determine radio conditions for each of the plurality of devices in the service area; and the content distribution system programmed to determine an available network capacity of a network for broadcasting in the service area; the content distribution system programmed to determine a spectral efficiency for the broadcast to achieve a performance target, said performance target based on the priority for the identified content, the radio conditions and the available network capacity. The system also includes the content distribution system programmed to broadcast the identified content to the plurality of devices in the service area based on the spectral efficiency for the broadcast. Other embodiments of this aspect include corresponding computer systems, apparatus, and computer programs recorded on one or more computer storage devices, each configured to perform the actions of the methods.

Implementations may include one or more of the following features. The system where the content distribution system is programmed to determine a target throughput from the spectral efficiency and where the content distribution system is programmed to broadcast the identified content to the plurality of devices in the service area based on the spectral efficiency corresponding to the target throughput. The content distribution system is programmed to communicate the target throughput to a network controller and where the content distribution system is programmed to broadcast the identified content based on the target throughput. The performance target may include a maximized population coverage across the plurality of devices in the service area. The performance target may include a maximized population coverage across the plurality of devices with the priority for the identified content above a priority threshold. The priority for the identified content is based on at least one of a wishlist or a content device indicator. The priority is based on at least one of content popularity, a likelihood of content consumption, content popularity profiles, viewing patterns of the plurality of devices in the service area and similarities to other viewers. The available network capacity may include dormant capacity and where the content distribution system is programmed to broadcast the identified content using the dormant capacity of the network. The available network capacity may include dormant capacity available for broadcasting and where the content distribution system is programmed to broadcast the identified content using the dormant capacity of the network. The plurality of devices communicate performance feedback from the plurality of devices to the content distribution system and where the content distribution system is programmed to broadcast the identified content using an alternate spectral efficiency for the broadcast based on the performance feedback, where the content distribution system is programmed to increase the spectral efficiency to a second spectral efficiency greater than the spectral efficiency when the performance feedback is above a performance threshold, where the content distribution system is programmed to decrease the spectral efficiency to a third spectral efficiency less than the spectral efficiency when the performance feedback is less than the performance threshold, and where the content distribution system is programmed to determine broadcast a second content to the plurality of devices in the service area using the second spectral efficiency or the third spectral efficiency. The content distribution system is programmed to determine the spectral efficiency by determining a modulation scheme and a coding scheme for the broadcast. The content distribution system is programmed to determine the available network capacity based on a quality of service by determining a total capacity of the network and subtracting a high quality of service network allocation, and where the content distribution system is programmed to allocate a lower quality of service network allocation to broadcasting to at least a portion of the available network capacity. The content distribution system is programmed to form the broadcast group from a plurality of intermediate devices, a first intermediate device of the plurality of intermediate devices associated with a first user device communicating content therethrough for real-time consumption and a second intermediate device of the plurality of intermediate devices storing the identified content and communicating the identified content to a second user device for non-real-time consumption at a future time after the identified content is stored in second intermediate device. The broadcast group may include a plurality of user devices. The radio conditions at least one of a signal-to-noise ratio, a signal-interference-and-noise ratio and a channel quality indicator. The content distribution system is programmed to broadcast the identified content by establishing a plurality of broadcast sessions for portions of the identified content and broadcasting the identified content using the broadcast sessions. The content distribution system is programmed to broadcast the identified content using the broadcast sessions by broadcasting the identified content using the broadcast sessions comprises ensuring that at least portions of the identified content may be received successfully rather than an entire content not being received. The content distribution system is programmed to determine a target throughput based on the spectral efficiency, communicate the target throughput to a network controller and broadcast the identified content may include by communicating the identified content using broadcast sessions based on the target throughput. The content distribution system is programmed to establish the plurality of broadcast sessions by establishing at least one broadcast session based on the available network capacity. The content distribution system is programmed to determine a first session of the plurality of broadcast sessions is missing at a first device of a plurality of devices and transmit the first session to the first device. The content distribution system is programmed to broadcast the identified content by dividing the identified content into a plurality of chunks and broadcasting the chunks to the plurality of devices. The content distribution system is programmed to determine a missing chunk at a device of the plurality of devices and request the missing chunk using a chunk identifier. The content distribution system is programmed to unicast the missing chunk to the device. The content distribution system is programmed to determine a missing chunk at at least some of the plurality of the devices and request the missing chunk using a chunk identifier. The content distribution system is programmed to determine broadcast the missing chunk to the at least some of the devices. The content distribution system is programmed to request the missing chunk using an over-the-top protocol between devices and a content distribution system. The content distribution system is programmed to broadcast the identified content may include broadcasting a livestream for real-time consumption. The content distribution system is programmed to broadcast the identified content by a livestream and where a portion of the plurality of devices consume the livestream in real-time and where a second portion of the plurality of device store the livestream for non-real-time consumption in a future. The content distribution system is programmed to determine multicast the identified content. For each cell of a plurality of cells of the service area of a first network, where the content distribution system is programmed to receive a capacity usage report from the cell; determine an available cell capacity of the cell based on the capacity usage report; and determine a target available capacity utilization goal of the cell based on the available cell capacity; where the content distribution system is programmed to determine an overall target available capacity utilization goal of the plurality of cells in the service area of the first network, based on the target available capacity utilization goal of each cell of the plurality of cells of the service area; where the content distribution system is programmed to determine a target throughput for communicating the identified content based on the spectral efficiency and the overall target available capacity utilization goal of the plurality of cells; and where the content distribution system is programmed to broadcast the identified content to the plurality of devices in the service area based on the target throughput. The overall target available capacity utilization goal is an average target available capacity determined across all cells in the service area or a minimum target available capacity determined across all cells in the service area. The content distribution system is programmed to establish a plurality of broadcast sessions for portions of the identified content and broadcast the identified content using the broadcast sessions. The content distribution system is programmed to determine performance feedback by determining at least one of a percentage of devices receiving the identified content and percentage of a target throughput achieved across the plurality of cells of the service area during the broadcast. The content distribution system is programmed to change the overall target available capacity utilization goal to a second overall target available capacity utilization goal different from the overall target available capacity utilization goal based on the performance feedback, to match an achieved capacity utilization across the plurality of cells of the service area during the broadcast; and broadcast a second content to the plurality of devices in the service area using the second overall target available capacity utilization goal. The content distribution system is programmed to broadcast the identified content using an alternate number of broadcast sessions to achieve the second overall target available capacity utilization goal. The content distribution system is programmed to establish a plurality of modulation and coding schemes; for each modulation and coding schemes of the plurality of modulation and coding schemes, the content distribution system is programmed to determine a target spectral efficiency; and for each selected cell of a plurality of cells, receive a capacity usage report from the selected cell; determine an available cell capacity of the selected cell based on the capacity usage report; determine a target available capacity utilization goal of the selected cell based on the available cell capacity; calculate a possible target throughput respectively based on the target spectral efficiency and the target available capacity utilization goal for the selected cell; where the content distribution system is programmed to determine a potential throughput to form a plurality of potential throughputs based on radio conditions at each of the plurality of devices for each selected device of the plurality of devices within the selected cell; where the content distribution system is programmed to determine an average throughput of the plurality of potential throughputs for each of the plurality of the modulation and coding schemes; where the content distribution system is programmed to select a selected modulation and coding scheme from the plurality of modulation and coding schemes to achieve a performance target; and where the content distribution system is programmed to broadcast the identified content to the plurality of devices based on selected modulation and coding scheme. The content distribution system is programmed to determine a target spectral efficiency based on the selected modulation and coding scheme, where the content distribution system is programmed to determine a target throughput of the broadcast based on the target spectral efficiency and an average capacity level in the plurality of cells, and where the content distribution system is programmed to broadcast the identified content may include broadcasting the identified content based on the target throughput. The performance target may include a maximized throughput across the plurality of devices in the service area. The performance target may include a maximized population coverage across the plurality of devices with a priority for the identified content above a priority threshold. The content distribution system is programmed to determine the priority for the identified content for the plurality of devices by being programmed to aggregate the priority for each of a plurality of identified content for each device to form a processed user list; identify from the processed user list, priority devices with aggregate priority greater than a priority threshold; determine radio conditions of the priority devices; identify a weakest radio condition from the radio conditions corresponding to a weakest device; and determine a target spectral efficiency for the weakest device based on the weakest radio condition; determine broadcast capacity available for broadcasting the identified content; for each cell of a plurality of cells of the service area of a first network the content distribution system is programmed to, receive a capacity usage report from the cell; determine an available cell capacity of the cell based on the capacity usage report; determine a target available capacity utilization goal of the cell based on the available cell capacity; determine an overall target available capacity utilization goal of the cells in the service area of the first network, based on a target capacity utilization goal of cells of the service area; determine a target throughput for the broadcast based on the target spectral efficiency and overall target available capacity utilization goal; and where the content distribution system is programmed to broadcast the identified content by being programmed to broadcast the identified content based on the target throughput. The content distribution system is programmed to determine the priority for the identified content is based on at least one of a wishlist or a content device indicator. The content distribution system is programmed to determine the priority is based on at least one of content popularity, a likelihood of content consumption, content popularity profiles, viewing patterns of the plurality of devices in the service area and similarities to other viewers. The content distribution system is programmed to determine a target spectral efficiency for a broadcast; determine a broadcast content list may include a plurality of identified content based on the target spectral efficiency for a broadcast; compare radio conditions of devices in the service area to a radio condition threshold, said radio condition threshold corresponding to a radio condition needed to receive the broadcast at the target spectral efficiency; form a potential device list of devices having a radio condition greater than the radio condition threshold; store a priority level for each user in the potential device list for each identified content of the plurality of identified content in the broadcast content list; generate an aggregate priority level for each identified content on the broadcast content list based on the priority level for each user; select the identified content from the broadcast content list with a highest aggregate priority levels to form selected content; and broadcast the selected content to the plurality of devices. The content distribution system is programmed to determine a broadcast content list may include a plurality of identified content; determine a target spectral efficiency for the broadcast; form a modified device list for devices successfully receiving broadcasted content, different from the devices in the potential device list; modify the broadcast content list to a different content list based on the modified device list; and broadcast the identified content in the different content list to devices in the modified device list. The modified device list is less than a number of devices in the service area. Implementations of the described techniques may include hardware, a method or process, or computer software on a computer-accessible medium.

Further areas of applicability will become apparent from the description provided herein. The description and specific examples are intended for purposes of illustration only and are not intended to limit the scope of the present disclosure.

DRAWINGS

The drawings described herein are for illustration purposes only and are not intended to limit the scope of the present disclosure in any way.

The drawings described herein are for illustration purposes only and are not intended to limit the scope of the present disclosure in any way.

DETAILED DESCRIPTION

Figure 1:
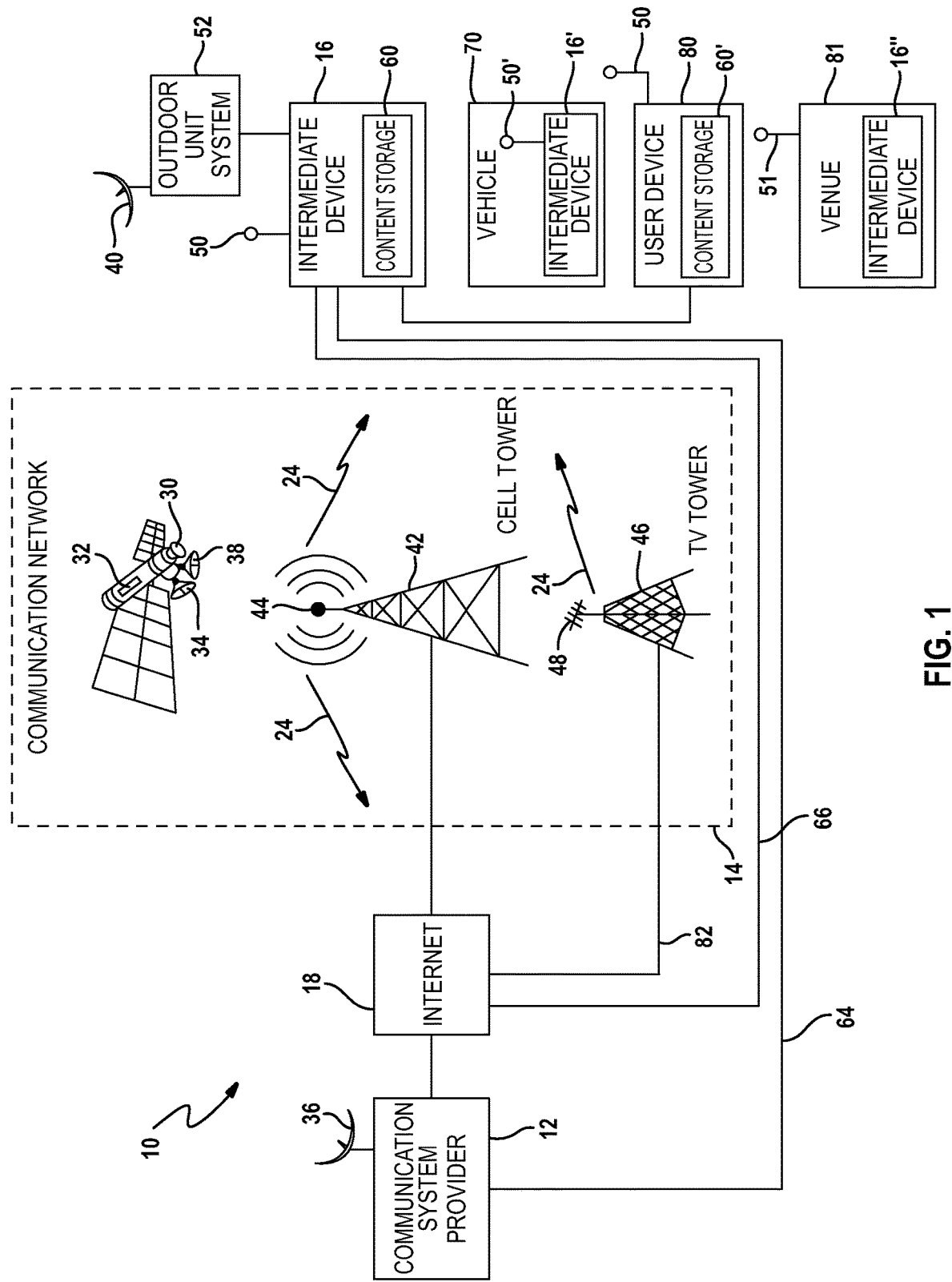
FIG. 1 is a high-level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. Steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that is programmed to perform instructions to carry out the steps performed by the various system components. A content or service provider is also described. A content or service provider is a provider of data to the end user. The service provider, for example, may provide data corresponding to the content such as metadata as well as the actual content in a data stream or signal. The content distribution system, service provider and end user devices may include a general purpose computing device, communication components, network interfaces and other associated circuitry to allow communication with various other devices in the system.

Further, while the following disclosure is made with respect to the delivery of video (e.g., television (TV), movies, music videos, etc.), the systems and methods disclosed herein could also be used for delivery of any type of digital assets or content including types of media data and different content types. For example, audio, music, data files, web pages, advertising, software, software updates, IoT data, weather, application, application data, "best of web" content, e-delivery of materials, etc. Additionally, throughout this disclosure reference is made to data, content, information, software programs, movie trailers, movies, advertising, assets, video data, etc., however, it will be readily apparent to persons of ordinary skill in the art that the terms are substantially equivalent in reference to the example systems and/or methods disclosed herein.

While the following disclosure is made with specific broadcast services and network systems, many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multichannel Multi-point distribution system (MMDS), Local Multi-point distribution system (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider and intermediate devices as described below can be reallocated as desired without departing from the intended scope of the present disclosure.

User devices may be coupled to the Internet through a constrained network or not even coupled to the Internet at all. In a constrained network, the speed or available resources may not be sufficient to provide a quality level of service. In the present examples, dormant capacity of the constrained network or a second less constrained network may be used to pre-position content at an intermediate device or a user device. The pre-positioned content may then be provided from intermediate device storage directly or through a second communication network (i.e., local network) when demanded at the user device for real-time consumption, without having to rely on using the constrained network for that real-time consumption. In certain instances, the word "user" is used interchangeably with a device associated with a user (a user device) since each user has a user device associated therewith.

Both non-dormant capacity and dormant capacity may be used for communicating content. Dormant capacity is a resource or a plurality of resources that are not being used for transmitting data or content by a content system provider during regular customer use. Regular use of a communication network for primary customers may be referred to as a primary use. Dormant capacity may be referred to as a secondary use and may be governed between agreements between a content provider and a communication system provider. The content provider may wish to provide a service to users using the dormant capacity. Users may not be aware of the path the content traverses. The use of resources for the dormant capacity has a lower priority that can be allocated to another for a higher priority use. In the simplest sense, dormant capacity is a data path or bandwidth that is increasingly left unutilized during non-peak times of network use. Inversely, there is limited dormant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long-term evolution wireless network (LTE) system, dormant capacity may be the bandwidth not being used for voice or data content requested from users in real-time. In the cases of "spectrum re-use," capacity used by some users for real-time consumption of some content during peak times, may leave dormant capacity at the same time as capacity that is either unusable by other users for real-time consumption of other content or only usable by other users for real-time consumption of the same content, if that content is broadcasted instead of unicasted. In the case of "network re-use," capacity used by some users for real-time consumption of content may leave dormant capacity that is not demanded by other users. In a satellite system, the dormant capacity is the bandwidth not being used for broadcasting of content to users for the sake of real-time consumption of such content or for voice or data content requested from users in real-time and may similarly be under-utilized as in wireless network systems. There is a very limited incremental cost for utilizing this dormant capacity, or the unused or under-used resources of a communication provider's network, as that cost is already being borne for the provision of regular customer use services, and as such offers means for highly cost effective content distribution. By utilizing the dormant capacity that would otherwise be wasted, the present system allows communication system providers to use it to offer other services to customers or to sell the capacity to others.

The dormant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing dormant capacity, an almost infinitely high (as far as the number of users benefitting) amount of re-use can be generated by simply broadcasting this content, instead of unicasting it, and by having some users use it for real-time consumption, and for the dormant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this dormant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, such dormant capacity can be used in-full for non-real-time consumption, by unicasting or broadcasting content using dormant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed to identify the availability of dormant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of dormant capacity only.

Prioritization of content to be communicated using the dormant capacity may be formed. Delivery of content using dormant capacity may be queue-driven. All the content to be delivered may be placed into the queue with attributed priority levels for each portion of content, and then served from the queue automatically upon dormant capacity availability, coordinating which content is served in which sequence per what rule. Content may also be retransmitted using dormant capacity. User preferences (queuing), missing content (error correction), content most popular for some users (personalization), content most popular for most users (popularity or short-tail optimization), as well as the remainder of content may all be used in prioritizing within queues.

The present system provides a high-capacity broadcast delivery system or a targeted unicast delivery system for pre-positioning content, that combines the strategic use of excess capacity or dormant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. This system may use the dormant capacity of a system over the same exact spectrum (in the case of spectrum re-use) as real-time consumption by broadcasting content to users including to those requesting it for real-time consumption and to others using the dormant spectrum capacity for pre-positioning, instead of just unicasting it to only the users requesting it for real-time consumption, or over dormant capacity left-over from non-peak-use of networks for real-time consumption, by unicasting or broadcasting content for pre-positioning. As will be further described below, the system may use dormant capacity of different types of communication systems including but not limited to mobile or cellular systems such as an LTE system, a satellite system or a digital television system. Content such as video content may be provided to an intermediate device, which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high-speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high-speed cable and fiber networks, or any of the aforementioned networks, to be alleviated by combining content delivery through pre-positioning using the dormant capacity and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of dormant capacity for pre-positioning of content and subsequent use from local content stores, and peak or regular capacity for serving users' real-time/live voice and data requests. If content that is likely to be consumed by the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, dormant capacity approach with a real-time voice and data request, peak or regular capacity approaches, lower speed broadband service providers may compete head-to-head with established cable or fiber providers while any of the aforementioned networks improve their performance by leveraging such a combination of approaches.

It is also desired for a system to be able to serve users requests from a first user for real-time consumption, using broadcast transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast transmission, the system can instead serve that first user's request using a broadcast transmission, allowing that first user and any other user, desiring to access that content for real-time consumption, to real-time consume that content; while at the same time, the broadcast transmissions to be able to be received by devices of any and all other users addressable by the broadcast transmission for non-real-time consumption, to store such content in those devices and for such any and all other users to access such content directly from their devices for real-time consumption at some later time.

The system could further make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve such first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the popularity of the content in the request, and the likelihood that the cost of serving those users using unicast transmissions at a future time will be greater than the cost of using a broadcast transmission vs a unicast transmission at the current time.

Further, such system could also include a mechanism for determining whether any given device should receive the dormant capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of such opportunistic broadcast data and the cost of receiving it and storing it versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the dormant broadcast transmission and store movie #1 for non-real-time consumption by the 63% of the users. In the future, some of the users whose devices stored movie #1 for non-real-time consumption, request to watch movie #1 at some future times, and movie #1 is served to them directly from their devices instead of using the network.

In the present example, optimized usage of a multiplicity of resource types (storage, computing, networking), based on cost, performance and demand requirements is set forth. Traditionally, systems have looked at the resource types individually and one-dimensionally. For example, radio resource management focuses on optimal usage of RF resources based on service requirements, contentions between competing requirements and user Service Level Agreements (SLAs). Another individual resource typically considered is the management of fixed network resources, e.g., Software Defined Network (SDN) style approaches. Storage and compute management and cloud-based architectures have been considered individually.

In the present example a cohesive, a combinatorial use of such a diverse set of resources to facilitate cost-effective, performance-optimized delivery of content, based on user needs and demand patterns is provided.

While existing systems look to leverage in-network compute, storage and networking resources in a traditional cloud framework, this disclosure extends the concept to a "System as a Cloud" model—wherein resources (compute, storage and networking) can be interchangeably assigned and arbitraged across the entire system, including but not limited to the traditional cloud—processing and storage farms in the network core, wireless core network components and gateways, network edge nodes—such as base stations, access points/routers, small cells, cable edge boxes (e.g. CMTS), and the like, intermediate storage/caching devices, in the network or in the home or office, end user devices, e.g. smartphones, tablets, personal computers, and the like. This may include using the available storage of mobile devices as intermediate devices for non-real-time consumption, by applications of those mobile devices. This may also include using the available storage of the mobile devices for non-real-time consumption, by applications of other mobile devices completely separate from the first mobile devices. The present example determines, at any given time, the optimal combination of resources, across the entire system, to deliver content based on cost, performance and user demand considerations.

At the same time, the distribution system uses the most suitable network to deliver its content through, considering the capabilities of the networks it has access to, and the cost of delivering through each network. All of this is done "over-the-top", i.e., at the content distribution layer, which works above the IP layer. In contrast to the more transport-layer schemes adopted by wireless networks, this approach enables the system to be cognizant of application/content level popularity, usage and delivery success characteristics. The distribution system is far more aware of aspects like the assets it is delivering, device consumption patterns with response to the assets, asset popularity levels, etc., than traditional broadcast functionalities that sit at the transport layer and are simply purveyors of this content.

By gathering performance feedback or radio metrics from devices, the distribution system is further able to adjust its decisions on delivery mode to be used (broadcast vs. unicast). For example, the broadcast mode may be enabled if the distribution system determines there are sufficient participating devices experiencing radio conditions better than a defined threshold. Additional users can be pulled into the broadcast segment of an ongoing transmission if those devices exhibit radio conditions better than the defined threshold. In this manner, the system always selects the most spectrally efficient mode of delivery. One consideration in the selection of the most spectrally efficient mode is the consumption pattern. The consumption pattern may include how many user devices need something now, how many user devices are predicted to need the content in the future, and how much cache do they have to store the content.

Another consideration is spectral efficiency. Spectral efficiency to determine the efficiency of the spectrum used for each transmission choice. By determining the spectral efficiency of each transmission choice, the appropriate transmission resources such as the network, the distribute type, the compute and the storage may be determined appropriately. The spectral efficiency and the capacity together with other data are used for making the selection of the appropriate resource at the content distribution system 12.

A comparative spectral efficiency of delivering content via unicast or broadcast is performed. Further, a comparative spectral efficiency of delivering content using different mixes of unicast and broadcast may also be performed using different proportions (percentages) of available capacity for broadcast and unicast and accommodating different sizes of user groups for broadcast and unicast. That is, a broadcast utilization goal and a unicast utilization goal for portions (or percentages of) the available network capacity may be determined. In some examples, the total goal of the available network capacity may be some percentage less than the total available network capacity. The difference may be referred to as a capacity margin, which allows the system to have the capacity to support unexpected increases in real time traffic. Lastly, the relative "rigidity" of unicast vs. broadcast in precluding support of real-time traffic in a sufficiently dynamic manner. Further details are provided below. The available capacity may be associated with a specific time period such as a time period of certain minutes of a day.

Referring now to FIG. 1, a high-level block diagrammatic view of a communication system 10 is set forth. In this example, a communication system provider 12 is a system that is in communication with a communication network 14 and controls the operation of the communication network 14. The communication network 14 is in communication with one or more intermediate devices such as an intermediate device 16. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of different networks or even different types of networks. That is, the network capacity of one or more networks may be combined deliver content to the intermediate device 16 or user device 80. The communication network 14 may be wireless. The communication network 14 for communicating content to the intermediate device 16 or user device 80 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the intermediate device 16 or user device 80. The antennas 34, 36, 38 may represent multiple antennas or multiple types of antennas. The satellite components may be referred to as a satellite network.

The communication network 14 may also include a cell tower 42, or any other wireless transmission device, having an antenna 44 (or antennas) thereon. The antenna 44 may represent a cellular antenna, a Wi-Fi antenna, or any other wireless transmission antenna of the cell tower 42 and may communicate content wirelessly to the intermediate device 16 through the antenna 44, from the communication system provider 12, including also wirelessly through the antenna 44.

The communication network 14 may also include a television network comprising a television tower 46 having an antenna 48 thereon. The TV tower 46 may communicate content to the intermediate device 16 or user device 80 from the communication system provider 12.

The satellite 30, the cell tower 42 and the television tower 46 generate radio links that communicated content to the intermediate devices 16 and the user devices 80.

The communication network 14 may communicate using real-time capacity, dormant capacity, or a combination of both as will be further described below. The dormant capacity may include various types of resources that are not being used for serving users' real-time/live voice and data requests and their real-time/live voice and data consumption, and that are more ideally used for pre-positioning of content to the intermediate device 16 or user device 80. As mentioned above, the communication network 14 may effectively distribute (pre-position) content on real-time or a non-real-time basis to the intermediate device 16 or user device 80, for subsequent consumption by users directly from the intermediate device 16 or user device 80 instead of from the communication network 14. The communication network 14 may use a combination of broadcasting and unicasting for communicating content for real-time use.

The communication network 14 may communicate with the local area network 310, which would in turn communicate the content to the intermediate device 16 or user device 80, or the intermediate device 16 or user device 80 directly, using various types of access systems so that a maximum amount of content may be provided to the various intermediate devices. or user device 80. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used. As mentioned above, functions of the intermediate device may be included in a user device and therefore the intermediate device may be referred to as a user device.

The intermediate device 16 or user device 80 may also have an antenna 50 disposed thereon. The antenna 50 may communicate with the antenna 44 and the antenna 48 of the communication network 14. By making the intermediate device portable, the antenna 50 may be placed in a position of high reception. The intermediate device 16 may act as a small cell.

An antenna 40 of an outdoor unit system 52 may be used to communicate with the antenna 38 of the satellite 30. The antenna 40 may be a flat faced phased-array antenna. Details of the outdoor unit system 52 and the intermediate device 16 are provided below.

The intermediate device 16 may also include a content storage 60. The content storage 60 may include a solid-state content storage (memory), a hard disk drive or a combination of both. The content storage 60 may be designed to hold a substantive amount of data on the order of multiple terabytes or greater. The content storage 60 is used to store pre-positioned content received through either the antenna 40 or the antenna 50. The intermediate device 16 may also be in communication with a back haul network 64. The back haul network 64 may be part of the communication network, which, as demonstrated, is presented as wireless systems. The back haul network 64 may be a wireless network as well. Content storage 60' may also be incorporated into the user device 80. The intermediate devices 16 may be used for storing content for future use and passing real-time content that is consumed immediately by a user device.

The system 10 may be suitable for both prepositioning content and distributing in real-time live content or stored content using a wired network 66 as well. That is, the intermediate device 16 or user device 80 may also be coupled to the Internet 18 through the wired network 66. Content may be prepositioned using the dormant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling units may have an intermediate device 16" with an exterior antenna 51 in communication with the satellite antenna 38, the antenna of the cell tower 42 and/or the antenna 48 of the TV tower.

The cell tower 42 may use LTE technology or other cellular technology. In particular, the cell tower 42 may use LTE-B technology to communicate with the intermediate device 16 or user device 80. A wired connection 82 may be disposed between the communication network 14 and the internet 18 and/or communication system provider 12. As will be described below, the intermediate device 16 may be part of the cell tower 42 and thus the antenna 44 may act as a Wi-Fi or WiMAX antenna for communicating with the user devices.

The connection between the communication network 14 and the internet 18 or the communication system provider 12 may also include dormant capacity. This dormant capacity may be utilized by the system in a similar way as the afore described dormant capacity, to distribute pre-positioned content to the communication network 14 or to the internet 18, for their in-turn distribution of the pre-positioned content, including using dormant capacity, to ultimately reach the intermediate device 16.

More than one of the systems and devices illustrated in FIG. 1 may be incorporated into a system. In fact, more than one system or device is likely whereby it encompasses a broad geographic area.

Figure 2:
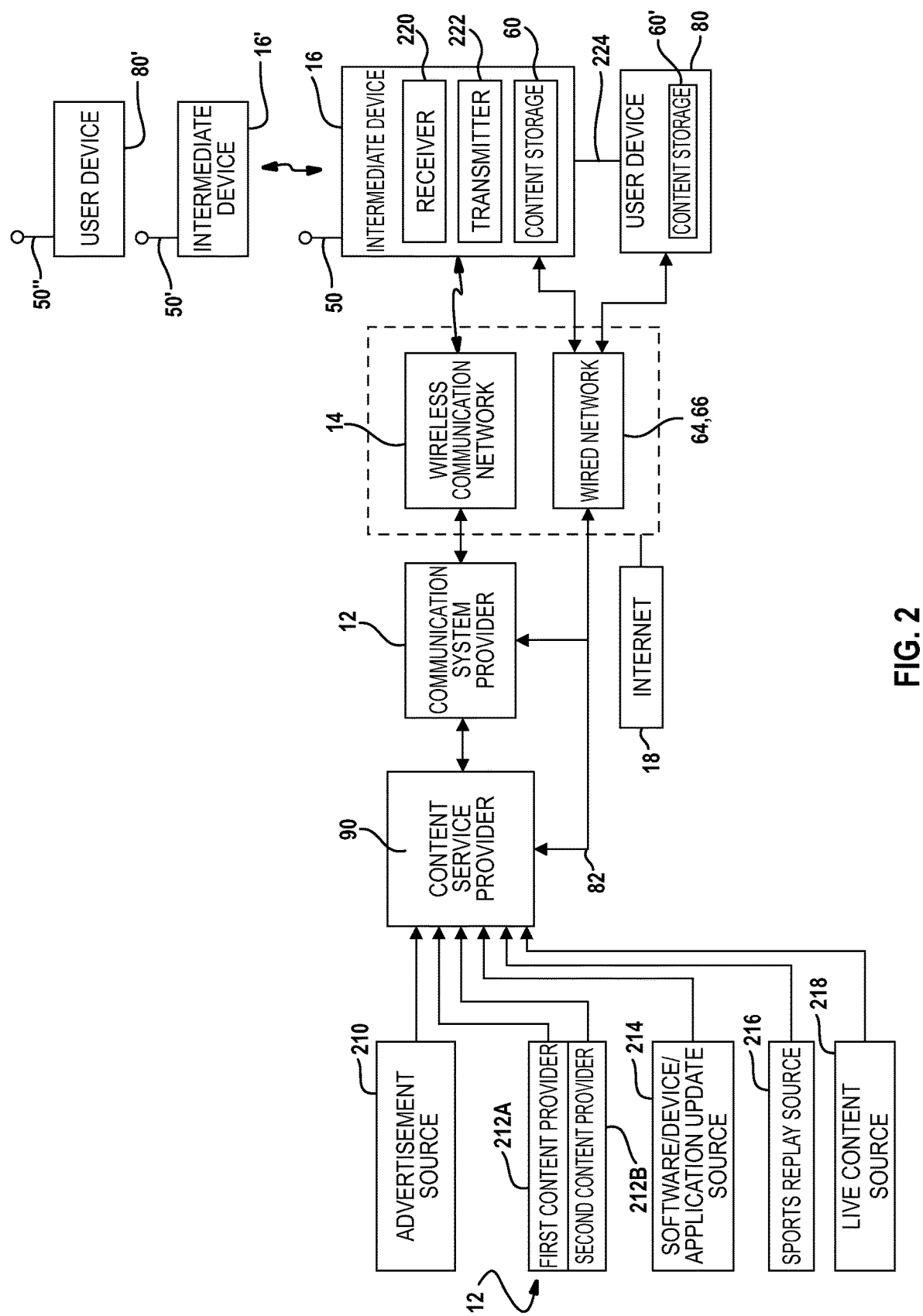
FIG. 2 is a block diagrammatic view of a more detailed communication system of FIG. 1.

Referring now to FIG. 2, the communication system provider 12 may be more than one entity. The communication system provider is shown in the first content provider 212A, the second content provider 212B communication with a content service provider 90. The content service provider 90 is a system that is used for providing content to the communication system provider 12. The content service provider 90 and the communication system provider 12 may be business entities. The content service provider 90 may purchase the dormant capacity of the communication system provider 12. The content service provider 90 may be a service provider that is subscribed to by the users of the user device 80. However, the content service provider 90 may include pre-existing services such as mobile phone service providers, cable providers, digital television providers and the like. The content service provider 90 communicates various instructions to the communication system provider 12 so that the content is distributed in a desirable way. In one example, stored content is communicated with bit rate data or metadata corresponding to the speed the content is recorded or to be played out so that the desired communication speed for real-time consumption is provided. By the communication system provider 12. Details of the intercommunication between the systems are described in further detail below.

The content service provider 90 may receive content from various sources including an advertisement source 210, the first content provider 212A, the second content provider 212B, a software/device/application update source 214, a sport replay source 216 and a live content source. The advertisement source 210 may communicate advertisements to the content service provider 90. The advertisements may include video, audio and metadata associated therewith. The metadata associated with an advertisement may include desired targets for which users would find the content desirable. Metadata may also include and a product definition.

The content providers 212A and 212B may also provide video and audio content as well as metadata for the content. The metadata may include a content identifier, a content title, actor and actress names, and various other identifying data including various categories such as genres and the like. The content may be requested from the content providers or indicated to be pre-positioned at the intermediate devices by the content providers.

The software/device/application update source 214 may provide new software, software updates, device updates and application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for non-real-time delivery or delivered through no action of the device and pre-positioned at the intermediate device based on the identity of the user device, the software or the applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

A live content source 218 may also be included with in the system 10. The live content source 218 may provide live or real-time content that is broadcasted by the system. Real-time or live content may also be unicasted. The live content is communicated in a live content stream and has various characteristics including a playout bit rate. The live content stream may be played back or viewed in real-time at various user devices or intermediate devices. As will be described below, other devices may receive a unicast of the live content as well. Preferably, the content or stream can be communicated with at least the bit rate at playout. Details of a mix of broadcast and unicast for communicating content is described in detail below.

The content providers 212A, 212B, the sports replay source 216 and the live content source may also provide data or instructions to communicate certain content to specified devices. Metadata included with the various types of content described above allows the content to be distributed to the proper intermediate device, intermediate devices or user device 80 on the right schedule while accommodating any other content distribution priorities while using the dormant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16 or a direct or wired connection with the networks 14, 64,66. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network, which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content that are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some such intermediate devices 16' may be configured to not have an ability to receive content from wireless communication network 14, and only be able to communicate with other intermediate devices 16 and 16' to receive such "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
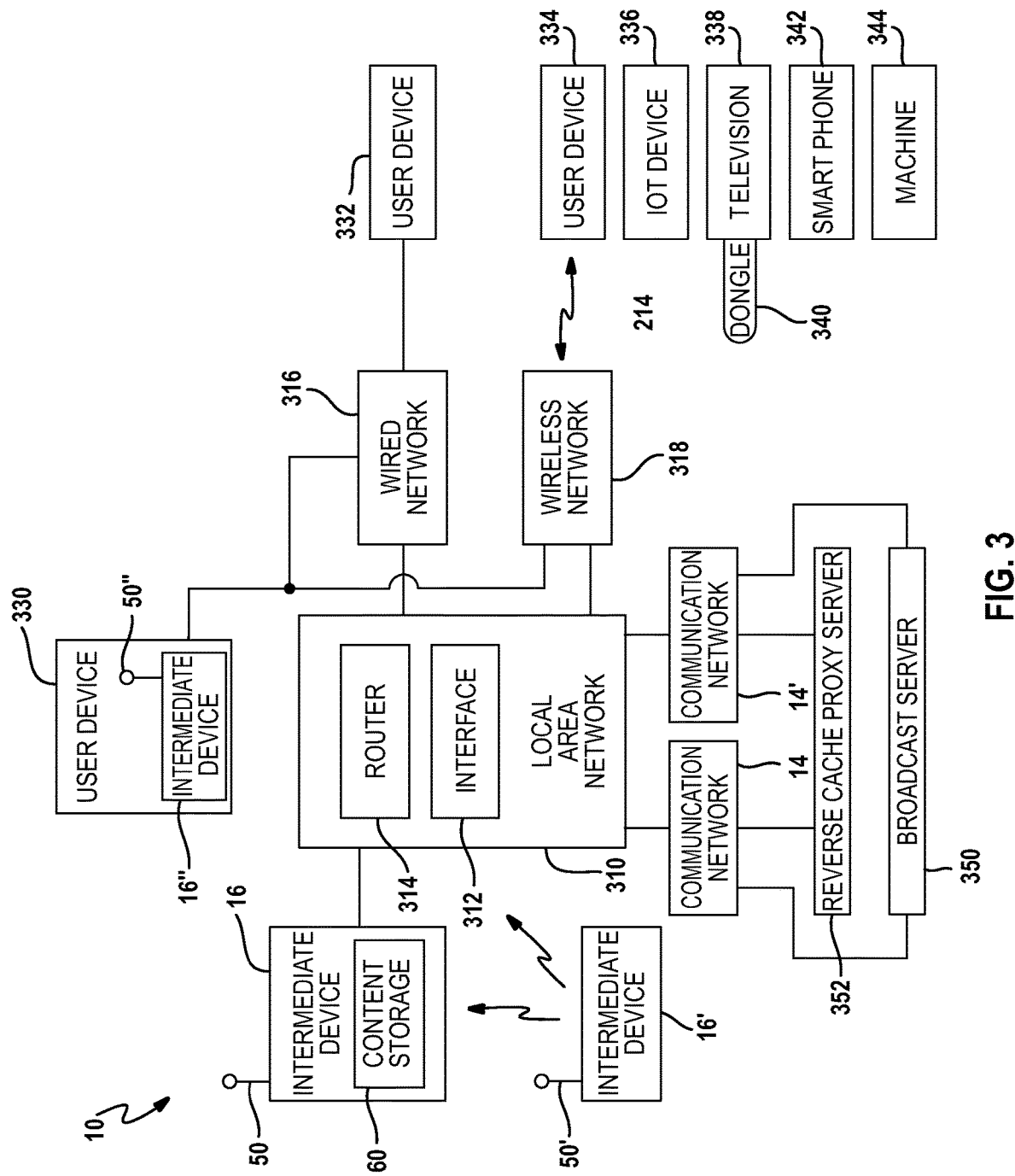
FIG. 3 is a block diagrammatic view of a plurality of user devices in a local area network.

Referring now to FIG. 3, the communication system provider 12 may be in communication with a local area network 310 through the communication networks 14, 14' as described above. Only the communication networks 14 and 14' are illustrated for simplicity even though more may be a part of a system. FIGS. 1 and 2 do not illustrate the local area network 310. The local area network 310 may have an interface 312 for communicating with the communication networks 14, 14'. The interface 312 may be a modem.

The local area network 310 may also be coupled to the second communication network 14'. The second network 14' may be the primary two-way connection to the Internet for the user devices 332-344. The second network 14' may represent dial-up or a digital subscriber line. As described in the examples set forth herein, the system 10 may be used to pre-position content in the intermediate device 16 or a user device 332-344. The supplementation of content is particularly useful when the second communication network 14' for providing regular internet service to the user devices 332-344 is slower than the speed of the communication network 14, although not necessarily. It is possible that the local area network 310 may not have a two-way connection to the internet except the prepositioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1 and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50" for communicating with the local area network 310. The intermediate device 16" may receive content using the dormant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like. The user device may be referred to later collectively as the user device 80.

An internet of things (IoT) device 336 may be coupled to the local area network 310 through the wireless or wired networks 316, 318. The IoT devices 336 may require software and application updates suitably delivered via dormant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have an application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All the user devices 330-344 may be in communication with the wireless network 318 using many different types of standards including Bluetooth and Wi-Fi. Each of the user devices 330-344 may receive content through the local area network 310 directly or from at least one of the intermediate devices 16, 16' and 16". The application for retrieving and serving content to the user devices 330-344 may be in the devices 330-344, in the intermediate device 16, in the local area network 310, in the router 314 or in the interface 312. The user devices 330-344 may also have content storage incorporated therein. The integral storage may allow the user device to act as an intermediate device.

The types of content may include audio content, video content, operating system updates, other software updates, applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

A broadcast server 350 may be coupled to the communication networks 14, 14'. The broadcast server 350 may be used for broadcasting content to various user devices 80 and intermediate devices 16. The broadcast server 350 may broadcast content that is stored or provided by a content provider or source. The broadcast server 350 may also communicate content in real-time that is live. The broadcast server 350 is a network component that manages broadcast sessions across a multiplicity of networks. The distribution system may identify to the broadcast server the preferred network to be used for the broadcast with an identifier signal having a network identifier.

A reverse cache proxy server 352 is also in commute communication with the communication networks 14, 14'. The reverse cache proxy server 352 is described in further detail below. The reverse cache proxy server 352 caches content for efficient delivery to proximal users. The reverse cache proxy server 352 may be within or next to the wireless network, or elsewhere in the broader network.

Figure 4:
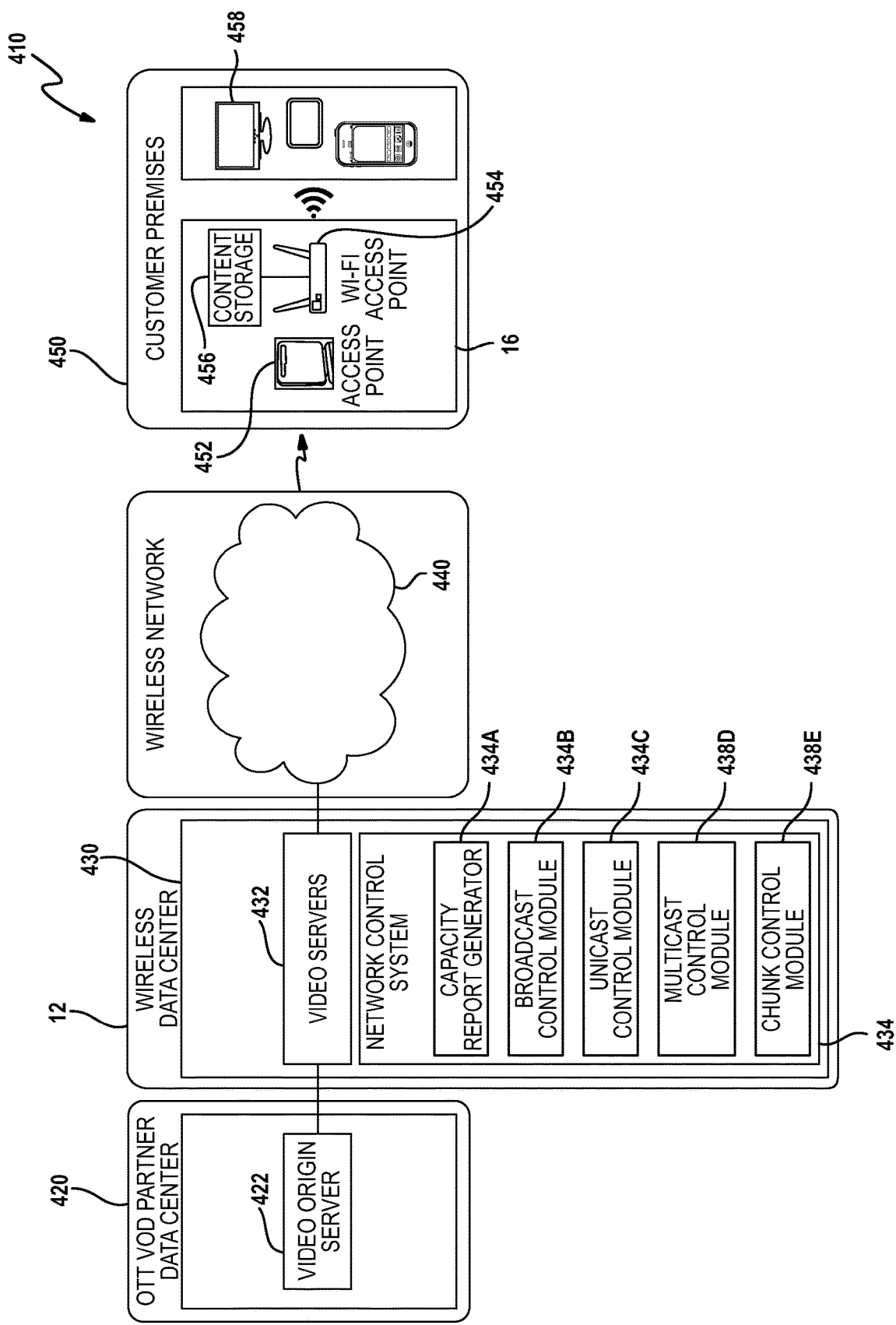
FIG. 4 is a high-level block diagrammatic view of a communication system using an LTE wireless network.

Referring now to FIG. 4, a content delivery system 410 is illustrated. In this example, the communication modules are specifically directed to an LTE system that provides an over-the-top video system. However, other cellular phone system and technologies may be used. An over-the-top video on-demand partner data center 420 acts as the content service provider 90 and has a video origin server 422 disposed therein. The video origin server 422 receives video content from various sources including the sources set forth in FIG. 2. The partner data center 420 is in communication with the communication system provider 12. In this case, the communication system provider 12 is a wireless data center 430. The wireless data center 430 includes video servers 432 that are in communication with the video origin server 422.

The wireless data center 430 is also in communication with a network controller 434. The network controller 434 may be used for various functions as will be described in detail below. The network controller 434 may, in general, have a capacity report generator 434A that is used to identify the amount of capacity (bandwidth) available and how much available capacity is being used be used by the system. The capacity report generator 434A may therefore be used for identifying dormant capacity, including that of wireless network 440, and scheduling the delivery of content to the intermediate devices, including using wireless network 440. The network controller 434 may also be responsible for managing the content at the intermediate devices by removing the content when necessary.

The capacity report generator 434A may generate the dormant capacity available from each network. The dormant capacity was described above as capacity not being used for the primary service of the network. In a cellular network, voice traffic may be a primary type of content as well as providing customers with real time data. Any data capacity not being used may be referred to as the dormant capacity. The unused capacity of the networks 14A-14C may be used by content distribution system 12 for distributing content therethrough. The amount of dormant capacity may change over time. Therefore, the capacity report generator 434A may provide an indication of the time associated with the dormant or unused capacity. The capacity report generator 434A may also predict the future unused capacity based on operating data of the system.

The capacity report generator 434A may provide data available capacity in various forms to the dormant capacity communication system (the operator associated therewith). For example, the capacity usage report may include at least some of capacity used by user traffic associated with the network operator, total capacity of the network, capacity used by the dormant capacity content provider, and total capacity used by any traffic whether user traffic associated with the network operator, or the capacity used by the dormant capacity communication system 17.

In one example, the available capacity may be determined by subtracting from the total capacity of the network, the capacity used by regular user traffic associated with the network and the capacity used by the dormant content provider. The available capacity may be referred to as the dormant capacity. As mentioned below some margin may be maintained to the dormant capacity is not fully utilized so sudden usage spikes of users associated with the network operator can be accommodated. The amount to be used or available to be used within the margin may be referred to as a target available capacity utilization goal.

The capacity used by the dormant capacity content provider may be determined by estimating the capacity used by dormant capacity content provider given the throughput sent to user devices over a period of time and the spectral efficiency of the user devices to which the dormant content provider communicates content.

The quality of service (QoS) may also be used to determine the available capacity. In general, the QOS is the performance seen by the user devices of the network. To quantitatively measure quality of service, several related aspects of the network service may be considered, such as but not limited to packet loss, bit rate, throughput, transmission delay, availability, and jitter. The quality of service allocated to the broadcast may be lower than other content such as voice. The available network capacity may be determined by the network based on a quality of service by determining a total capacity of the network and subtracting a high quality of service network allocation. A lower quality of service network may be allocated to broadcasting to at least a portion of the available network capacity. The available capacity may, for example, be provided in spectrum (bandwidth) frequency. For example, 10 MHz of 30 MHz may be available after subtracting. Conversely, 20 MHz of 30 Mz are used for high QoS service. The number of physical resource blocks (PRBs) may also be provided in a similar way. That is, the number of PRBs used out of the total of PRBs or the number available PRBs may be provided.

The network controller 434 may also be responsible for calculating the optimal amount of content, the frequency of such content re-distribution, and the relative timing of different content to be distributed by the wireless network 440 and to be distributed to any intermediate device 16. The network controller 434 may also include a broadcast control module 434B that controls the broadcasting of content. The broadcast control module 434B may establish one or more broadcast sessions with a plurality of user devices and intermediate devices for communicating content through the network. As will be described in further detail below, more than one broadcast session may be established for communicating a content. The network controller 434 also includes a unicast control module 434C used to establish unicast sessions with individual user devices and intermediate devices. Some networks are also capable of multi-casting. A multicast control module 434C is used to establish a multicast session and control the communication of content to a plurality of user devices that explicitly join the session. The multi-cast control module 434D may thus control the exchange of joining and leaving signals. The network control system 434 may also include a chunk control module 438E used for dividing the content into various chunks or portions smaller than the whole content. The chunk control module 438E may assign a chunk identifier which may identify the file name, the starting byte and the ending byte so that the chunks may be reassembled in the proper sequence to form the content. The chunk identifier may also resend chunks that were not successfully received.

The video servers 432 of the wireless data center 430 is in communication with a wireless network 440. The wireless network 440 is in communication with customer premises 450. The customer premises 450 may include an intermediate device 16. The intermediate device 16 may include an access point 452 used for accessing the content at the wireless network 440. The access point 452 may also be used for receiving instructions for tuning to the wireless network 440. Specific instruction signals may be provided for tuning to content at specific times. Channels, frequencies and times may all be communicated in the instruction signals.

The intermediate device 16 may also include a Wi-Fi access point 454 and a content storage 456. The Wi-Fi access point 454 may establish a Wi-Fi network with the various user devices 458 within the system. The Wi-Fi access point may be referred to as a router. The content storage 456 may be used to store the content received through the access point 452. Of course, other wireless technologies may be accessed by the wireless access point. Each of the user devices 458 may include an application for accessing the content within the content storage 456. The application may also be received through the access point 452 or it may be pre-stored within the content storage 456 when a user purchases the system. The application may also be pre-stored within the user devices 458.

Figure 5A:
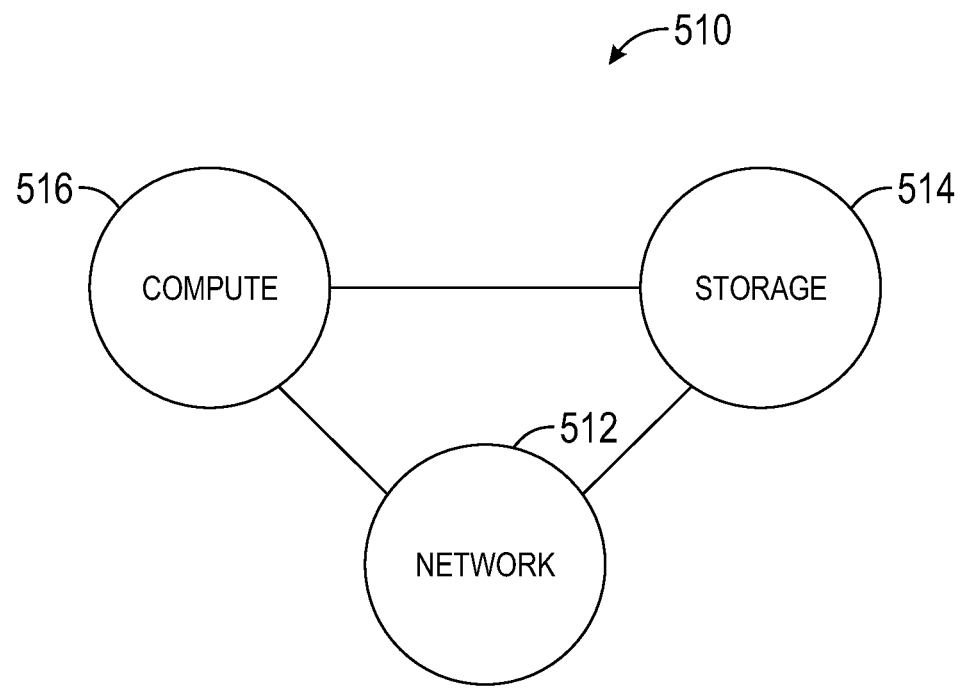
FIG. 5A is a block diagrammatic view of the difference types of resources available within a communication system.

Referring now to FIG. 5A, the types of resources 510 in a system may be considered three distinct resources. The resource types can be optimized to deliver the optimized results. The types of resources 510 include are the network resources 512, the storage resources 514 and the compute resources 516. The resources 510 may span different positions in the system and may include different types of resources. Each of these resource types can be optimally allocated in and of themselves.

The use of network resources 512, in and of themselves, may be optimized in various way. The best network, compute, or storage may be chosen to deliver networking to the user, if the user or device is accessible via multiple paths based on the performance of such systems. The cost of using the network, compute, or storage may also be considered. Aggregating bandwidth across multiple networks, computes, and storages (pathways available to the user) may allow multiple paths to be used simultaneously. Harvesting underutilized or dormant networks, computes, or storage capacity, e.g., using paths when regular use is low, on a consistent basis allows a cost-effective use of the network resources. The mode of transmission to use during the communication of content may be chosen to use the network resources more efficiently. For example, unicast vs broadcasting (point-to-point vs. point-to-multipoint may be selected depending on various factors. Broadcast transmission provides high spectral efficiency, i.e., higher bits/sec per Hz of spectrum. Given that there is typically a cost incurred per frequency of spectrum, extracting a higher bits/sec throughput per Hz results in a lower cost per bit.

In the network described herein, the available storage and compute power of wireless-connected devices is tracked by the system, and the wireless network is constantly transmitting data, whether to serve requests by users for real-time consumption or to pre-position data into the available storage of wireless-connected devices. The wireless network is constantly determining whether content should be pre-positioned to one device vs. another device using the remnant capacity for non-real-time consumption, based on such a likelihood of a device being able to fulfill the most number of applications' requests for real-time consumption in the future, or based on its likelihood of being able to fulfill the most valuable real-time consumption requests in the future, including during the most valuable time for such fulfillment (instead of using the wireless network at such time for real-time consumption). When applications are making requests for real-time consumption, the network figures out whether fulfilling such data requests is better directly from a nearby available storage containing the requested data or instead using the wireless network for transmission of such data, and directs such application to receive such data from either the nearby available storage or from the wireless network itself Wireless networks may also track the mobility of devices, and use opportune times when devices are available to receive remnant capacity transmissions for data prepositioning, to preposition data in such devices, knowing the devices will not be accessible for such prepositioning in the future, but may indeed be able to fulfill future requests from applications for real-time consumption in the future directly from their storage. This may include a mobile device, that is often in a disadvantaged location with poor wireless signal and inferior throughput and spectral efficiency from the network, receiving a larger portion of prepositioned data traffic than other devices, when such a mobile device is in an advantaged location with excellent wireless signal and superior throughput and spectral efficiency from the network.

The storage resources 514, in and of themselves, can be allocated in optimal ways to ensure cost and performance optimization, and economies of scale. Typically, greater economies of scale (and cost efficiencies) may be gained by storing deeper in the network (e.g., on arrays in the cloud). Deeper is relative to the end user or user device. However, the future network is likely to provide storage opportunities in different parts of the system (network nodes, access points, small cells, base stations and end devices).

While storage space may normally be more limited and expensive in, for example, edge nodes in the network like small cells, home access points and end user devices themselves, a strategy that harvests unused (dormant) storage capacity in these devices (with resultant lower costs or no costs) can make sense, especially when storing closer to the user makes the delivery process more cost/performance optimal. This can be both for their own benefit, and for the benefit of nearby devices which can be served from those end user devices' storage.

The available storage of devices may be filled with partial data of any given content. In this case, the network could direct an application to access one part of the data from one device with the partial prepositioned data, and to access another part of the data from another device with the remaining partial prepositioned data.

Even for a given bundle of content, pieces of the bundle can be stored at different places in the system. For example, in the case of streamable multimedia, metadata, content guides etc. can be stored locally on an intermediate storage device in the home, or on an end user device; whereas the main content could be positioned at some point in the system.

As in the case of storage, computing points (the compute 516) can also be selected in a distributed fashion and aligned with where different content pieces get stored. The compute refers to the applications and hardware to process or move content toward the endpoint. Unused/dormant compute capacity can be tapped into at different points in the system.

As in the case of the storage resource 514, the capacity of the compute 516 can also be leveraged in a "split" fashion, e.g., in the case of an online, multiplayer game, components related to rendering and local processing can undergo processing on the local device; whereas functions common to all the players, and which relate to the overall game status, could execute deeper in the network.

Figure 5B:
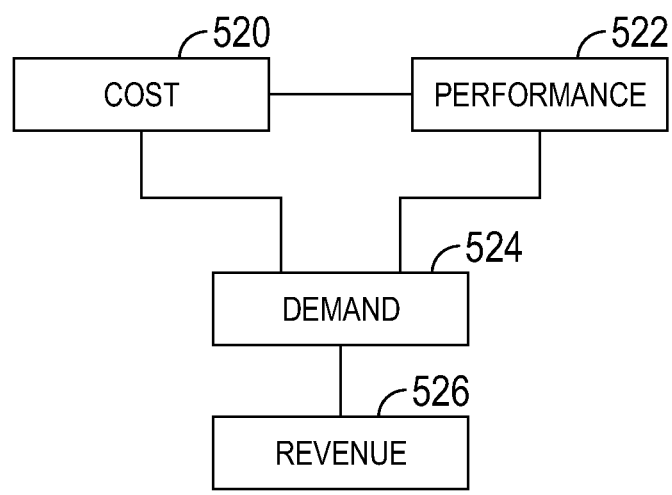
FIG. 5B is a block diagrammatic view of cost, performance and demand that considered when determining a content storage location.

Referring now to FIGS. 5A and 5B, the different types of resources 510 (network 512, compute 516 and storage 514) can also be combined in a cohesive manner to deliver a cost 520, a performance 522 service that is optimized based on demand 524 to meet the requirements of the user or service in question. Ultimately, revenue 526 is provided by such a system.

Figure 6:
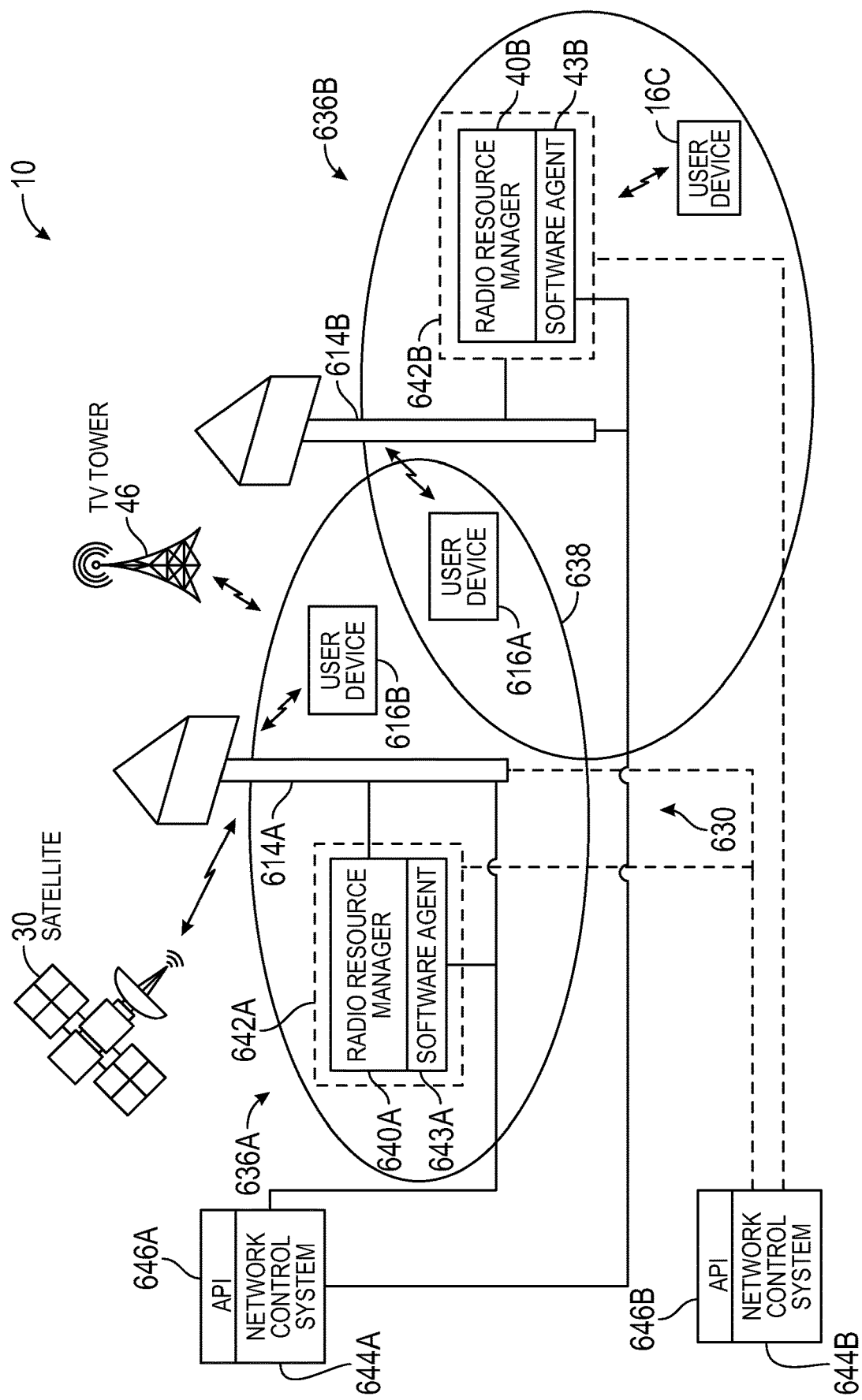
FIG. 6 is diagrammatic view of a communication system with multiple cells.

Referring now to FIG. 6, the communication system with plurality of cell towers 614A, 614B with associated user devices 616A-161C is set forth. The user devices 616A, 616B and 616C each may be one of the varieties of user devices described above.

The communication system 10 may use one or more network resources to communicate content to the user devices 616A-616C. The communication system 10, for example, provide a service that may use one or more networks to communicate a particular piece of content. The content may be communicated partially through one network while another part of the content may be communicated through another network or may be completely communicated through a single network. The satellite network represented by the satellite 30 is illustrated. The TV network is represented by the TV tower 46. During satellite communication, all the transponder bandwidth may not be used. Therefore, in a satellite 30, the excess bandwidth may be used to communicate content through the communication system 10. Likewise, the TV tower 46 may have a predetermined amount of bandwidth associated therewith. The bandwidth may not be completely used and therefore the communication system 10 may provide content through the excess bandwidth of the TV tower. Cell towers 614A and 614B may be from the same service provider or different service providers. The cell towers 614A may broadcast or unicast data using one or more technologies. For example, 3G, 4G, 5G or LTE may be used as a technology for communicating content from the cell tower 614A, 614B. The cell towers 614A, 614B may thus have one or more antennas that communicate using one or more technologies. A high-level representation of a service area 630 having two cells 636A, 636B corresponding respectively to the cell towers 614A, 614B is set forth. The cells 636A, 636B boundary lines may represent the transmission of two different technologies. The cells 636A, 636B also have an overlapping portion 638 in which the user device 616A is provided. As will be described in more detail below, the service to the user device 616A may aggregate different technologies and different service providers. For example, the user device 616A may use two different technologies from the same cell tower 614A or 614B. For example, 4G and 5G may be used to communicate content to the user device 616A from the cell tower 614G. In addition, cell tower 614B may communicate with one technology, such as 4G, and cell tower 14G may communicate with another technology such as 5G. The cell towers 614A and 614B may be owned by different entities and thus may not be related. The communication system 10 may contract to use excess capacity from different network providers. User device 616B may be located within one cell 636A only reachable by signals from the base station 642A. However, multiple technologies may be used to reach or communicate content to the user device 616B. The same is true for user device 616C. For user device 616C, signals from the cell tower 614B are used to communicate content thereto. Of course, different technologies provided from the different cell towers 614A, 614B may be used to communicate with the user devices 616B, 616C.

In all cases, other networks, such as the satellite 30 and TV tower 46 may be used in addition to the cell towers 614A, 614B to communicate content to the user devices 616A-616C.

Each cell tower may have a radio resource manager 640A, 640B that is part of a base station 42A, 42B, respectively. The radio resource manager 640A provides a scheduling function to the base station 642A. The content distribution system 12 may be used to determine a performance target such as the target throughput times the number of devices (throughput aggregate across a device population) that receive the content based on the available capacity and the radio link quality as will be described in further detail below. Other possible performance targets include overall coverage of devices, the throughput alone. The content distribution system 12 selects a throughput level (based on a modulation level and coding level) that seeks to optimize the aggregate throughput level. The content distribution system then requests the throughput of the wireless network, such as by the radio resource manager 640A, 640B. That is, a broadcast available capacity utilization goal and a unicast available capacity utilization goal for portions (or percentages of) the available capacity) may be determined on a per cell basis. The utilization goals may be referred to individually or they may be referred to collectively as an overall target capacity utilization goal. In some examples, the target available capacity utilization goal may be some percentage less than the total available capacity. The percentage may be set by the network operator. The difference between the total available capacity and the target available capacity utilization goal may be referred to as a capacity margin. The margin allows the system to have the capacity to support unexpected increases in real time traffic. An overall target available capacity utilization goal of the first network may be determined based on the available capacity by identifying a desired total network loading or utilization by all network traffic (both dormant and traffic associated with a network operator) or achieving a network loading having a predetermined margin of available capacity unused.

The base station 642A, 642B may be in communication with a network control system 644A, 644B, one example of which is set forth at 434 of FIG. 4. Should the base stations be controlled by a single entity, the network controller 644A may control the base stations 642A, 642B as part of the same network. However, the base stations 642A, 642B of the cell towers 614A, 614B may be controlled by different entities and thus a second network controller 644B is set forth. The network controller 644B may also be used to control either of the base stations 642A, 642B or one of the base stations. An application interface 646A is associated with the network controller 644A and an application interface 646B is associated with the network controller 644B. The application interface 646A, 646B may be used to receive and transmit various data to the communication system 10. Further functioning of the application interface and the network controllers are described in further detail below.

In general, the communication system 10 uses knowledge of the radio links 24 and the operation of all the networks it is associated with to determine and orchestrate the content distribution in an effective manner. Radio link quality is a factor used to determine achievable throughput. The higher a device's radio channel quality, the higher is the spectral efficiency that can be applied to transmissions to the device, and hence the greater the throughput.

Figure 7:
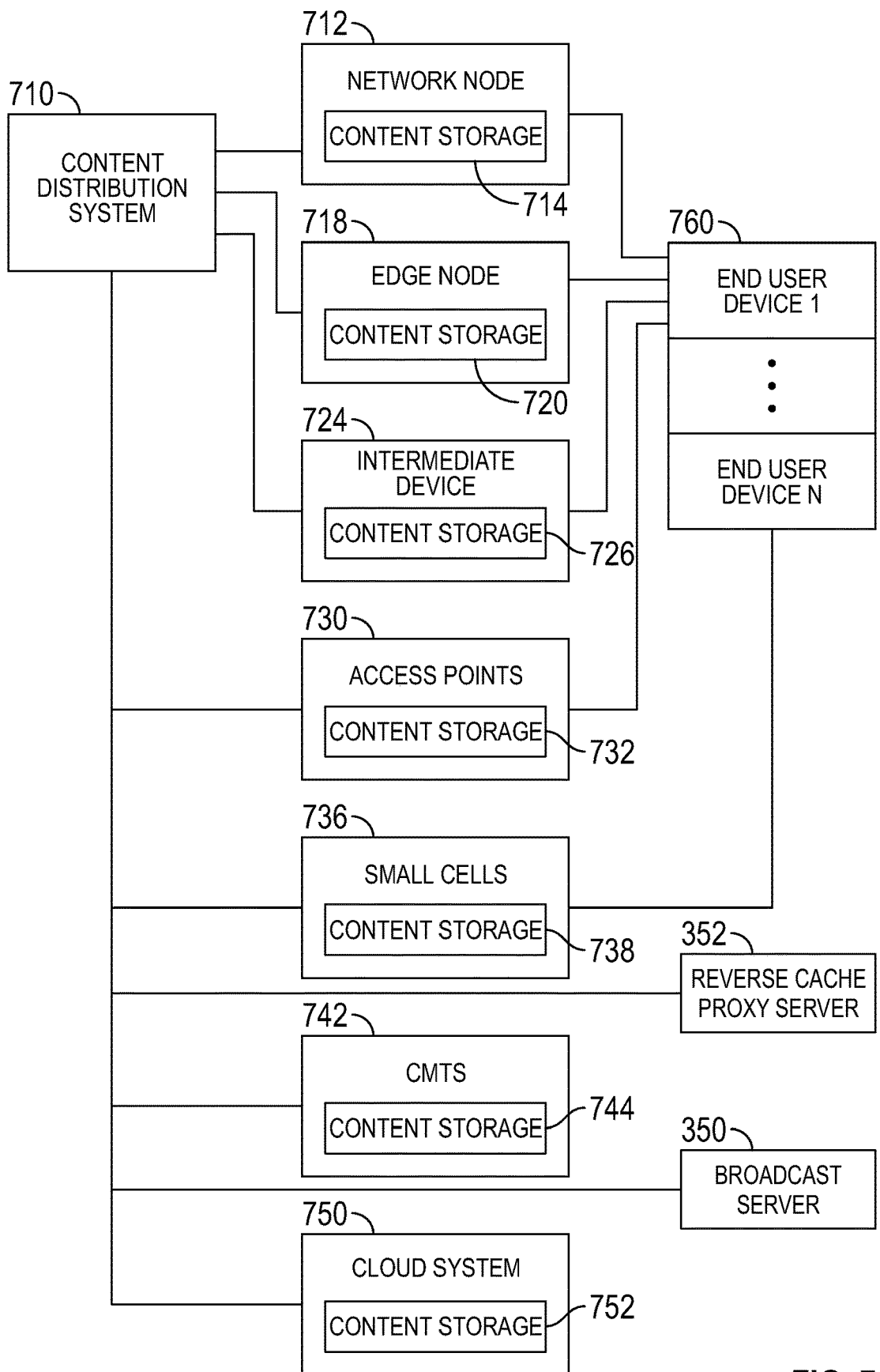
FIG. 7 is a block diagrammatic view of a simplified communication system with a content distribution system ultimately communicating with end user devices

Referring now to FIG. 7, a content distribution system 710 (or 12 above) is illustrated. The content distribution system 710 is microprocessor or controller that is programmed to perform various functions. The content distribution system 710 is the system that is used for distributing content throughout communication system 10. The content distribution system 710 may be a standalone system or may incorporate various aspects of FIGS. 1-3 above. That is, the content distribution system 710 may include one or more aspects of the communication system provider 12, the first content provider 212A and the second content provider 212B, as well as the content provider 90 and the communication system provider 12. The content distribution system 710 is used for determining the resources and timing for providing content to the storage devices and from the storage devices to the end user. As mentioned above, the two functions may be separated in time. That is, the content may be provided to the content storage at a time that is different from the time that the content is ultimately communicated to the end user. This may be referred to as non-real-time content distribution.

The content distribution system 710 determines whether to serve the content from the network or from the storage depending on the speed, the capacity and the costs of the aspects of the communication network and the delivery. The resources may be optimistically levered at different points of the network. Both the storage costs and the communication costs may be taken into the consideration. Ultimately, the optimum combination of resources is leveraged for the distribution of a particular content.

The content distribution system 710 communicates to various network resources that may include, but are not limited to, a network node 712 that has a content storage 714 associated therewith. The network node may be a wireless or a wired network node. The network node 712 may control access to a particular type of wired or wireless network.

An edge node 718 may provide access to the edge of a network. The edge node 718 may include content storage 720 for storing content therein. An intermediate device 724 may be one of the devices described above in FIGS. 1-3 as the intermediate device 724 may be incorporated into various types of devices as mentioned above. The intermediate device 724 has content storage 726 associated therewith.

The content distribution system 710 may also be in communication with access points 730 that have content storage 732 associated therewith. The access points 730 may be an access point for accessing various types of networks including a wired or wireless network.

The content distribution system 710 may also be in communication with small cells 736. The small cells 736 may also be associated with content storage 738.

The content distribution system 710 may also be communication with a cable modem termination system 742. The cable modem termination system (CMTS) may also have content storage 744 associated therewith. A cloud system 750, having a content storage 752, may also be in communication with the content distribution system 710. It should be noted that all the nodes or devices 712-750 are illustrated in parallel. However, these devices may also be combinations of parallel and serial distribution points. For example, a Wi-Fi access point 730 may be located downstream of a network node 712 or an edge node 718. A plurality of user devices 760 may be located throughout the communication system. In this example, a number of user devices 760 are provided within the system. The user devices may be located at different portions of the system and may be associated with one or more of the nodes or devices 712-750.

The content distribution system 710 may also be in communication with the broadcast server 350 and the reverse cache proxy server 352. The broadcast server 350 and the reverse cache proxy server 352 are described above in FIG. 3.

Figure 8A:
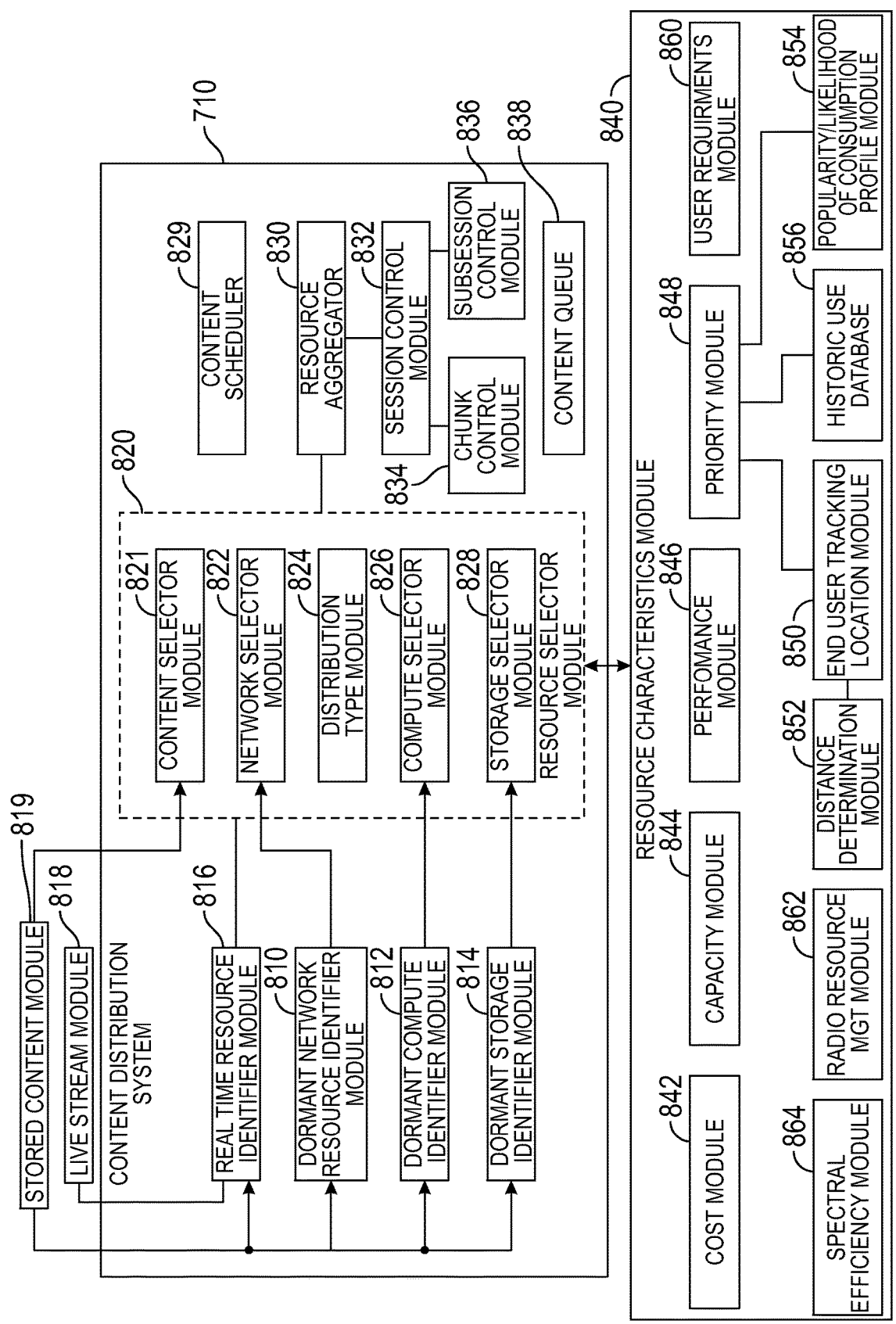
FIG. 8A is a block diagrammatic view of a content distribution system.

Referring now also to FIG. 8A, the content distribution system 710 is illustrated in further detail. The content distribution system 710 determines a combination of the compute, storage and network resources to communicate content and store the content therein. In another aspect, the content distribution system 710 also determines the communication resources to communicate the content from storage to the end user devices using dormant capacity. In this example, the system includes a dormant network resource identifier module 810, a dormant compute identifier module 812 and a dormant storage identifier module 814. The content distribution system 710, as illustrated in FIG. 7, is in communication with the various nodes and devices 712-750. Probe signals may be generated at the content distribution system 710 to obtain the network resources that are dormant, the compute resources that are dormant and the amount of storage that is dormant within the communication system. Each of the modules 810-814 may generate a probe signal. However, one probe signal may be sent for determining all the dormant resources within the network as provided in this example.

A real-time resource identifier module 816 is also incorporated into the content distribution system 710. In the present example, the real-time resource identifier module 816 is coupled to a live stream module 818 and a stored content module 819. The live stream module 818 is used for communicating live stream content to the user devices for real-time consumption. That is the live stream module 818 identified the content that is to be communicated using real-time resources identified by the real-time resource identifier module 816. Based upon various considerations as mentioned above and will be described in detail below, the content may be communicated in real-time using various network resources and types of distributions such as unicast or broadcast. In addition, the live stream module 818 together with the real-time resource identifier module 816 may allow devices that do not consume the live stream content in real-time to store the content. Various intermediate devices may store the content for later consumption by the intermediate device or transmission to the user devices within a local or unconstrained network or other user devices.

The stored content module 819 is in communication with the real-time resource identifier module 816 and the dormant network resource identifier module 810, dormant compute identifier module 812 and the dormant storage identifier module 814. The stored content identified by the stored content module 819 (identified content) may be communicated in real-time using regular network resources or dormant network resources.

A resource selector module 820 is used for selecting the resources for storing the content or communicating the stored content to an end user device or intermediate device. The resource selector module 820 includes a content selector module 821 for selecting content to be communicated through the network. Stored content from the stored content module 819 and live content from the live stream module 818 may be broadcasted to user devices and intermediate devices.

A network selector module 822 for communicating the network or networks through which the content is communicated in route to the content storage or from the content storage to an end user device.

The resource selector module 820 may also include a distribution type module 824. The distribution type module 824 may select the distribution type for the network. For example, the distribution type module 824 may select broadcast or unicast based upon various characteristics described below.

A compute selector module 826 is used for selecting the compute to be used for communicating the content to the content storage or communicating the content from the content storage to the end user. As mentioned above, the compute comprises the program or programs for applications used for storing the content or communicating the content to the end user.

A content scheduler 829 is used for scheduling a time for communicating the content. The content scheduler 829 may be used to schedule content into upcoming broadcast sessions or sub-sessions.

The resource selector module 820 may also include a storage selector module 828. The storage selector module selects the location for storing the content. The storage selector module 828 also selects the storage from which to communicate the content to the end user device. The determination of the resources is determined for a particular time in the network whether it is for content storage or for distribution to one or more end users.

It should be noted that the network selector module 822, the compute selector module 826 and the storage selector module 828 may select different resources from different parts 712-750 of the network. For example, the compute may be part of a cloud system 750 whereas the storage may be located associated with the network node 712. Likewise, the storage may be located in the cloud system 750 as the content storage 752 but the compute resource selected may be located in a physical location associated with a different component of the network 712-742.

The content distribution system 710 includes a resource aggregator 830. The resource aggregator 830 selects the network, compute and the storage resources for communicating content to the storage or communicating the content from the storage to the end user device. The resources, as mentioned above, may be aggregated from different positions within the network.

A resource characteristic module 840 is used for determining the resources at the resource selector module. The resource characteristic module 840 may provide a cost for providing the resource at the cost module 842. The cost module 842 may determine a dollar cost or an opportunity cost for providing content. Although a cost module 842 is illustrated within the content distribution system 710, each of the resources, such as the network, compute and storage, may provide cost data of costs to the content distribution system 710.

A capacity module 844 is used to determine the capacity of the network (spectrum) associated with the communication system and the capacity of the storage that is available throughout the network. The capacity module 844 may determine the total capacity of the system, e.g., the total spectral capacity of the wireless system. The dormant capacity may also be determined. As well, the capacity module 844 can determine or help determine home much capacity could be dedicated to broadcasting or unicasting (in various iterations described below). In a 4G or 5G system, the capacity may be measured by the physical resource blocks (PRBs) that are available for broadcast or unicast or a combination thereof.

A performance module 846 determines the performance of the resources of the system. For example, the performance module 846 may determine the transmission speed or throughput of a network, the speed at which the compute can store the content, and the speed that the content storage can store the content. The performance module 846 may obtain radio conditions such as throughput or network speed at a device from feedback signals from the devices themselves. Multiple devices may provide radio condition signals to the content distribution system 710 to obtain a broader view of the network conditions. Ultimately the conditions determined at the performance module 846 are used to determine the spectral efficiency and ultimately the net spectral efficiency or the maximum net spectral efficiency when spectral efficiencies are compared. The prior used spectral efficiency for a previous broadcast may be obtained. That is, the network settings for the spectral efficiency may be obtained.

A priority module 848 may determine actual demand and predict a future demand for a particular content or related content. The output of the priority module 848 may be in a user priority demand number. For example, a first number of user devices are demanding live content and a second number of user devices may request the content in the future (not in real-time). A consumption pattern for content may be determined based on various factors. The priority module 848 may be associated with or determine demand from a wish list for each of the devices within the network. The priority module 848 may also determine demand from a push list. provided by a content provider. A content provider may determine those certain users enjoy certain content. Devices may have content pushed to them in response to the push list. The push list may take into consideration past use, geographic area (location) and other considerations. The home location of the user may correspond to certain content such as sporting events. However, while travelling, other content relevant to the current location of the user device may be provided to a user. The priority module 848 may also be associated with an end user tracking and location module 850. The end user tracking location module 850 can track the mobile end user devices and the stationary end user devices to determine the amount of demand within a geographic area.

The priority module 848 may provide an overall or aggregated priority for a content. The priority module 848 may also provide a priority level for a user. Details for the priority is provided in more detail below.

A distance determination module 852 may determine a distance to the end user or the content storage system. The distance determination module 852 may also determine the distance from the content storage to an end user. By knowing the demand at the priority module 848, the geographic area of the demand and the potential movement of the end user devices, content may be strategically located and communicated. An example where this may be useful is in a particular neighborhood with a particular ethnicity or sports team affiliation. A content genre may be relevant more to certain geographic areas (geographic popularity). For example, a high school football game may be relevant to people within a limited number of square miles nearby a certain school. The location of the user may therefore be used to change the number of users. This is especially true in a system that is geographically distributed, and portions are served by different resources. The demand predictions for certain content may be for certain geographic areas.

A popularity/likelihood of consumption profile module 854 may also be communication with the priority module 848. The popularity/likelihood of consumption profile module 854 may determine a popularity and/or how likely it is for a user device to consume a particular content. The popularity of the content may be used to select content for broadcasting. The likelihood of consumption may be based on one or more of collaborative filtering, or demographics, use of content by others. Collaborative filtering considers interests or tastes of many users. Likelihood of consumption may be determined by collaborative filtering including determining actual consumption of similar content to the content, a prequel to the content, or sign-ups for similar content to the content, actual consumption of the content and actual consumption of the similar content to the content, the prequel to the content, or the sign-ups for similar content to the content by other users. User data corresponding to the interests, tastes and demographics of a user may allow the system to determine that the user of the device is in a particular gender, in a particular age group, in a particular ethnicity, and in a particular income and may be interested in a content and therefore likely to consume the content. Use-based likelihood of consumption may predict likelihood of consumption when other users watch similar content. "Watching" content is a form of actual consumption This may be combined with other users watching (consuming) similar content and then watching (consuming) the content in question. That is, another user device having watched similar content as others may also watch the content in question because others have. Content may be divided into parts. Parts of a series (episodes, prequels, sequels and the like) or parts of the content divided into smaller portions or chunks. Another indication of likelihood of consumption is the actual consumption of the first part of the content by other users. This may mean they may be likely to want to consume a second part. In addition, actual consumption of the second part of the content by other users may be used as part of the actual likelihood of consumption of further parts. The likelihood of consumption of parts of the content may be used as an indication that other users are more likely to consume the content. The popularity of a content may be determined from audience measurement or from a predictor of popularity as determined by a human entity. The popularity may be determined based on several users that have signed up for a content. For example, several users that have signed up to stream a real-time content or live-content. Popularity may also be determined based on past popularity of content that is similar. Similar content may be part of the same series of movies or programming, have the same genre, the same or similar actors and the like. Similar or the same genres may also be used to determine popularity for past popularity. Popularity could be determined from a wish list or wanted list as well. Users provide input on content they would like to view in the future in a wish list. Certain content may be inherently popular at certain times. For example, the providing of Olympic content during the Olympics may have an increased popularity. On Sundays in the United States, National Football League content may be more popular.

A historical use database 856 may store user participation for various content, content genres and content related to a particular content. A genre is for content are similar forms, style or subject matter. Examples include but are not limited to action, romantic comedies, comedies, drama, thriller, horror, historical, western and adventure Historical trends for certain content and genres of content may be used to predict future (non-real-time) user device consumption for particular content. For example, actual consumption of a prequel may indicate the popularity or likelihood of consumption of a certain content. As will be described below prepositioning as well as real-time predicting may use data in the historical database to determine the mode such as broadcast or unicast for content or a live stream.

A user requirements module 860 may also be incorporated within the resource characteristic module 840. The user requirements module 860 may associate various user requirements with each end user or end user device. The user requirements module 860 may include the definition of the service to which the subscriber has subscribed. For example, some users may value rapid response in terms of updating or providing content. This may signal the content distribution system 710 to locate the content closer to the end user.

The resource characteristic module 840 may also have an efficiency module that is used for determining a consolidated efficiency metrics that is used for the determination of which combination of resources to use. The costs per byte per user may be determined.

A radio resource management module 862 may also be included in the resource characteristic module 840. The radio resource management module 862 may take into consideration a service resource agreement from various service sources and various service level agreements from the devices and nodes 720-750 of FIG. 7 to determine whether to use a particular resource.

A spectral efficiency module 864 may be used to determine the efficiency of the spectrum used for each transmission choice. By determining the spectral efficiency of each transmission choice (a unicast spectral efficiency and a broadcast spectral efficiency), the appropriate transmission resources such as the network, the distribute type, the compute and the storage may be determined appropriately. The spectral efficiency and the capacity module 844 together with other data are used for making the selection of the appropriate resource at the resource selector module 820.

In summary, the content distribution system 710 determines, for any content to be distributed, the optimum combination of resources to leverage at a particular time. Real-time or live content distribution requires immediate resources that may be chosen as combinations of broadcast and unicast. Broadcasting may be used not only for real-time consumption but also for simultaneously populating storage devices in user devices or intermediate devices. In other considerations, if cost minimization is the prime consideration, positioning content as close to the user as possible (e.g., in an intermediate storage device in the home, office, or in the user's end device itself) might make the most sense. In this scenario, performance optimization is a natural by-product, since delivering the content from close to the device will maximize throughput and minimize latency and jitter effects.

On the other hand, if the piece of content has a high enough popularity level (i.e., a large number of users are likely to watch (consume) the content), it could make sense to locate the content a bit deeper in the system (e.g., in one of the access network nodes or even in the core cloud). In this case, even though the networking cost can be higher, it can be amortized across a larger number of paying users.

It is therefore helpful to view the decision determination in terms of a consolidated efficiency metric that enables the content distribution system 710 to decide which combination of resources to use. An example of a metric is cost/bit/user—or some equivalent of this. The cost/bit component reflects the price and performance aspect of the delivery option and normalizes the cost incurred relative to the performance rendered. The "User" denominator then normalizes the metric further, to factor in demand/popularity, and the number of users interested in the content.

In terms of a distribution and delivery strategy, various principles may be followed. Such principles may include pre-positioning content, using dormant network capacity (or, at least, the least expensive network path(s)), at one or more sites, edge nodes, home access points, or end user devices—the idea being to move content as close to the interested user population as possible, using free or inexpensive resources.

Another determination in the distribution and delivery strategy is leveraging the dormant storage and computing where the dormant storage is available in the system. The best location or locations for pre-positioning is determined in view of the cost and performance of the ultimate delivery to the end user device.

Another determination is picking the best time to pre-position content while factoring in available dormant capacity and the ability of the storage device to efficiently receive data to be pre-positioned. The location may also be a consideration. That is, communicating when the device is in strong radio conditions may be important. The end user device may be exposed to varying conditions when mobile. An example of a determination could be: does the distribution system deliver live from the network at the time of consumption, vs. store now at Location A and deliver at consumption time from A, vs. store now at Location B and deliver at consumption time from B, vs. store now at Location C and deliver at consumption time from C, and so on. Basically a "least cost route" option is set forth that factors in how many users can be covered from each location or route.

Another determination is the best network path to leverage to pre-position content in the device. When the user is ready to consume the content, delivery is enabled with minimal cost involved, e.g., if the caching was done at storage local to the user, network costs at consumption time would be zero or minimal.

In the following, a few use cases are presented. The first case is wishlist content. For wishlist content that is part of a user's wishlist (e.g., specific movies, episodes of a TV show etc.). The content distribution system 710 may determine that the optimal approach here is to pre-position this content to the user right away, after the user indicates that their desire for a particular content since the user does not need to immediately consume the content.

The content distribution system 710 may decide to pre-position or cache the content in, e.g., an intermediate storage device in the user's home, or in the end user device itself (if the user is known to regularly use a specific device to consume streaming content). The deeper in the content is positioned, the lower the eventual cost of delivery (e.g., delivery from local storage—no network costs involved) and the better the user's quality of experience.

When the content distribution system 710 determines that this content has a high enough popularity level, the content distribution system 710 may cache the content at a further upstream point in the network (relative to the end user devices), e.g., a base station, or a wireless network node. Upstream storage allows for the content to be available to a larger number of users. The content distribution system 710 may also decide to cache portions of the content bundle at different locations, e.g., position metadata, program information etc. locally on the end user device, and the core content further upstream. Such decisions may be performed at the resource aggregator 830.

In either case, the content distribution system 710 could make a decision to deliver content to any (or more than one) of the storage nodes mentioned earlier, based on the cost and performance tradeoff of such a delivery with the cost and performance of the storage and its compute. The likelihood of the storage being able to fulfill a real-time video serving request and the volume of users that would be addressable by the storage, may also be considered. For each potential content storage positioning location being considered, the content distribution system 710 considers the cost of storage, and (at the point of delivery to users) what the compute and network delivery costs would be. The popularity level (consequently how many users would have access to the content from each location) can also be factored in to a decision to deliver something using unicast delivery or broadcast delivery, since broadcast delivery is somewhat less efficient than unicast delivery to a single node, but much more efficient than unicast delivery when attempting to deliver something to multiple nodes simultaneously, since the delivery efficiency would be higher (and the cost would be effectively amortized) if a larger number of users can be serviced.

For example, if the cost of storage in the home is $1, the cost of real-time delivery is $10, and the cost of pre-positioning using dormant capacity is only $2, then the likelihood of video consumption (for example 50%) may be considered. The effective cost of real-time delivery compares to a $6 cost (($1+$2)/50%) of pre-positioning and subsequent serving given the likelihood of such an event. Now if this example is expanded, and the cost of pre-positioning using broadcast over dormant capacity is $6 (since less efficient for any 1 user), but 100 users can be addressed by the broadcast, and the likelihood of video consumption is 33% across the group of 100, then the effective cost of pre-positioning and subsequent serving given the likelihood of such an event drops to $3.18 (($1+$6/100)/33%). Finally, if the cost of storage in the home is entirely a sunk cost, and is shouldered by the user, the above costs or pre-positioning and subsequent serving drop further to $4 and $0.18, providing dramatic cost and performance (such as spectral efficiency) improvements.

For gaming applications, the content distribution system 710 may decide to pre-position or cache a gaming application requested by the user. In this case, the content distribution system 710 may place real-time-critical and bandwidth intensive components of the application such as but not limited to graphics data and intensive user interface and rendering components close to the user (e.g., in an intermediate storage device in the home, or in the user's commonly used gaming device(s)) and place the compute-intensive pieces further upstream, where a larger pool of compute and memory resources may be available. In this manner, the caching location can be used to store just a portion of the total content, application or web payload while the low-bandwidth portion of the payload can be served from the origin server, which may provide higher compute capacity.

Another use case is for pre-positioning software updates. A software service provider may need to do this from time to time. That is, software updates may be required for end user devices. Dormant network capacity may be used to preposition a software update in a user device or in an intermediate storage device close to the user. The user can incorporate the updates at a subsequent time of their choosing.

In general, the decision to pre-position content may be driven by a user, or users, placing the content on their wishlists in a reactive approach, or the content distribution system 710 may proactively decide to place the content in suitable locations based on the content's popularity profile relative to the population of user and specific personalized reference for any given use and hence, expected demand in the near future. Besides a wishlist, a content device indicator such as a selected voting button or selected content or the like may provide an indication or interest for a particular content. Content or a description of content may be selected or "liked" to show interest in a content. This may be part of the reactive approach. In every case, the content distribution system 710 will need to select the combination of storage and compute resources in the system based on various factors including candidate storage locations having the requisite storage capacity. Another factor is the cost of storage. Another factor is whether dormant (unused) storage space available at that location and whether the dormant capacity can be leveraged free of charge, or at a lower cost.

With respect to compute power similar factors may also be consider. These include if the location has sufficient compute power to support delivery of the service when the user chooses to consume the content. Also, a more upstream location, with a larger aggregate compute capacity may be chosen instead of a closer location.

With respect to the network when the user decides to consume the content, the network communications cost be at that point and for real-time consumption may be considered. The cost of pre-positioning distribution using dormant capacity and the dormant (unused) capacity available at that point in time may also be considered along with the relative cost of such distribution. The cost efficiency may also be considered for pre-positioning distribution using broadcasting or unicasting. Another consideration is how many other users are likely to be interested in the content.

Clearly, the trade-off factors here are compute or storage capacity and cost, vs. networking cost, and the content's popularity profile. Typically, upstream caching locations are likely to provide large storage and compute banks, suitable especially for compute-intensive applications. However, the networking expense could be higher (at the time of content consumption), and performance may be inferior (if the content has to traverse a long segment of the network). But, at the same time, a larger population of users could be served (population coverage), when the service delivery location chosen is further upstream.

The result of these determinations is that the content is cached at one or more locations in the system. Typically, an access network edge node (e.g., small cell, base station, access point) used as the caching location might provide more limited, and more expensive, compute and storage resources. However, the communication costs might be lower, and performance is likely to be better, compared to a more upstream location, because network backhaul costs and latencies are being cut out of the equation.

The related decision the content distribution system 710 must also select the mode of transport such as unicast or broadcast. If the pre-positioning location is in the network, a point-point (unicast) approach can be applied. If the decision is to locate the content in the user's end device or intermediate storage device in the home, the content distribution system 710 may decide to opportunistically push the content to multiple users (especially if the content's popularity profile is high) using a much more spectrally efficient broadcast approach when distributing the same data to multiple users at once.

When the user is ready to consume the content (i.e., requests delivery), the content distribution system 710 delivers from the most appropriate storage location. The content distribution system 710 will look at all points where the content is currently cached or is available (including the origin server in a cloud location) and determine the best location from which to deliver from based the communication system conditions at the time. The conditions include the network delivery cost from each candidate location and the current compute power available at the location, vs. the computing needs of the application. The content distribution system 710 then delivers the content using the best (possibly least expensive) network resources available that can handle the performance requirements. If delivery is from local storage, networking resources may not be needed.

The live streaming (consumption) case is a subset of the content delivery scenario described above. If the user is requesting content that has not been pre-positioned anywhere, the content distribution system 710 delivers it from the origin server in its cloud.

The radio resource management processing used by the distribution system 710 for a live broadcast has some differences from that used for pre-positioning of content for non-real-time consumption. The content distribution system 710 is programmed to perform a set of radio resource management determinations while contemplating the introduction of a broadcast session to carry the live stream. For live broadcasting (for real-time consumption), the target throughput is determined, and participating devices need to meet channel quality (radio conditions/metrics) requirements.

First, the distribution system 710 may pick a delivery bitrate for the broadcast. This is to at least equal the bitrate of the selected version of the audio/video to be live-streamed. The system will select a bitrate version of the multimedia content to be delivered—a high enough bitrate that delivers a high-quality user experience. The audio/video playout rate of the content on the device's client has to equal this recorded bit rate of the audio/video. Which means the delivery bitrate of the broadcast has to at least equal this recorded bitrate (buffering possibilities are limited in a live stream so the communications bitrate has to equal or exceed the playout or recorded bitrate).

The target throughput for the broadcast is at least equal the audio/video bitrate. This, in turn, determines the spectral efficiency level (i.e., modulation and coding scheme or MCS) to be used, given the spectral capacity (KHz of spectrum) available for use. The system, therefore, selects a target spectral efficiency level that enables the performance target (target throughput in this example) to be achieved. The spectral efficiency is the bits per second per frequency (bps/Hz) which in turn corresponds to a modulation and coding scheme. When the conditions are good, a high modulation can be used. Likewise, a higher coding scheme (fewer redundant bits) may be used. The spectral efficiency is related to the throughput such as the target throughput divided by the available capacity.

$$\text{Spectral efficiency (bits/s/Hz)} = \frac{\text{Target Throughput}}{\text{Available spectral capacity (Hz)}}$$

The available spectral capacity (spectrum) is determined by the content distribution system 12/710 based on the received capacity reports from the network. As mentioned above, the available capacity may be reduced by a margin to the target available capacity utilization goal. Capacity usage reported by the network could be expressed as % of total channel (e.g., cell) capacity; in which case, spectral capacity (Hz) can be derived by applying that percentage against total spectral capacity (Hz) available in the channel (or cell). The spectral efficiency level that is tolerable by the device (tolerable spectral efficiency) may be determined based on the radio channel metrics gathered from the device. The content distribution system 12/710 uses the radio channel quality of the device 16 (measured by signal strength, signal/noise-interference ratio (SINR), channel quality indicators, and other similar metrics) to determine a target modulation scheme and coding scheme (MCS) level for the device. The mapped MCS level reflects the highest modulation order that the particular device in its current radio conditions, can reliably demodulate; as well as the level of channel coding (forward error correction) that needs to be applied to correct errors. The determined MCS level can be directly translated to a spectral efficiency data value, and the content distribution system 12 combines spectral efficiency with available capacity (as outlined earlier) to target throughput. Note the target throughput may be determined for each device individually based on the radio conditions at each of the particular devices. In the present system all of the determinations may be done in the cloud (by the content distribution system 12 or 710) which effectively integrates radio quality information with content distribution specifics as a cross-layer optimization.

This, in turn, implies that the devices participating in the broadcast must be experiencing radio conditions at least as good as required to receive delivery at this target spectral efficiency level. A device whose radio conditions are weaker than the radio condition (quality) threshold level will receive a degraded user experience or receive no content at all since it will not be able to demodulate much of the signal being transmitted.

The distribution system 710 includes in a potential broadcast of this stream, from the pool of participating devices, only those that pass the radio quality threshold. The rest of the devices (the radio-disadvantaged devices) can stay on unicast.

Additionally, the distribution system 710 determines the most spectrally efficient transmission mode, i.e., the optimum combination of broadcast and unicast user group sizes, given the participating devices' radio conditions. The distribution system 710 evaluates overall spectral efficiency for each combination of broadcast and unicast user group sizes. As was described many iterations may be calculated before one is selected. This is described in detail below.

With unicast, radio resources (e.g., carrier frequency slices allocated across time slots and spatial layers) are allocated to each device, typically on a delivery-by-delivery basis. In other words, radio resources are allocated per device delivery. However, some devices may be in radio-advantaged conditions (i.e., higher radio metrics such as SNR/SINR/CQI), and, consequently, use fewer radio resources to achieve a given target throughput (i.e., are more spectrally efficient). (The use of Massive MIMO or broadcast beams can improve radio conditions of such devices). In contrast, devices on poorer radio channels will end up using more radio resources to achieve the same target throughput desired for delivery of the content in question.

With broadcast, the same set of radio resources is shared across all participating devices (for example, on a cell in a wireless system). Individual per-device radio resource allocation does not happen. Also, a common spectral efficiency level is used for data delivery across a session—to all participating devices. This is typically at a "middling" level (it can even be at a "least common denominator" level)—so that a large enough number of devices can receive the broadcast successfully. (Devices that are radio-disadvantaged enough to not tolerate this target broadcast spectral efficiency level will receive little or none of the content). Hence, a highly spectrally efficient unicasting device (i.e., having better radio conditions, and by itself, achieving throughputs with fewer radio resources) will typically experience a lower spectral efficiency when moved over to broadcast. On the other hand, the radio resource sharing feature of a broadcast raises overall spectral efficiency since more devices are being served using the same quantum of spectrum.

This tradeoff—between drop in per-device spectral efficiency for radio-advantaged users, vs. increased spectral efficiency from resource sharing is a factor to assess while making unicast vs. broadcast choices.

With this approach, the distribution system 710 determines the capacity (e.g., number of PRBs in a 4G/5G system) available to the live stream delivery. This can be a percentage that can be allocated to the broadcast. Based on the required delivery bitrate and capacity allocated to the broadcast, the target spectral efficiency is determined for the particular iteration. Given the target spectral efficiency, a list of devices that are able to participate in the broadcast (i.e., whose radio conditions are at least as good as required to receive delivery at this target spectral efficiency level) is determined. The remaining participating devices will need to receive the real-time or live content delivery via unicast. The net spectral efficiency for this combination of broadcast and unicast is determined (i.e., factoring in throughputs achieved for the broadcast and unicast deliveries, and total spectrum used up. This will be dependent on the target spectral efficiency for the broadcast component, and the spectral efficiency levels used for deliveries to the unicast devices).

The distribution system 710 will perform several iterations of the process, with each iteration factoring in a different percentage of the available spectral capacity being used for the broadcast part of the live stream. For example, the first iteration can assume 0% of capacity used for broadcast (i.e., the live stream is done entirely using unicast deliveries). Subsequent determinations may increase the percentage. The final iteration can factor in all (100%) of the available capacity being applied to the broadcast component of the live stream, i.e., no unicast deliveries for the live stream.

As part of delivery of the content, the content distribution system 710 may choose to opportunistically cache the content in targeted locations, which it retrieves to serve to any given requesting user at that time, in anticipation of future needs for the same content by other users. For example, in one example broadcasting may be consumed in real-time by various uses while intermediate devices or other user devices cache the content for later consumption. Further, the content may be post-positioned in an upstream node in a wireless network (e.g., a PDN Gateway or User Plane Function) but much closer to the user than the content origin server such that it can be delivered to a larger interested population of users (higher population coverage) from a closer point of access when the system is responding to a first user requesting such content and the system needing to retrieve such content from the content origin.

Figure 8B:
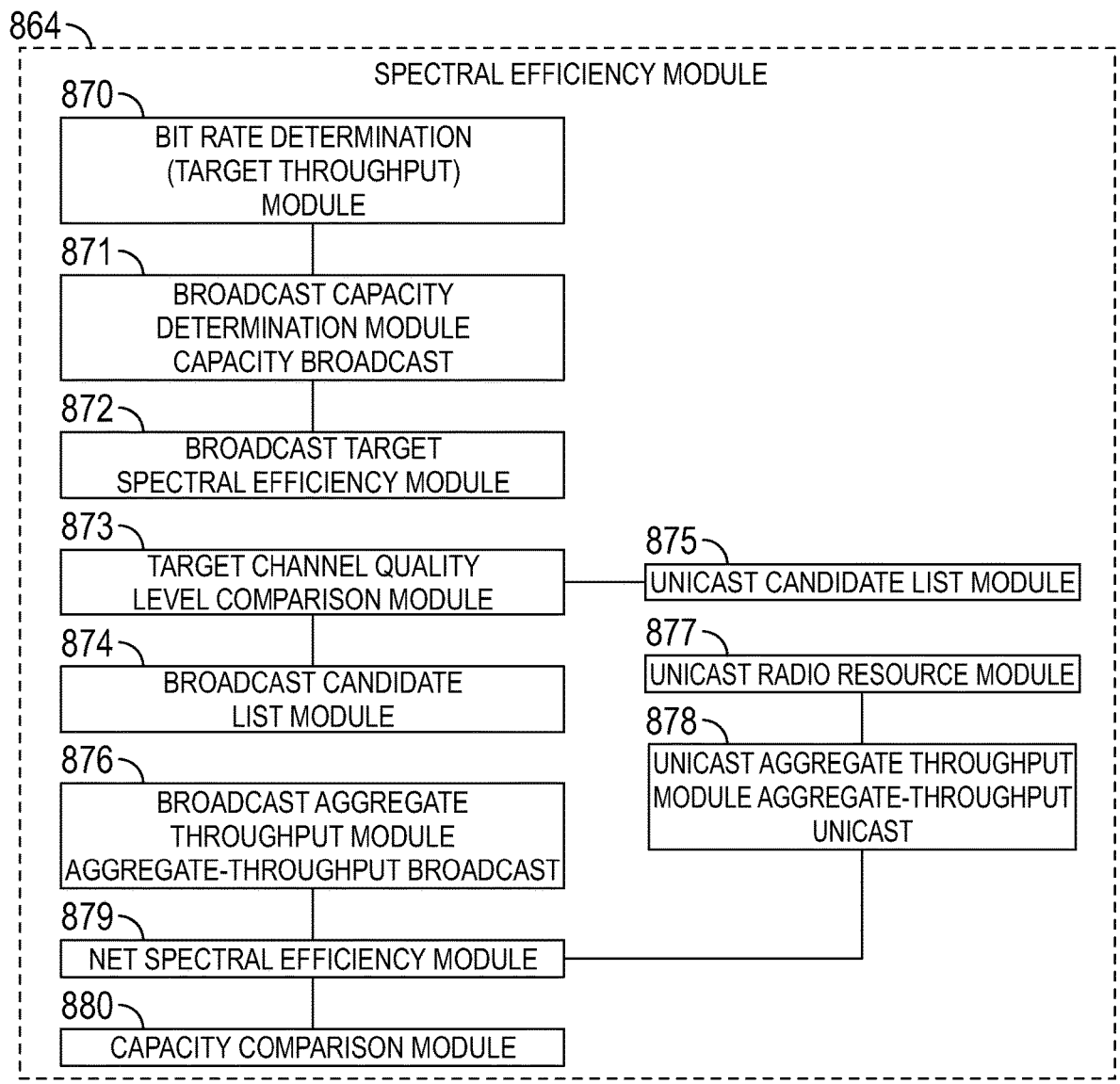
FIG. 8B is a block diagrammatic view of the spectral efficiency module of FIG. 8A.

Referring now to FIG. 8B, the spectral efficiency module 864 of FIG. 8A is set forth in further detail. In FIG. 8A, a bit rate determination module 870 is used to determine the target throughput. The target throughput may be chosen as the bit rate of the audio/video live stream.

The determinations below are performed in a number of iterations with each iteration factoring in a different (increasing in this example) percentage of the available spectral capacity being used for the broadcast part of the live stream. In this example, the first iteration or start iteration is determined with 0% used for broadcast, which means the live stream is done entirely using unicast deliveries. For a live stream, once the candidate list of "broadcastable" user devices is determined, the next step would be to determine whether a broadcast should be started up for the live stream delivery, the optimum distribution of capacity across broadcast and unicast deliveries, plus the optimum blend of broadcast user group size and unicast user group size. The optimum blend will result in the highest net spectral efficiency.

Each iteration loop determines the broadcast target spectral efficiency for each iteration. First the target spectral efficiency to be used for the broadcast delivery to generate the bitrate, based on spectrum available for broadcast (available spectrum) in this iteration. A broadcast determination module 871 is used for determining the broadcast capacity for each iteration.

$$\text{Capacity}_{Broadcast} = \% \text{ capacity used for broadcast in this iteration} * \text{wireless capacity (e.g., \#PRBs*Hz/PRB) available for the live stream delivery.}$$

Using the above, a broadcast target spectral efficiency module 872 determines the broadcast target spectral efficiency by:

$$\text{Target Spectral Efficiency(bits/s/Hz)} = \text{Target Throughput}/\text{Capacity}_{Broadcast}$$

A target channel quality level comparison module 873 compares the channel quality (radio metrics) of the potential broadcast only devices to a target channel quality level (target radio metrics). The radio metrics or channel quality level may, for example, be the signal to noise ratio, the signal inference to noise ratio or the channel quality indicator (CQI). The comparison allows only devices that have a high enough radio condition to reliable receive the content to be considered for receiving the broadcast signal. A broadcast candidate list module 874 provides a broadcast candidate list for the devices that exceed the target channel quality at the target channel quality level comparison module 873. Other devices that are to receive the live content that do not meet the channel quality level are provided in a unicast candidate list module 875.

Ultimately, a net spectral efficiency is determined. The net spectral efficiency, as further described below, has both a broadcast and unicast component.

For the broadcast component of the live stream, broadcast aggregate throughput module 876 determines an aggregate achievable throughput for the broadcast user group in the current iteration is given by:

$$\text{Aggregate-ThroughputBroadcast} = \text{Target Throughput} * (\text{\#devices in the current broadcast candidate list potentially participating in the live broadcast} + \text{a number of devices where content can be pre-positioned for future consumption} * \text{de-rating factor})$$

The aggregate achievable throughput considers the number of devices that would receive the broadcast real-time, as well as the number of devices that may be interested in future consumption of the content, and in which the content could be opportunistically pre-positioned in an intermediate device or a user device. Using the de-rating factor, a lower weight is applied to the number of devices considered for pre-positioning, as the marginal value of spectrum for real-time use would be higher than that for non-real-time (future) use—the latter being determined on a "likelihood of consumption" basis. The lower weight can be applied, for example, by de-rating the number of pre-positioned devices by a factor (less than 1 in value).

The multiplication by the number of devices is used to account for radio resource sharing since with broadcast, the assigned quantity of resources is shared by all participating devices. Broadcasting may use a lower per-device spectral efficiency level than could be used by radio-advantaged devices in unicast mode; but the resource-sharing aspect boosts net spectral efficiency.

For the unicast component of the live stream (unicast user group), the unicast radio resource module 877 determines the overall spectrum used by all the unicast devices (Capacity$_{unicast}$). The spectral aspect of each device is taken into consideration since each receives a separate signal that uses a separate piece of spectrum:

For each unicast device such as a user device, the quantum of radio resources required (e.g., spectrum from Physical Resource Blocks or PRBs in an LTE or 5G system) needed to achieve the target throughput for the live stream is determined based on the known spectral efficiency of the device being determined. The spectral efficiency for device-i (spectral efficiency at which the i-th device can receive the unicast delivery, based on its radio conditions) is given by:

Spectrum required(Capacity-RequiredDevice-i)=Target Throughput/Spectral EfficiencyDevice-i The sum of the resources for unicasting is thus determined by:

Capacity$_{Unicast}$=SUM(Capacity-RequiredDevice-i across all devices in unicast group)

An aggregate throughput module 878 determined the unicast aggregate throughput as:

The unicast aggregate throughput determined at the aggregate throughput module 878 is determined by:

Aggregate-ThroughputUnicast=Target Throughput*Number of Unicast devices

Taking into consideration both the broadcast aspect and the and the unicast aspect of the above, the net spectral efficiency module 879 determines the Net Spectral Efficiency by:

Net Spectral Efficiency=(Aggregate-ThroughputUnicast+Aggregate-ThroughputBroadcast)/(CapacityUnicast+CapacityBroadcast)

Thereafter, to ensure that total capacity requirement is within available capacity for the live stream the capacity comparison module 880 performs a comparison of the unicast and broadcast capacities and compares the sum with the available capacity:

When CapacityUnicast+CapacityBroadcast>Total Capacity available, the broadcast/unicast combination from the candidate list for the iteration id discarded. The next iteration of the loop using a different amount of broadcast percentage for the overall capacity is determined. In all, a plurality of blends has their net spectral efficiency determined.

The distribution type module 824 of the distribution system 710 then picks a mode blend from the iterations from above loop. The mode blend may, for example, be provided in terms of a percentage such as: broadcast capacity %, unicast capacity %. The blend that is chosen from the plurality of blends results in the highest net spectral efficiency.

If the selection reflects that a broadcast session needs to be started (i.e., the selected blend has a non-zero broadcast %) at a session control module 832 of FIG. 8A, the session control module 832 instruct the devices from the broadcast candidate list whose radio metrics such as SNR/SINR/CQI exceed Target Channel Quality level to shift to the broadcast session being set up, in the selected network. The session control module 832 keeps or instructs the non-broadcasting user devices in the unicast candidate list module to remain in or instructs them to receive the content in in unicast mode. Therefore, a blend of unicast receiving user devices and broadcast receiving user devices receive the same content transmission simultaneously in different modes.

The session control module 832 may be in communication with a chunk control module 834 that may fragment or divide larger content into content portions to be communicated. The chunk control module 834 may assign an identifier have a file name and a stop byte and an end byte that allows the content to be reassembled and to identify missing chunks.

A sub-session control module 836 may coordinate with the session control module 832 to control the content to be placed in the sub-sessions established under the network controller. Chunks of content determined by the chunk control module 834 may be sized to fit (or several to fit within each sub-session.

A content queue 838 is incorporated into the content distribution system 710. The content queue 838 may communicate content to user or intermediate devices in a particular order. The order may be based on a priority such as the interest in the content, popularity of the content and the like. The content queue 838 may be used for pre-positioning content to interested user devices using broadcasting as is described in further detail below.

The above process is described with respect to delivery of a live stream. A similar process performed at the distribution system may be used for migrating a live stream from unicast mode to a broadcast mode. The system can decide to migrate the stream to a broadcast mode in part or in full. That is, the system may continually perform determinations to see if broadcast and/or unicast transmission may be enable for the live stream. A combination of unicast transmissions and broadcast transmissions may be performed. Details of this process are described below. The same is also true for migrating a live stream from a broadcast to unicast. That is, because of various ongoing conditions, the use of unicast rather than broadcast may be desirable.

The system may also be applied to real-time consumption of stored audio/video content. That is, a user may request stored content that is pulled on-demand by a specific user at a specific time. In other words, the actions are not a live event that is time-synchronous to cross a population of users. Even if multiple user devices are viewing the same content simultaneously, grouping the user devices into a live broadcast stream is difficult since their views are not likely to be time-synchronized. When a user starts a stored content viewing stream, the other user devices may pause, rewind or otherwise manipulate the stream so that viewing at the same point is nearly impossible. However, when a user requests a stored content stream to be delivered in real-time, other devices may opportunistically receive the signal using the broadcast mode of the communication system.

Another use of the distribution system is for pre-positioning content in user devices for future consumption. A system that identifies the content generally desired by consumers that broadcast such content over the network in advance of the time it is desired to be consumed by consumers, store such content locally at a consumer premises or within an intermediate device. The final delivery to the user may be performed using a Wi-Fi home network and therefore the medium is constrained. Details of this will be described in further detailed below.

When the broadcast mode is selected or an ongoing transmission is switched from unicast broadcast mode, the distribution system 710 can select one or more out of all the available transmission networks. As mentioned above, various resources from the different networks may be selected by the resource selector module 820. However, the network selector 882 may be used to select a particular network. The best network may be chosen based upon a performance perspective, e.g., the one with the highest spectral efficiency. Multiple paths may also be accessed that are used to achieve the best performance. As mentioned above, a cost perspective may also be used in selecting the best network.

When selecting between different networks, the bandwidth across multiple networks, using multiple pathways available to the user, may be used simultaneously. As will be mentioned in more detail below, underutilized or dormant capacity may also be used for communicating content and live streams to the user devices. That is, when the regular use of a network is low on a consistent basis, the unused capacity may be used for communicating content. When real-time stream and consumption occurs, the distribution system 710 may choose a broadcast-centric network to deliver the broadcast. For example, a TV network may be used. Further, a low frequency band, such as 600 MHz, may be used because such frequencies communicate data and in longer ranges. Relative to an LTE or 5G network, off-loading various broadcasts to a TV broadcast system may be advantageous. The LTE or 5G wireless network may therefore be used to handle its regular load depending upon the time of day and traffic therethrough.

Figure 9:
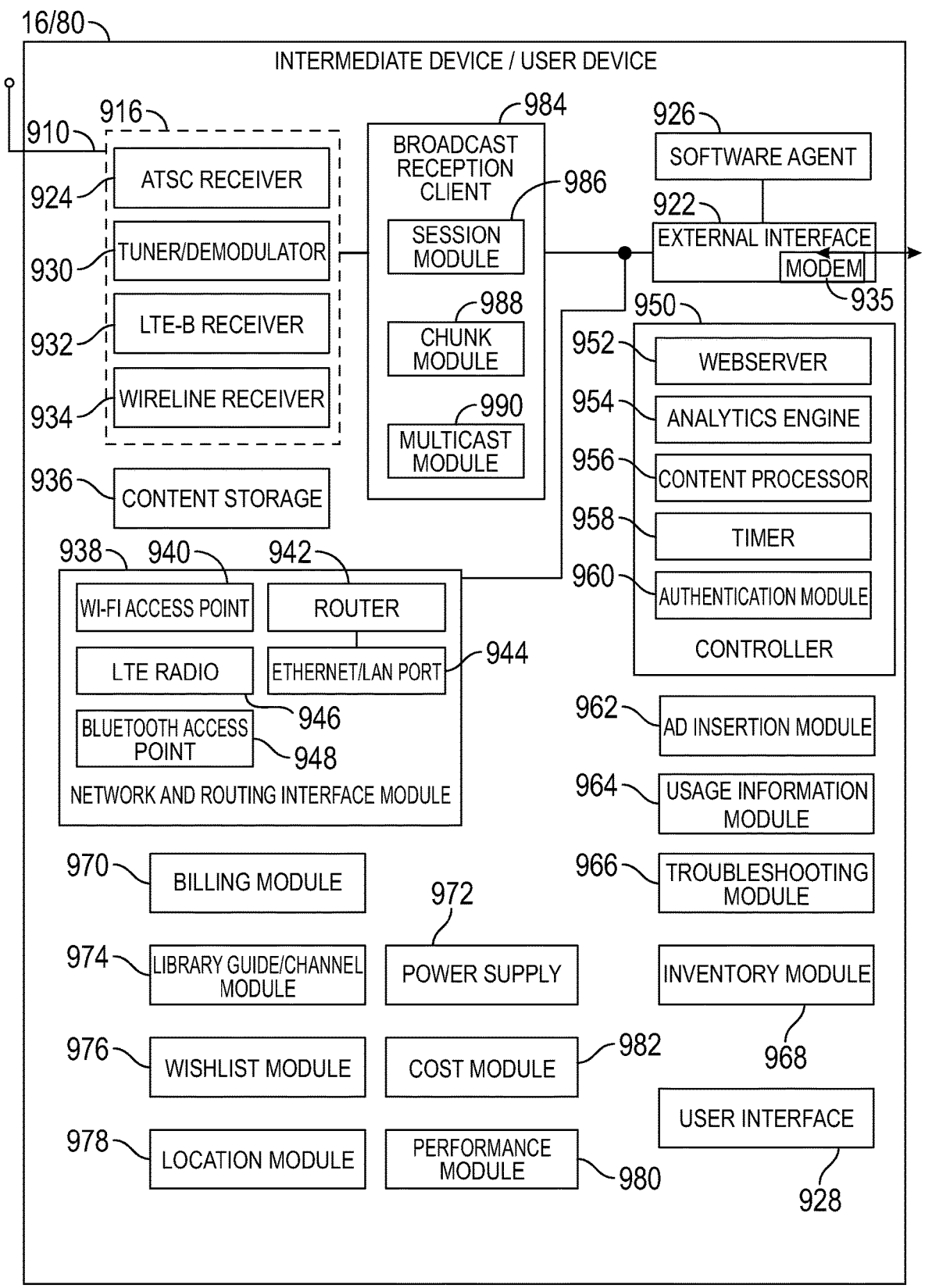
FIG. 9 is a block diagrammatic view of a device within system such as the intermediate device.

Referring now to FIG. 9, the intermediate device 16 or user device 80 is illustrated in further detail. However, the block diagram is also applicable to the node/devices 712-750 and an end user device 760 of FIG. 7, at least in part or in full and therefore specific block diagrams for those devices are not provided. An antenna 910 such as a television antenna or an LTE antenna may be used and interface with the interface 916. The interface 916 may thus be configured to receive LTE-B (eMBMS or MBSFN) or may interface with an ATSC receiver 924 or an LTE-B receiver 932 or for receiving over-the-air television signals with dormant capacity. The ATSC receiver 924 may be an ATSC 3.0 receiver. Thus, the intermediate device 16 may have a tuner demodulator 930 for tuning to and demodulating the signal received over an external input interface 922. A software agent 926 may communicate to and from the intermediate device 16/user device 80. Certain data may be required to be received in certain formats from different devices. Likewise, data can be communicated to other devices through the software agent 926. The software agent 926 may be an application used for requesting and receiving content for use, such as playback. A user interacts with the software agent 926 or application using the user interface to identify the content to be played back or data requested. More particularly, when the application is in a user device and the content or data is stored in an intermediate device and the user of the user device wants to use the data in non-real time (from the first time when it was stored in the intermediate device), a request for the content is made from the application at a second time. The second time is later than the first time and thus real-time consumption from the point of view of when the content is stored at the intermediate device is not performed. Non-real time consumption of the content or data at a first user device of the plurality of user devices is performed at a second time later than the first time. Later and in real time, the content or data from the intermediate storage device is communicated to the user device and is consumed at the user application and the user device immediately when requested. The content may be communicated through a local area network from the intermediate device to the requesting user device.

A user interface 928 such as a keyboard, a remote control, a mouse, a touchscreen, a button or buttons, a switch or switch, a dial or dials may be used to communicate to the intermediate device 16 or the user device 80. Content selections, wish list selections control selections may be controlled or indicated through the user interface 928.

The tuner demodulator 930 may also tune and demodulate the L-band signal or an ATSC signal received through the input interface 922. The tuner demodulator 930 may also have error correction therein such as forward error correction (FEC). The LTE-B receiver 932 for receiving external inputs from the interface 922. The LTE-B receiver 932 receives the broadcast signals over an ATSC system. A wireline receiver 934 may be used to receive networking traffic. The wireline receiver 934 may be a USB or HDMI interface.

The external interface 922 may also represent a connection to the Internet 18 through the wired or wireless communication network. That is, the external interface 922 may comprise a modem 935 for communicating content to the intermediate device 16/user device 80.

The intermediate device 16/user device 80 includes content storage 936 that is used to store content therein. The content storage 936 may include solid-state devices or a hard disk drive.

A networking and routing interface 938 may include various network and routing access points. For example, a Wi-Fi access point 940 may be used to interface with a router 942. However, the router 942 may also be used for wired communications using the Ethernet/LAN port 944. The networking and routing interface 938 may include an LTE radio 946 for communicating LTE radio signals from the device. The LTE-B receiver 932, as well as the LTE radio 946, may be incorporated into a signal unit. The intermediate device 16/user device 80 may also communicate using Bluetooth. That is, a Bluetooth access point 948 may be incorporated into the network and routing interface module 938.

The intermediate device 16/user device 80 may include a controller 950. The controller 950 may perform many functions, including as a web server 952, an analytics engine 954 and a content processor 956. Although individual interconnections are not illustrated in FIG. 9, the controller 950 may control the underlying timing and functions of the various modules within the intermediate device. The web server 952 may communicate content from the intermediate device in an IP format. The controller 950 may also tune to the data at predetermined times as determined by the timer 958. The timer 958 may be synchronized with various other intermediate devices within the system using GPS or internet-based time standard. The content processor 956 tunes to receive the content at predetermined times as a broadcast and/or a unicast, manages the storage of the content, verifies the integrity of the stored content and receives and manipulates manifest files, which provide instructions for downloading the content. The analytics engine 954 handles the intermediate device-based analytic functions for the system.

Neighboring intermediate or other devices may also receive and transmit from the intermediate device 16/user device 80. The network and routing interface 938 may communicate with other intermediate devices for receipt of content, content chunks or missing content at the content storage 936. Missing content may occur when network errors, hardware errors or weather prevent the content from being received at the content storage 936. Communication with other intermediate devices may take place using the web server 952 using an internet protocol.

The network and routing interface 938 may communicate a request signal to the communication system provider 12 or the content service provider 90 to request content chunks or missing content at the content storage 936. The communication system provider may communicate the requested content in a unicast manner using dormant capacity to the requesting intermediate device. A complete broadcast retransmission may also be performed in response to the request. Retransmission may occur if a significant number of intermediate devices request particular content.

An authentication module 960 may also be included within the controller 950. The authentication module 960 may communicate authentication signals to the communication system provider or for the content service provider so that the devices may intercommunicate properly. An unauthorized device may not be able to receive content from the communication system provider.

An ad insertion module 962 may be used for inserting ads at predetermined times during a broadcast. The ad insertion module 962 may splice ads based upon user preferences that are predefined. The ad insertion module 962 may act in response to a trigger for inserting advertisements that may be stored within the content storage 936.

A usage information module 964 may provide the communication system provider 12 or the content service provider 90 with information as to the usage of various information, content and programming within the intermediate device 16/user device 80. By providing the usage information, content of interest may be communicated to the intermediate device 16/user device 80. Usage information may also be data related to monitoring the utilization of the network that communicates the signals to the intermediate device 16/user device 80. The intermediate device or user device may provide to the distribution system with data regarding the use or downloading of certain content or content genres.

A troubleshooting module 966 is used for transmitting troubleshooting information over the outbound signals to the analytics engine for analysis to identify problems with sourcing video files or the installation of the intermediate device 16/user device 80.

An inventory module 968 stores an inventory of the content stored within the content storage 936. The inventory module 968 may also be used to remove content that has expired per the metadata received with the content. After the content expires, the inventory module 968 removes the content to free space within the content storage 936.

A billing module 970 may transmit billing information from the intermediate device 16/user device 80 to the content service provider 90. The billing module 970 may collect viewed content and other information to provide billing to the owners of the intermediate device 16/user device 80. The billing module 970 may also report inventory data from the inventory module 968 to the intermediate device.

The intermediate device 16/user device 80 may also include a power supply 972 for powering the various modules therein.

The intermediate device 16/user device 80 may also include a library guide/channel module 974. The library guide/channel module 974 will be described in further detail below. The library guide/channel module 974 may be used to assemble a program guide or virtual channel based upon the contents stored within the content storage 936.

The intermediate device 16/user device 80 may also include a wishlist module 976. The wishlist module 976 may allow the user of the intermediate device or other device to establish a wishlist for content to be received in the future. As mentioned above, the wishlist set forth in the wishlist module 976 allows the content distribution system 710 to pre-position desired content by the users.

A location module 978 may also be provided in the intermediate device 16/user device 80. The location module 978 may be coupled to a GPS of a mobile device. The location may vary due to movement and thus the delivery of content and the resources associated therewith may be adjusted as mentioned above. In a stationary device, the location module 978 may be configured during setup with an address. Both the wishlist module 976 and the location module 978 may be coupled to the content storage 936 for storing the data therein.

A performance module 980 may also be disposed within the intermediate device 16/user device 80. The performance module 980 may monitor the network conditions both upstream and downstream of the device. The performance module 980 may communicate back to the content distribution system 710 a signal that corresponds to the performance feedback or radio metrics of the communication network or networks. An efficiency metric may be determined that corresponds to the efficiency of that portion of the communication network associated with the particular device. The performance module 980 generates a data signal that provides data corresponding to the upstream or downstream efficiency of the network of the system around the particular component of the communication network. The efficiency metric data is communicated to the content distribution system 710. Examples of performance feedback or radio metrics include but are not limited to signal-to-noise ratio (SNR), signal-interference-to-noise ratio (SINR), channel quality indicator (CQI) and other related metrics.

A cost module 982 may also be incorporated into the intermediate device 16/user device 80. The cost module 982 may have a cost associated with the use of the network, a cost associated with the use of the compute, and a cost associated with the use of storage. The cost may vary depending upon the time of day and various system resources. The cost may be provided in monetary terms or in some relative data.

A broadcast reception client 984 may be used to receive the content communicated. For example, a broadcast session may be joined with joining signals communicated to the network or content distribution system 710. A session module may control which session and the joining of a session broadcast during a session. The session module may change the device 16/80 into various sub-sessions to receive the content. A chunk module 988 may keep track of chunks and determine when chunks are missing. The chunk module 988 may generate a chunk request signal with an identifier name and the chunk starting byte or some other identifier. A multicast module 990 may join a mulitcast by exchanging join signals to the content distribution system 710.

Figure 10:
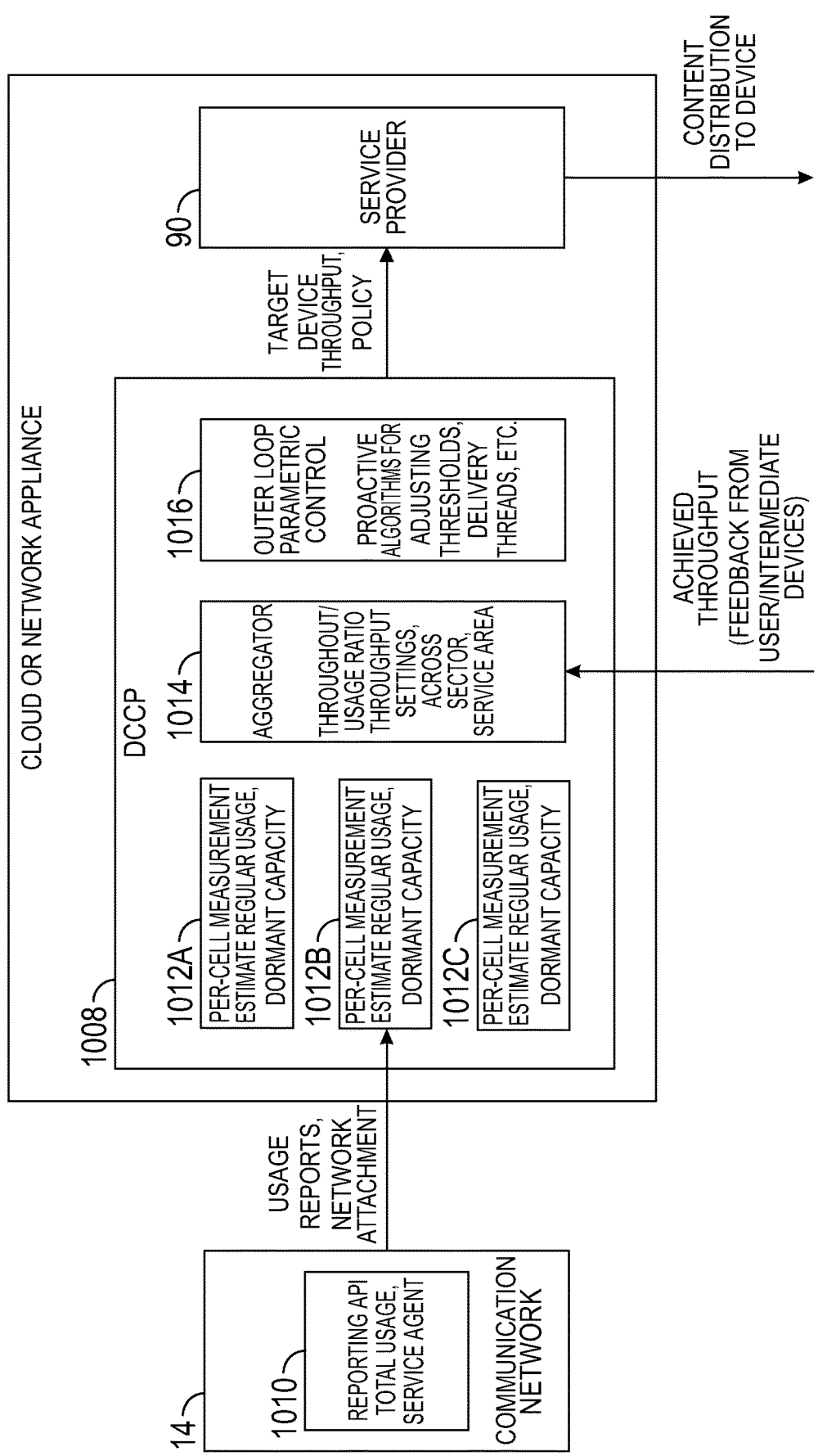
FIG. 10 is a high-level block diagrammatic view of a dormant capacity control protocol system.

Referring now to FIG. 10, dormant capacity can be capacity available outside of the capacity that is required to serve a similar type of traffic that is increasingly served during peak network use and served less-so during non-peak network use. Dormant capacity can also be capacity available for content pre-positioning at the intermediate devices or user devices and within their content storage and subsequent consumption of that content by users directly from the intermediate devices, and which is not the capacity required for real-time voice and data requests from users or for distribution of content to users and for its immediate consumption. To identify dormant capacity usage patterns of the "primary, non-dormant" network may be reviewed. Dormant capacity may be automatically identified on a real-time basis by receiving information as to the amount of network not being consumed for "primary, non-dormant" use. The identified capacity may be automatically provisioned for use as the dormant capacity in response thereto. "Primary, non-dormant" capacity may run in parallel to "dormant" capacity use such that both are running across the entirety of the resource the entirety of the time but assigning a lower QoS value or identifier to the dormant capacity use so that dormant capacity is only used whenever such resources are not being used by a higher QoS "primary, non-dormant" use such as broadcast communication networks such as cellular, television broadcast, cable television, satellite and the like.

The dormant content delivery system may also be used for delivering device, software and application updates that are associated with the intermediate device or user devices associated with the intermediate device. An inventory list may also include device identifiers, software identifiers and application identifiers. The inventory list may also list the devices associated with the various software and applications.

In FIG. 10, a dormant capacity control protocol (DCCP system) 1008 is used to harvest unused or dormant capacity in networks so that content is stored in the intermediate devices 16 or the devices 712-750 in locations close to where the user consumes the content using an unconstrained medium, such the local area network 310 (Wi-Fi, Ethernet etc.). In the example set forth below, the DCCP system 1008 manages dormant radio resources in a wireless cellular network. However, the teachings are equally applicable to other types of networks, such as satellite systems or combinations of different types of networks such as those described above.

The content distribution service of interest (referred to herewith as "service") provided by the content service provider 90 uses inputs from the DCCP system 1008 to determine how much data can be delivered and preposition content using dormant capacity. The goal is to leverage as much of dormant capacity as possible, without contending with regular network traffic at all. The system continually adjusts its operational parameters and capacity usage targets, based on metrics received from the network 14 and the intermediate devices 16, to provide elastic dormant capacity management. The desired dormant capacity may vary by time of day and may be determined by input from the operator of the communication system 12. For example, at certain times of the day more dormant capacity may be used as a buffer, such as in rush hour, than other times of the day such as after in the overnight hours.

DCCP system 1008 uses reports from a reporting application interface (API) the network 14 on resource usage to determine network capacity usage—and hence estimate available dormant capacity. The network capacity may be calibrated when no service data is being communicated. This may be performed at various times. In an exemplary cellular network, the capacity usage reports are communicated using report signals and may by provide data, for example, on physical resource block (PRB) usage within the radio network, received from the network 14 on a per-cell basis. For each cell of the plurality of cells of the service area of a network, a cell capacity usage report from the cell is obtained. An available capacity of the cell is determined based on the capacity usage report. A target available capacity utilization goal of the cell based on the available capacity may also be determined. When all the target available capacities of the cells are aggregated together, an overall target capacity utilization goal for the service area is determined.

In a cellular network, PRB usage is most effective as a capacity usage measurement metric, since it gives a concrete view of how much of a radio capacity of a cell is being used. DCCP system 1008 uses the metrics to determine the rate at which the service provider can deliver data to devices through the network 14.

The DCCP system 1008 uses resource or capacity usage reports to determine the total usage level in the network 14 (referred to herewith as "total usage"). The DCCP system 1008 also determines, from the report data, the level of the capacity of the network being used by regular traffic (e.g., in a wireless network, the percentage of a cell's radio resource blocks used by regular traffic). The regular capacity associated with the communication system provider is referred to as herewith as "regular usage". The DCCP system 1008 then determines the maximum dormant capacity (in this example, in terms of the percentage of network resources) available for use by the service provider 90. This is the available dormant capacity, which may be expressed as the percentage of the total or overall system capacity and is referred to herewith as a maximum dormant capacity) Max Dormant Capacity.

An upper bound can be used for the Max Dormant Capacity. For example, a 70% threshold could be employed, which means that the DCCP system 1008 will seek to maintain total usage within 70%, while staying as close to that upper bound as possible. In this example, the total usage amount is referred to as the "total usage threshold". Of course, absolute units of capacity may be used. By setting the threshold in this manner, sufficient buffer room in the network 14 accommodates sudden spikes in regular usage.

The upper bound provides a "breathing" or elasticity mechanism. That is, the increases or decreases of the network load are continuously monitored so the level of dormant capacity is continuously calibrated. The service provider 90 utilizes changing dormant capacity to the fullest extent possible while not causing contention with regular network traffic or creating disruptive traffic spikes. The maximum dormant capacity may be expressed as Max Dormant Capacity=total usage threshold−regular usage The DCCP system 1008 also uses the network reports to estimate the level of usage of network resources by the service provider 90 (referred to as "service usage"). In an exemplary cellular network, service usage would signify the average instantaneous percentage usage of a cell's capacity by the Service. The DCCP system 1008 measures the actual throughput (amount of data over time) achieved by each device such as a user device 80 or an intermediate device 16 (referred to from here on as "intermediate device") that receives a delivery during the reporting period. Each intermediate device 16 may communicate the throughput as an achieved throughput signal that is ultimately communicated to an aggregator 1014 of the DCCP system 1008.

Service usage can either be reported explicitly by the communication network 14 or can be estimated by DCCP system 1008 from total usage and regular usage, e.g., service usage=total usage−regular usage. If the communication network 14 reports to the DCCP system 1008 the total usage and regular usage for a reporting period, service usage can be accurately determined.

If only total usage is reported by the communication network 14, the DCCP system 1008 can estimate service usage in one of two ways. In the first way, a previously reported (by the communication network 14) accurate value of regular usage and subtracting this from total usage. This assumes that regular usage in the communication network has remained at that previously reported level since that reporting period. Regular usage may be determined by periodically measuring regular usage by deliberately not running service traffic (data) over defined intervals of time, and then measuring total usage during those periods. For those periods, regular usage=total usage. The periods of no service traffic may be referred to as Quality Control Gaps or (QC) Gap. The second way of determining service usage may be performed by applying that the system was attempting to target total usage at a level of (Max Dormant Capacity used in the current period+the previous period's regular usage) and using the delta ($\Delta$) between actual total usage (reported for the current period) and this target to estimate regular usage and service usage. For example:

Delta($\Delta$)(for this reporting period)=total usage−(Max Dormant Capacity used in Current Period+Previous Period's regular usage)

regular usage(for this period)=regular usage(previous period)+Delta*<Factor−1, e.g., ½> service usage(for this period)=Max Dormant Capacity used in Current Period+Delta*<(1−Factor−1), e.g., ½>

The "Max Dormant Capacity used in current period," in turn, is estimated based on the Max Dormant Capacity value determined at the end of the prior cycle, i.e., the Max Dormant Capacity target coming into the current cycle. This number is adjusted downwards, based on downtimes in the current cycle when deliveries did not occur, and based on any throttling the Network might have done. The premise is that the system went in with a Max Dormant Capacity target, and the assessed dormant capacity usage is lower if either the full delivery cycle was not leveraged, or if a lower throughput than target was achieved (throttling). Also, if during the current delivery period, if updated capacity reports were received from the network that resulted in the Max Dormant Capacity value being modified, a weighted average Max Dormant Capacity value (based on the various Max Dormant Capacity values used during different deliveries in this period) can be used.

The idea is that the usage delta is being "debited" to both regular usage and service usage. On one hand, the Delta is being (at least partially) attributed to regular usage having increased or decreased relative to the last accurately measured value. At the same time, the Delta is being (at least partially) added to or subtracted from the value of Max Dormant Capacity, which is being used as the target capacity having been used by the service, i.e., asserting that the Service has used more or less dormant capacity than was targeted.

With this approach, regular usage and service usage gets cumulatively adjusted period-to-period, based on the delta. This also means that Max Dormant Capacity is adjusted period-to-period, since Max Dormant Capacity=total usage threshold−regular usage.

The approach serves to continually adjust the operational settings of the DCCP system 1008 to counter spikes and dips in network capacity usage driven either by increases in regular network usage or service usage.

Throughput targets are set based on DCCP system 1008's learned correlation between achieved throughput and resource usage. DCCP system 1008 uses prior measurements of achieved throughput and resource utilization to establish a throughput to usage ratio. DCCP system 1008 then uses this ratio, in conjunction with available dormant capacity, to set and throttle throughputs to intermediate devices moving forward.

For unicast delivery, DCCP system 1008 learns the correlation between the achieved throughput for an intermediate device 16 and the network resource utilization for the delivery of content to that intermediate device 16 in prior reporting cycles. For a single cell wireless sector, for example, resource usage would be the usage in the cell of interest. For a multi-cell (multi-carrier) wireless sector, this would be the average resource usage across the cells in the sector. The throughput to usage ratio is an efficiency or radio metric that reflects the quality of radio conditions that the intermediate device 16 has been experiencing. The usage is resource usage (Percent or a fraction of the available cell capacity used). A higher ratio value would indicate more favorable radio conditions, since the intermediate device 16 is able to extract a higher throughput for a given level of resource usage. This ratio is combined with available dormant capacity to determine the throughput target to an intermediate device 16 for a given content delivery cycle. The throughput to usage ratio is continually refined and fine-tuned, based on continuous (cycle-by-cycle) measurements of throughput and resource usage.

The throughput to usage ratio and associated adjustment procedures provides another level of elasticity or "breathing" to the system. This approach uses continual measurements of network resource usage (by regular network traffic and by the service), as well as intermediate device throughputs, to fine-tune the ratio and continually calibrate target throughputs.

The associated content distribution service provider 90 may utilize unicast or broadcast transport schemes to deliver and preposition content to intermediate devices 16 using the dormant capacity. For example, modern cellular networks provide both broadcast and unicast transport types. With unicast, the service provider 90 delivers content to one device at a time. The service provider 90 can adopt a round-robin scheme to simulate broadcast delivery to devices. With broadcast, the same content stream is delivered to multiple devices simultaneously. Broadcast uses radio resources much more efficiently and delivers significantly improved spectral efficiency, since it uses the same set of radio resources to service many devices. The DCCP system 1008 manages dormant capacity to service both unicast and broadcast delivery approaches.

Within a delivery cycle, the DCCP system 1008 determines an appropriate mix of unicast and broadcast loads to be targeted by the service provider 90. This mix may be a proportion and can be managed to optimize for capacity (system throughput) or coverage. Such a decision would determine the broadcast/unicast "cutoff", i.e., the coverage threshold (e.g., signal strength, SINR) below which a particular device's link is deemed to be too weak for the device to be included in the broadcast group.

The proportion can be managed to optimize for capacity (system throughput) or coverage, or any other number of parameters including proportion of content to be delivered destined for one or a small number of intermediate devices, vs. proportion of content to be delivered destined to many intermediate devices, and the overall level of priority of that content. That is, if content to be delivered destined for one or a small number of intermediate devices becomes significantly higher priority than the content to be delivered to many intermediate devices, then unicast delivery can be used to deliver that content (since it's more efficient than broadcast for delivery to only one intermediate device or a small number of intermediate devices, until such priority is equalized, at which point broadcast can be used to deliver content to be delivered destined for many intermediate devices.

In essence, this becomes a linear optimization problem—optimizing the mix of number of devices included in the group, vis-a-vis the modulation and coding scheme (MCS) that can be applied to transmissions to the group (the MCS, in turn, directly influences the data rate), and the revenue obtainable to the service provider 90 from the service being delivered.

One dimension of the decision between broadcast and unicast may revolve around whether to choose a smaller broadcast group of devices with much better radio conditions (enabled for higher throughput covering fewer devices), and delegate the other devices to unicast, vs. choosing a larger broadcast group with a lower SNR/signal strength cutoff, enabled to receive lower throughput but covering a large number of devices—effectively maximizing the aggregate throughput achieved. The decision may be different for different communication system providers. One choice may be that may be used in determining broadcast versus unicast is when creating a smaller broadcast group of intermediate devices when significantly higher-fidelity conditions (receiving a higher modulation and coding scheme (MCS), higher throughput) maximizes system throughput. Higher MCS use translates to higher spectral efficiency. Another choice may be when creating a larger broadcast group of intermediate devices, some in slightly weaker radio conditions (i.e., having a lower cut-off) produce a higher throughput product. Broadcasting delivers higher overall spectral efficiency, given the same set of radio resources being used to serve several users. Hence, a larger broadcast/unicast split would increase spectral efficiency.

The linear optimization is an attempt to arrive at the right mix that produced the highest throughput and spectral efficiency.

Another dimension of the broadcast unicast mix decision may revolve around revenue maximization. That is, a smaller broadcast group of premium (high-paying) users may be prioritized when higher aggregate revenue from the content being served is higher. Conversely, a significantly larger group of lower-revenue users may be chosen to be unicasted when higher aggregate revenue is generated.

An additional constraint may be a predetermined upper broadcast capacity limit on the amount of broadcast capacity of the dormant capacity usable by the service provider 90 that is used. The predetermined upper broadcast capacity limit may be a percentage or fixed amount of system resources that are applied to broadcast (e.g., capping broadcast capacity of the dormant capacity at 60%+/−5% of total system capacity), which may be set forth as Target Broadcast Usage=*MIN*(Max Broadcast Usage, Max Dormant Capacity)

Unicast Service Traffic can then use the remaining dormant capacity

Target Unicast Usage=Max Dormant Capacity−target broadcast usage

Therefore, if unicast is the only delivery mode in use by the service provider 90, then:

Target Unicast Usage=Max Dormant Capacity

The DCCP system 1008 correlates past service usage to achieved end device throughput in a ratio, i.e., throughput to usage ratio=throughput achieved for an intermediate device/service usage or simply throughput to usage ratio.

The throughput to usage ratio is maintained separately for each intermediate device 16 and is an efficiency metric that reflects the radio conditions of the intermediate device 16 and, in a wireless network, the modulation and coding scheme level (MCS) that the intermediate device 16 is able to use. That is, if the intermediate device's signal-noise ratio (SNR) is high, the system is able to achieve a higher throughput with a given level of resource usage).

The DCCP system 1008 then uses the throughput to usage ratio, and available dormant capacity (Max Dormant Capacity), to set throughput targets ("target throughput") for all the intermediate devices for the next delivery cycle. The throughput targets can be per-device target throughputs for unicast (point-point) delivery, or an average target throughput for broadcast delivery. For example, target throughput=throughput/usage*target unicast usage.

The above calculation has a target unicast usage to achieve the target throughput, based on the known correlation between throughput and service usage. The service provider 90 then uses target throughput settings, derived from DCCP system 1008, to adjust service usage throughput dynamically to utilize available dormant capacity, maintaining total usage in the cell within an upper bound of the total usage threshold. The idea is to use as much of the dormant capacity as possible, without going over the total usage threshold and creating any contention with regular network users. The process continues, through each reporting/delivery cycle. At the start of each delivery cycle, target throughputs are used to regulate data flow to the intermediate devices. At the end of each delivery cycle, the resource or capacity usage report for the period enables DCCP system 1008 to determine actual service usage for the cycle and re-estimate the throughput to usage ratio per intermediate device. This may be done per cell and aggregated over the network to determine to total network usage. As described earlier, Max Dormant Capacity (and hence, target unicast usage) may also be adjusted period-to-period, based on adjustments made to regular usage.

A sudden spike in regular usage results in total usage spiking up (potentially exceeding total usage threshold). This can result in a higher service usage estimate than target unicast usage, and a lower throughput to usage ratio estimate for this cycle. In other words, the DCCP system 1008 sees more resources having been consumed to achieve the target throughput than earlier estimated (i.e., target unicast usage). At the same time, if regular usage is adjusted upwards, target unicast usage may also be reduced. Consequently, a lower target throughput setting is determined for the intermediate device than for the current delivery cycle. In this fashion, DCCP system 1008 self-corrects to bring down total usage to within the total usage threshold, moving forward. The converse happens if there is a sudden drop in regular usage, the throughput to usage ratio is increased, and a higher service throughput is targeted to fill the void.

The service usage determined for a cycle can be higher or lower than the target usage level (target unicast usage) because either: (a) regular usage spiked up or down, resulting in the calculated service usage going up or down; or (b) the prior throughput to usage ratio estimate was not accurate, and service usage was higher or lower than the dormant capacity target. In either case, DCCP system 1008 self-adjusts target throughput to correct the situation. This elasticity, or breathing mechanism, helps maintain total usage within bounds, while using as much of the dormant capacity as is desired.

The logic described above can be applied to a multi-cell (multi-carrier sector) scenario in a wireless network. If a sector has multiple carriers (service providers), each carrier is treated as a cell. A service provider 90 can turn on carrier aggregation in a multi-carrier sector, e.g., in an LTE or 5G network. The DCCP system 1008's multi-carrier handling factors in two dynamics: The intermediate device can move between carriers (cells) within the sector. This can manifest itself as a handover if the intermediate device is active and connected to the communication network. Here, the LTE network becomes immediately aware of the cell change and flags this to the service provider 90. The intermediate device can execute a cell reselection procedure and change cells, in the case where the intermediate device is not actively connected to the wireless network. In this case, the network does not immediately become aware of the cell change. Further, carrier aggregation can occur, i.e., the intermediate device can be simultaneously connected to, send through and receive from, more than one carrier (cell). In LTE, for example, this can happen dynamically—the Network can add cells to/remove cells from an intermediate device at any time. The decisions are typically made by the wireless network's scheduler The multi-cell nature of this scenario leads to the premise that the intermediate device has potential access to the full bandwidth of the sector, i.e., to all carriers in the sector. Two approaches are the possible sector averaging approach and multi-cell attachment aware approach.

In the sector averaging approach, the DCCP system 1008 does not depend on knowing precisely to which cells the intermediate device is connected. It assumes that each intermediate device receiving delivery has access to the overall bandwidth of the sector and uses sector-averaged values of the key resource usage parameters, i.e., target unicast usage, total usage, service usage and regular usage.

The DCCP system 1008 receives per-cell capacity usage reports from the network that are relative to the available cell capacity. The network also needs to inform DCCP system 1008 as to which cells (carriers) are configured for the sector, and the primary cell that an intermediate device 16 is connected.

DCCP system 1008 uses various parameters in its calculations and include but are not limited to total usage=average of total usage values for all carriers (cells) in the sector, regular usage=average of regular usage values for all carriers (cells) in the sector, service usage=(average of service usage values for all carriers (cells) in the sector)/number of intermediate devices simultaneously receiving delivery in the sector (the assumption here is that resource usage was shared equally amongst all the intermediate devices that received delivery). Another parameter is target unicast usage=average of target unicast usage values for all carriers (cells) in the sector. Yet another parameter may be throughput achieved=achieved throughput (measured by the system) by the intermediate device in a delivery cycle The numbers are used in the same calculations described generically in earlier sections—to derive throughput to usage ratios and target throughputs for intermediate devices.

The Multi-Cell Attachment Aware Approach factors in precise cell attachment awareness, i.e., DCCP system 1008 is aware of which cells (carriers) the intermediate device 16 is attached to at any given point in time. The assumption here is that the communication network 14 informs DCCP system 1008 when cells are added to and removed from the intermediate device's connection to the communication network 14.

In the Multi-Cell Attachment Aware Approach, the DCCP system 1008 determines per-device resource usage numbers based on measurements from the actual cells that the intermediate device has been connected. The DCCP system 1008 uses one of more of the following parameters in its calculations total usage=average of total usage values across the carriers (cells) the intermediate device has been connected to, regular usage=average of regular usage across the carriers (cells) the intermediate device has been connected to, service usage=average of service usage values across the carriers (cells) in the sector that the intermediate device is connected to, target unicast usage=average of target unicast usage values for all carriers (cells) in the sector and throughput achieved=achieved throughput (measured by the system) by the intermediate device in a delivery cycle.

The numbers are used in the same calculations described generically in earlier sections—to derive throughput to usage ratios and target throughputs for intermediate devices.

For purposes of adjusting targeted throughput, the intermediate device 16 is assumed to have access to the full dormant capacity in the sector, i.e., target unicast usage averaged across all cells in the sector.

Target throughput for an intermediate device for its next delivery period=target unicast usage*throughput/PRB The DCCP system 1008 also manages the number of active threads in the system. Each enabled thread can be considered to be a content delivery task and does round-robin delivery to the intermediate devices, delivering to one intermediate device at a time—a "simulated broadcast" scheme. The round-robin, threaded scheme is another level of protection, aimed at preventing traffic spikes and regular traffic being affected. The number of parallel threads enabled per sector will depend on the regular usage in the sector. An example of a thread allocation scheme is: if regular usage for the sector<a Lower threshold, light up (N−1) Threads, where N=number of carriers in the sector. If regular usage for the sector is between the Lower threshold and an Upper threshold, light up one Thread. If regular usage for the sector>the Upper threshold, then light up 0 Threads (i.e., the system is paused)

The DCCP system 1008 therefore provides an "outer layer" of control in the outer-loop policy control module 1016, modulating the use of capacity based on regular usage in the network. The thread management adds a layer of multi-carrier elasticity to the "breathing" provided by the base component of the algorithm. The threshold values are configurable and dynamically adjustable based on traffic load.

With broadcast delivery, the Service is able to serve multiple intermediate devices with the same content, using the same set of radio resources simultaneously. Hence, service usage leveraged by broadcast is exploited by multiple intermediate devices.

Broadcast functionality in wireless systems can also leverage simultaneous transmission of identical broadcast streams from multiple time-synchronized cells using the same radio channel The synchronized multi-cell transmissions are received and combined by a device to achieve a higher signal-noise ratio (SNR), especially for cell edge devices that can hear transmissions from multiple cells. This feature extends broadcast into a multi-cell transmission paradigm, enabling a larger number of devices to receive a broadcast with good quality. Such a set of cells synchronized for broadcast constitutes the service area.

When estimating dormant capacity availability for broadcast, the DCCP system 1008 considers all cells in a service area, which may be the average capacity of all the cells in the service area. How well an intermediate/user device is served by a broadcast session depends on: (a) the radio conditions the intermediate device is experiencing; and (b) the available capacity of the cells the intermediate device can access.

A related innovation relates to the service provider 90, while using the broadcast service of the communication network, the traffic load may be divided up into multiple broadcast sessions. In this example, a broadcast period consists of multiple broadcast sessions, each representing a portion of the content that the service provider 90 needs to download and preposition in the participating intermediate devices 16 in the service area. The service provider 90 establishes the broadcast sessions in the communication network 14, using available dormant capacity. This is done to make the process more granular, i.e., if the communication network is unable to support the total throughput requested, it will decline or close some sessions. However, not all sessions are declined.

At the start of a broadcast period, DCCP system 1008 determines available dormant capacity in the cells that comprise the service area and establishes the target throughput for the broadcast period. This target throughput is split across the broadcast sessions established by the service provider 90 through the communication network 14. In an ideal situation, each participating intermediate device 16 should receive the full target throughput. Realistically, this may not happen, because: (a) the intermediate device 16 may not successfully receive all broadcast sessions; and (b) the intermediate device 16 may not receive the full throughput of a session it has received.

One issue is the communication network 14 may decline one or more of the broadcast sessions the service provider 90 has requested to be established. This is part of admission control functionality typically supported by wireless networks. For example, if the service provider 90 has requested the establishment of 20 broadcast sessions at 1 Mbps each, the communication network 14 may decide to admit just 12 of the sessions. This can vary across the cells in the service area. For example, one cell may have the capacity to admit all 20 sessions, whereas another cell in the service area may only have the capacity to admit 15 sessions.

The disparity in the number of sessions may happen because the regular user traffic of the communication network requires enough capacity from the system, to allow for only 12 of the broadcast sessions to be carried out while preserving sufficient capacity for the rest of the regular user traffic. Therefore, some sessions may be admitted only by a subset of the cells in the service area; and hence may not be received by all intermediate devices 16 in the service area. Hence, a given intermediate device that is part of the broadcast period may receive only a subset of the sessions delivered. This occurs when one or more cells allows the establishment of a different number of sessions from the 20 requested, due to the contention with regular user traffic as described above. In this case, cells may have only 12, 15, or 18 or any other subset of 20 sessions admitted.

Similarly, the modulation and coding scheme (MCS) rate chosen for the broadcast in a given service area may effectively be deciphered by only a subset of the devices in a given cellular area. This may be as a result of the SINR of the individual devices in any given cell within the service area, providing for a device to effectively decode a certain MCS rate, or otherwise not be able to decode it due to inferior RF conditions. As such, the throughput achieved by the broadcast session across a cell, may be as high or lower, than the raise sent by the broadcast session. That is, if only 80% of the users are able to receive the 1 Mbps throughput in a session, the average throughput received by an intermediate device in this cell or broadcast session (as the average throughput across all participating intermediate devices in such cell or service area) will be 800 Kbps.

Average throughput received by the intermediate device 16 across a cell or service area then becomes an important metric and becomes an important factor in understanding efficiency or radio metric of a broadcast—as the % of the throughput sent by a session vs the throughput received by the group of devices. Further, it can then be learned how this efficiency of a broadcast session changes, depending on the MCS level chosen for the broadcast and the robustness of the SINRs of the participating devices. Separately, it can be learned how much the efficiency is dependent on the level of dormant capacity loading attempted vs the level of regular user traffic available across the service area.

Another useful feedback metric is coverage level, defined as the percentage of devices in the broadcast that experienced delivery failure rates of less than a defined threshold value.

At the start of a broadcast period, the DCCP system 1008 determines the Broadcast target throughput for the period. This can be done in different of ways including using a reasonable spectral efficiency target or the radio conditions at the intermediate device 16.

For the reasonable spectral efficiency target 1 bit/sec/Hz is often used as a thumb rule for wireless broadcast systems. The target is applied to target broadcast usage to determine Broadcast target throughput. In other words, multiply the total spectral bandwidth in the available radio resource blocks by the chosen spectral efficiency to get the target throughput. This can be done cell by cell in the service area, based on the available dormant capacity in each cell. A target throughput is thus derived per-cell. An aggregated target throughput value, across all the cells in the service area, then needs to be derived from the per-cell values. This is because the service provider 90 ultimately has to submit one target throughput value, per session, to the wireless network. The aggregation in the aggregator 1014 can be done in multiple ways, including but not limited to choosing the lowest number obtained across all the cells (least common denominator approach)—if coverage maximization is the goal; choosing the highest number obtained across all the cells (the Network can always scale the service back, cell-by-cell, if it cannot meet that requirement); or, determining an "adjusted mean" based on the spread of the individual per-cell throughput values.

The adjusted mean approach considers the throughput actually allocated to the service provider 90 by the communication network will lie somewhere between the requested target throughput value and the lowest throughput supportable across the cells in the service area. If the spread of the per-cell throughput values is high, the service could end up receiving a significantly lower throughput than the requested value. For example: if the target throughput values are spread between 10 Mbits/sec and 30 Mbits/sec, and the service provider 90 requests a mid-value of 20 Mbits/sec, the service provider 90 will realistically get a throughput somewhere between 10 and 20 Mbits/sec. This is because the cells with the higher available capacity levels (i.e., capable of providing greater than 20 Mbits/sec) will still only provide 20 Mbits/sec. However, the "less capable" cells will provide throughputs ranging from 10 to 20 Mbits/sec, depending on their available capacity (spectrum) levels. The available capacity may be the average capacity available from all the cells in the service area.

If, however, the spread is narrow (e.g., between 15 and 20 Mbits/sec), the service provider 90 will not get an allocation far removed from its requested rate. Therefore, taking this spread into account is helpful. The idea here is to choose a net throughput target higher than the average; the deviation from the mean being determined by the spread (standard deviation); the higher the standard deviation, the higher the selected value is above the mean. For example, choosing a value like (Mean+1 Standard Deviation) would make sense.

The target spectral efficiency level can subsequently be adjusted (for future broadcast periods), considering achieved throughput and coverage level feedback. For the next broadcast period, for the same service area, target spectral efficiency can be adjusted up or down based on the feedback collected.

A more deterministic approach uses measurements of the radio conditions of the intermediate device, to determine a deliverable throughput target more accurately. For each participating intermediate device, the radio channel quality (measured by signal strength, signal/noise-interference ratio (SINR), channel quality indicators, and other similar metrics) is used to determine a target modulation and coding scheme (MCS) level for the intermediate device.

The mapped MCS level reflects the highest modulation order that the intermediate device, in its current radio conditions, can reliably demodulate; as well as the level of channel coding (forward error correction) that needs to be applied to correct errors. The MCS level reflects the applicable spectral efficiency target and is converted to target throughput (for the intermediate device), based on the number of available radio resource blocks (available spectrum). Once this is done, the individual (per-device) target throughputs can be aggregated across all participating intermediate devices 16 in the service area. As explained for the earlier method, the aggregation may involve choosing the mean target throughput value across all the intermediate devices, choosing a least common denominator choice, i.e. the lowest of the per-intermediate device values calculated across all the intermediate devices, choosing a highest common denominator value, i.e. the highest of the per-intermediate device values calculated across all the intermediate devices, choosing an "adjusted mean" value, factoring in the spread across all per-intermediate device target throughput values.

Once the overall target throughput for a broadcast period is determined (Broadcast target throughput), this is divided into multiple parallel broadcast sessions within the period.

Target throughput per Session=Broadcast target throughput/Throughput per Session For example, if the overall throughput target is 20 Mbits/sec, and it is desired to run broadcast sessions with 1 Mbit/sec each, 20 identical broadcast sessions are started up.

At the end of a broadcast period, DCCP system 1008 determines achieved device throughputs and Coverage Level. DCCP system 1008 also determines the Resource Usage—per-cell, and average across the cells in the service area, for the broadcast period. Available dormant capacity is also updated at this point.

For parallel unicast sessions, the DCCP system 1008 continues to manage dormant capacity. Unicast sessions are handled as described earlier, but with the target unicast usage value being used for Max Dormant Capacity, at least while broadcast sessions are simultaneously occurring.

Adjustments Based on Regular Network Traffic Load

Regular metrics from the communication network 14 inform the DCCP system 1008 as to whether the regular traffic load in the network has gone significantly up or down.

If network load goes up significantly, DCCP system 1008 can shut down a number of broadcast sessions based on the estimated loading increase to form an alternate number of broadcast sessions. Conversely, new broadcast sessions can be started up if network load is seen to have reduced significantly.

Radio Measurements may be leveraged to fine-tune operation of the system. In addition to collecting and using radio resource usage metrics to manage dormant capacity (as explained so far), DCCP system 1008 can also leverage network quality measurements. For example, signal strength and signal-noise ratio measurements can be used. In some wireless systems, it is possible to obtain signal strength and signal-noise ratio metrics specific to unicast and broadcast, i.e., determine how well the intermediate device can receive unicast signals as well as broadcast signals combined from multiple cells. Additionally, metrics such as latency and jitter can factor in as well.

Measurements can be collected in at least two ways. The first is by having the participating intermediate device 16 collect the radio metrics (e.g., from the modem processing unit in the intermediate device) and conveying them (over-the-top) to the service provider functionality located at the other end of the communication network 14. The intermediate device 16, in many ways, provides the best eyes-and-ears, since it can quantify the precise quality of experience it is receiving.

By deploying a software agents 1012A-1012C in the radio access network, e.g., at the cell level—for example, in an eNodeB in a cellular network. The software agent 1012 here provides a variety of network-side measurements, including radio resource usage information, directly to the service provider 90. Such information may include the regular usage being consumed so that the dormant capacity may be ascertained therefrom.

The DCCP system 1008 leverages the metrics to refine its dormant capacity management. For example, DCCP system 1008 then uses signal strength and or signal-noise ratio measurements to derive the appropriate modulation and coding scheme (MCS) level that the radio network might use to deliver content to a given intermediate device. Using this projected MCS level, DCCP system 1008 can better quantify a target throughput to be used for the intermediate device.

For broadcast, the same scheme can be used to determine the possible MCS level for each participating intermediate device 16 in the service area, derive the average MCS level usable for that population of intermediate devices 16, and then use the MCS level to set a more accurate target throughput for the broadcast period.

Additionally, metrics such as latency and jitter can be used to further refine the understanding at the DCCP system 1008's of the radio conditions of the intermediate devices, and further fine-tune dormant capacity management.

The DCCP system 1008 has an outer-loop parametric control system as illustrated in FIG. 10. Key operational parameters that drive DCCP system 1008 operation such as total usage threshold and real usage thresholds for thread management are either configured (e.g., through a dashboard or programmatic API) or learned. A learning scheme uses historical data to determine day-of-week, time-of-day settings for the parameters. For example, total usage threshold values can be set for different times of the day, and different days of the week, by observing and storing past measurements of total usage, and assessing typical time-of-day, day-of-week total usage values.

In general, the DCCP system 1008 receives per-cell reports with the data described above from the communication network 14 and uses the metrics to estimate dormant capacity and service usage. The aggregator 1014 component then consolidates processing across sectors and service areas (for broadcast) and determines throughput to usage ratios and target throughputs (for intermediate devices or for broadcast periods). Feedback from the intermediate device 16 or 724 informs DCCP system 1008 on real throughput achieved by the intermediate devices 16 or 724. Finally, an outer-loop policy control module 1016 proactively configures the DCCP system 1008 operation with the parameters that drive its operation. The output from the DCCP system 1008 drives the operation of the service provider 90, informing the service as to when to start/pause/resume content delivery and what the target throughputs to intermediate devices are.

The DCCP system 1008 may be used for determining both broadcast and unicast for the mix of broadcast and unicast provided by the service provider 90. An optimum mix may be provided based upon the perimeters set forth above. The target throughput for a broadcast session using dormant capacity or unicast sessions is set forth.

The radio quality metric such as the signal strength or the signal to noise ratio are used to fine-tune the dormant capacity management and operational settings. Outer loop policy controls dynamically adjust the DCCP system operating parameters based upon feedback from the wireless network. The dynamic adjustment of thresholds such as the upper bound traffic usage threshold or the buffer may be changed. The DCCP for multiple unicast and broadcast cell configuration mode is provided. The system can accommodate a single-cell single carrier sector or sector with multiple carriers with or without carrier aggregation. The DCCP system 1008 for dual connectivity scenarios is enabled. Of course, the present system may be used with a variety of wireless technologies including LTE, 5G and satellite technologies.

Figure 11A:
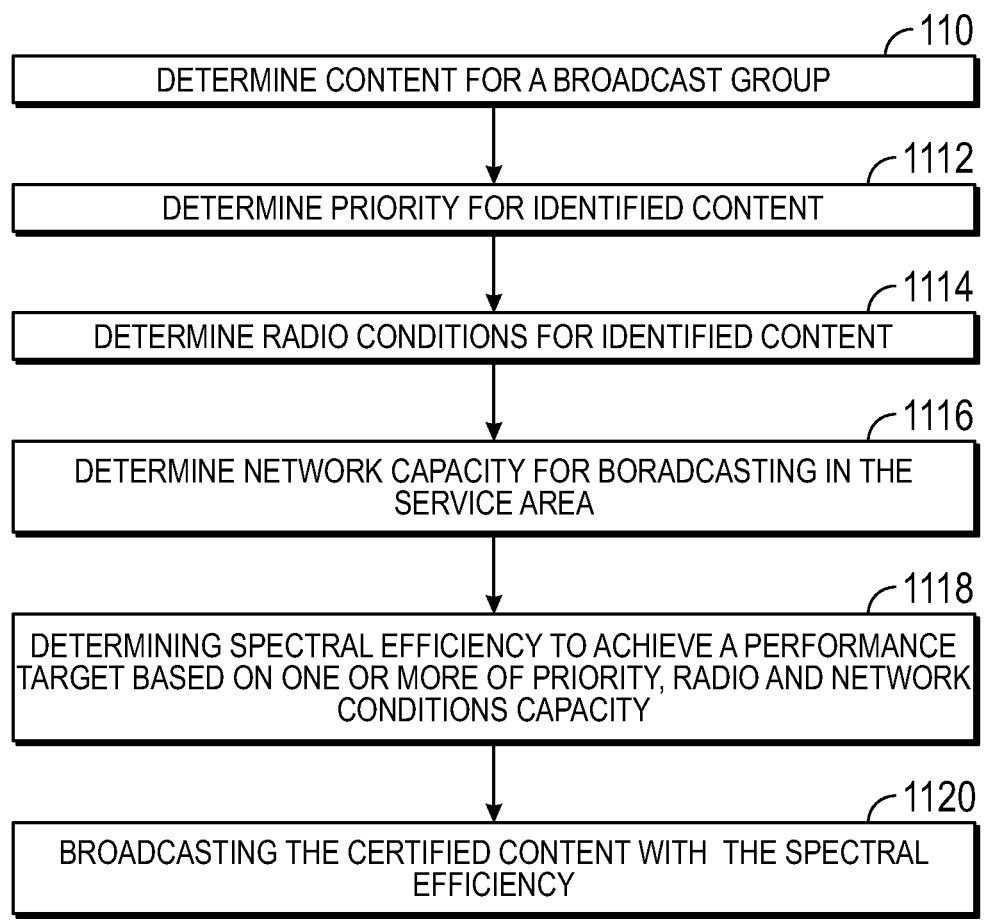
FIG. 11A is a high level flow chart of a method of adjusting spectral efficiency

Referring now to FIG. 11A, a high level method for determining a spectral efficiency to achieve a performance target is set forth. In content for a potential broadcast group is determined in step 1110. The identified content of step 1110 is for a broadcast to a broadcast group that has a plurality of devices in a service area of interest. There are many considerations alone or in combination that may be used to determine a spectral efficiency. In step 1112 a priority for the identified content for the plurality of devices is determined. The priority may be determined in in the priority module 848 described above. In step 1114 the radio conditions for each of the plurality of devices in the service area are determined. The radio conditions may include but are not limited to SNR, SINR, CQI. In step 1116 the available network capacity for broadcasting in the service area is determined. The available network capacity, the available network capacity reduced by a margin, and all or a portion of dormant capacity may be used for a broadcast. In step 1118 a spectral efficiency for the broadcast to achieve a performance target, such as target throughput is set. The spectral efficiency may be determined based on at least one of the priority for the identified content, the radio conditions, the available network capacity, and increasing or decreasing a size of the broadcast group. In step 1120 the identified content is broadcasted to the plurality of devices in the service area using the spectral efficiency for the broadcast. The broadcasting may be performed with dormant capacity or a portion thereof as well as to a user or intermediate device.

Figure 11B:
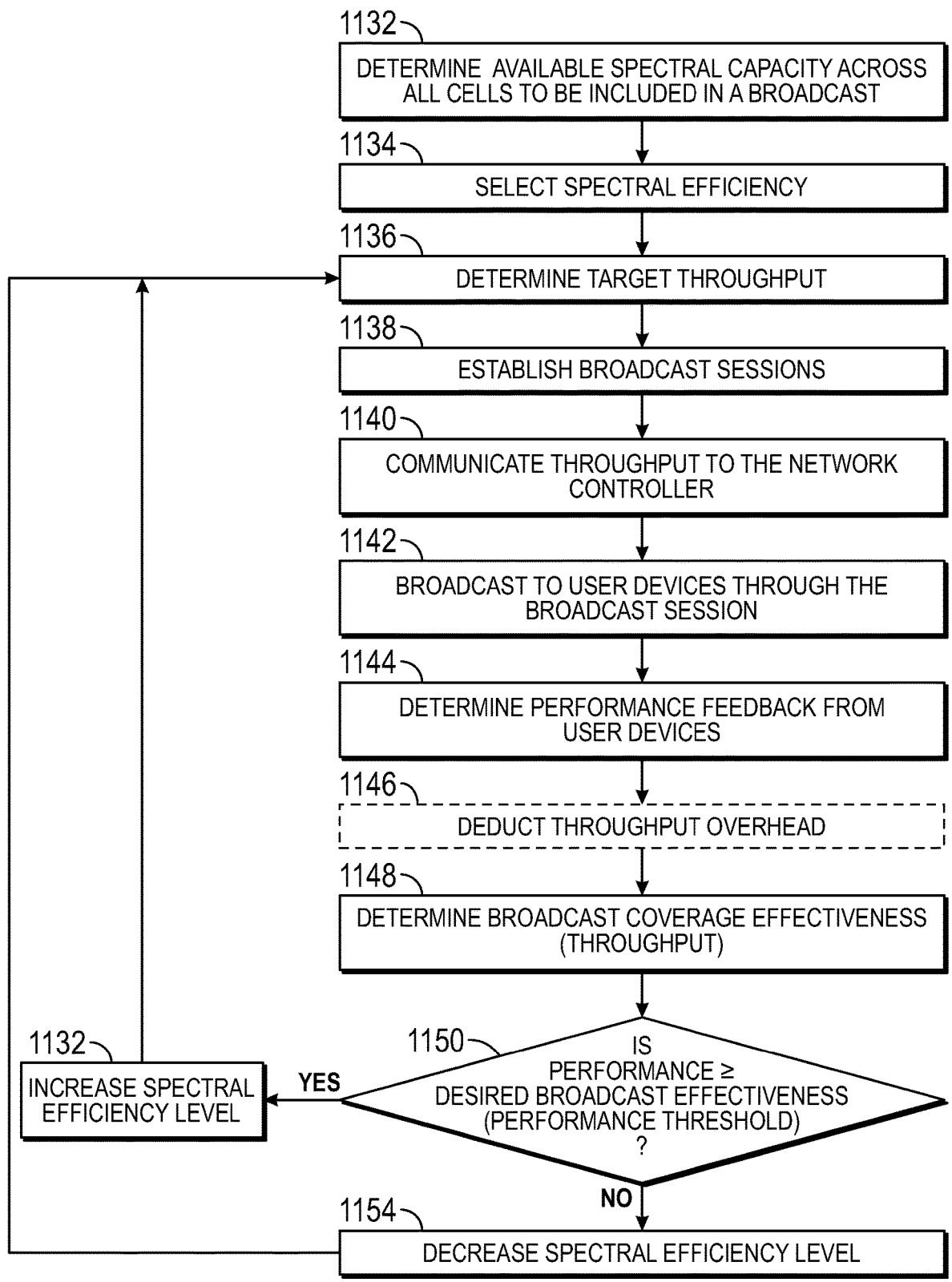
FIG. 11B is a flowchart of a semi-static approach to adjusting spectral efficiency.

Referring now to FIG. 11B, a more detailed semi-static method for adjusting spectral efficiency level of a broadcast. With the semi-static approach, the content distribution system 710 can select a spectral efficiency level (e.g., in bits/s/Hz or bps/Hz) to target for the broadcast as a whole. The target spectral efficiency level applies to all users targeted in the broadcast. This is, in fact, true for all users in the entire broadcast area, e.g., all cells in a broadcast Service Area in a 4G or 5G (or generation beyond) system.

The target spectral efficiency level can be picked based on thumb rules, for example, applied by wireless broadcast systems to ensure the bulk of the target user population receives the broadcast. The content distribution 710 system works with the communication network(s) 14 to determine the amount of wireless capacity available. This information can be used to calculate the target throughput for the broadcast session.

For example, in a 4G or 5G cellular system, for each included in the broadcast: Broadcast-Target-Throughput=Target-Spectral-Efficiency (bits/s/Hz)*Capacity-Available (Hz). In the following, an iterative method to determine the spectral efficiency to use for a broadcast is determined. The same method applies to a mulitcast.

In step 1132, an available spectral capacity for the network is determined. The available spectral capacity may be determined for all the cells in a service are for the broadcast or mulitcast. In step 1134 a spectral efficiency is selected. That is, a first spectral efficiency from a plurality of efficiencies to be tested is determined.

In step 1136 a target throughput is determined using the following:

Determine Target Throughput=Available spectral capacity (Hz)×spectral efficiency (bits/s/Hz). The target throughput would apply to each device that is able to receive the broadcast. Again, the overall target available capacity utilization goal for all the cells in the network may be the available spectral capacity (dormant capacity or a portion thereof) rather than the full available spectral capacity.

In step 1138, a broadcast session or sessions are established for communicating the content therethrough. The target throughput is communicated to the network controller in step 1140. In step 1142 the content is communicated to the user devices and intermediate devices based on the target throughput. The performance of the broadcast is provided from the user devices in step 1144. The received performance feedback may be the received throughput, the achieved available capacity utilization and the radio conditions at each user/intermediated device. In step 1146 an optional step of accounting for the system overhead may be performed. If needed, allowances can be made for overhead such as protocol headers and error detection/correction information. A percentage overhead can be deducted from the averaged broadcast target throughput, to allow for overhead to be added by the broadcast transmission system.

In step 1148, the average throughput is determined which is a measure of the broadcast effectiveness.

In step 1150 if the broadcast performance (average throughput) is greater than or equal to a desired throughput (a performance threshold) which is an indication of broadcast effectiveness, step 1152 increases the spectral efficiency for the next broadcast (an alternative or alternate spectral efficiency). In step 1150 when the broadcast performance (average throughput) is less than the desired throughput, step 1154 decreases the spectral efficiency for the next broadcast to an alternate spectral efficiency. After steps 1152 and 1154 the system continually repeats to adjust the spectral efficiency to an alternate spectral efficiency.

Figure 12:
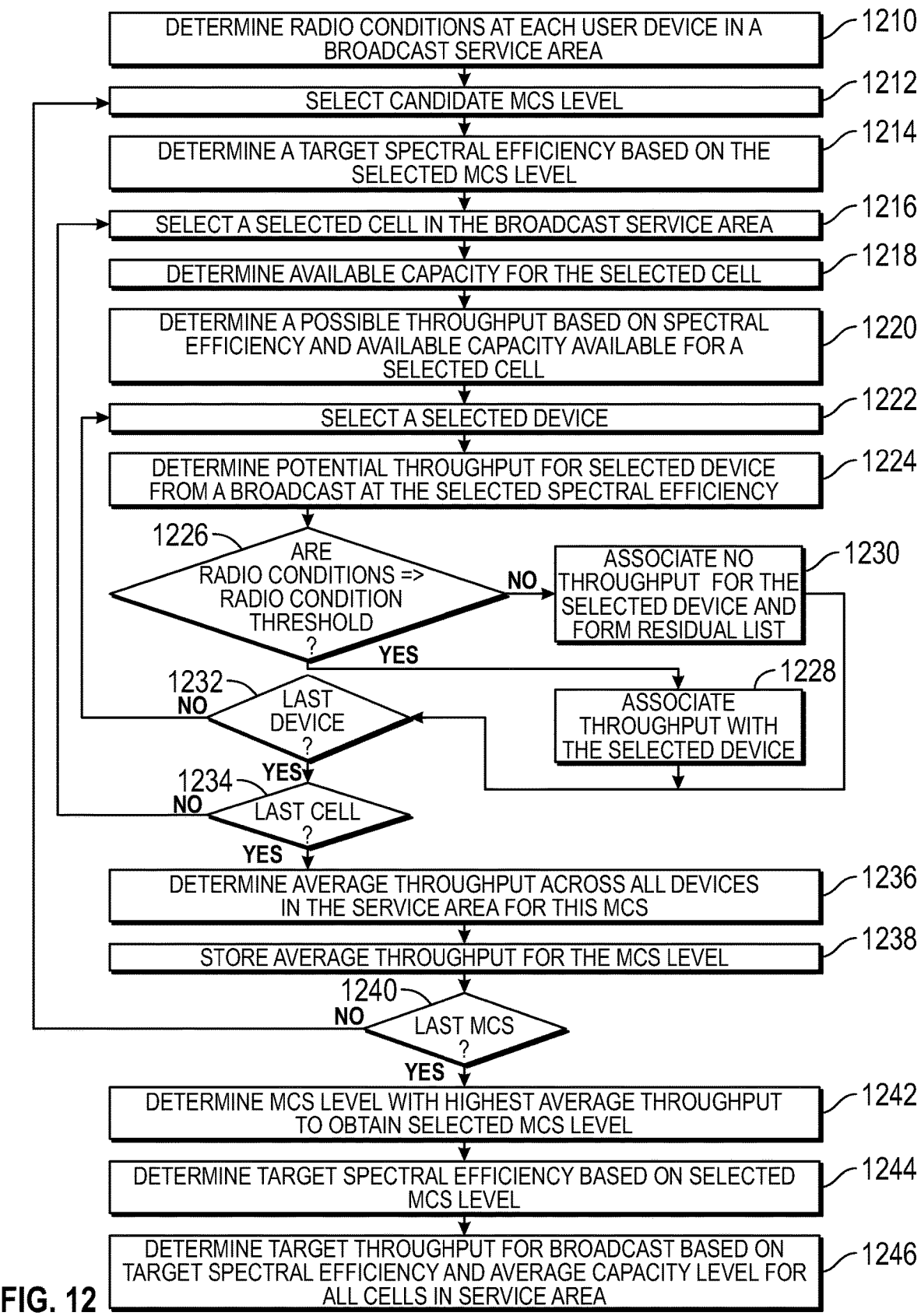
FIG. 12 is a flowchart of a method for dynamic throughput optimization.

Referring now to FIG. 12, the content distribution system 710 may use a dynamic approach to set the broadcast parameters. In this example, the content distribution system performs a set of radio resource management determinations to set the target throughput for the broadcast. In step 1210, the system 710 determines the radio conditions (radio channel quality feedback) from participating devices to determine the effective target spectral efficiency level for the broadcast. For example, signal strength and signal-noise ratio measurements can be used. In wireless systems such as 4G and 5G, it is possible to obtain signal strength and signal-noise ratio metrics specific to unicast and broadcast, i.e., determine how well a device is able to receive unicast signals as well as broadcast signals combined from multiple cells. Additionally, metrics such as latency and jitter can factor in as well. An "over-the-top" distribution system can obtain feedback from devices, reporting the radio conditions they are experiencing. Usable metrics may include signal strength, signal-noise ratio (SNR), signal-interference/noise ratio (SINR), channel quality indicator (CQI) and other related metrics. These types of measurements can be collected by having the participating device collect the radio metrics (e.g., from the modem processing unit in the device) and convey them (over-the-top) to the content distribution system 710 in the cloud. The device, in many ways, provides the best indication because it is able to quantify the precise quality of experience it is receiving. Another way to collect the radio metrics is by deploying a software agent 643A, 643B or 1012A-C in the radio access network, e.g., at the cell level—for example, in an eNodeB in a 4G system, or a gNodeB in a 5G network. The software agent here provides a variety of network-side measurements, including radio resource usage information, directly to the Service. As is described in more detail below, the system leverages these metrics to derive the appropriate modulation and coding scheme (MCS) level that each device can safely receive the transmission with. The better a device's radio channel, the higher the MCS or Spectral Efficiency level that can be used for transmitting to the device. The target Spectral Efficiency (e.g., in bits/s/Hz) for unicast delivery to a device could be derived from that device's Spectral Efficiency level. The spectral efficiency to be targeted for the broadcast as a whole can be derived by considering the MCS levels applicable to the different devices in the broadcast's target user population. Additionally, metrics such as latency and jitter can be used to further refine DCCP's understanding of Devices' radio conditions, and further fine-tune dormant capacity management.

Figure 13:
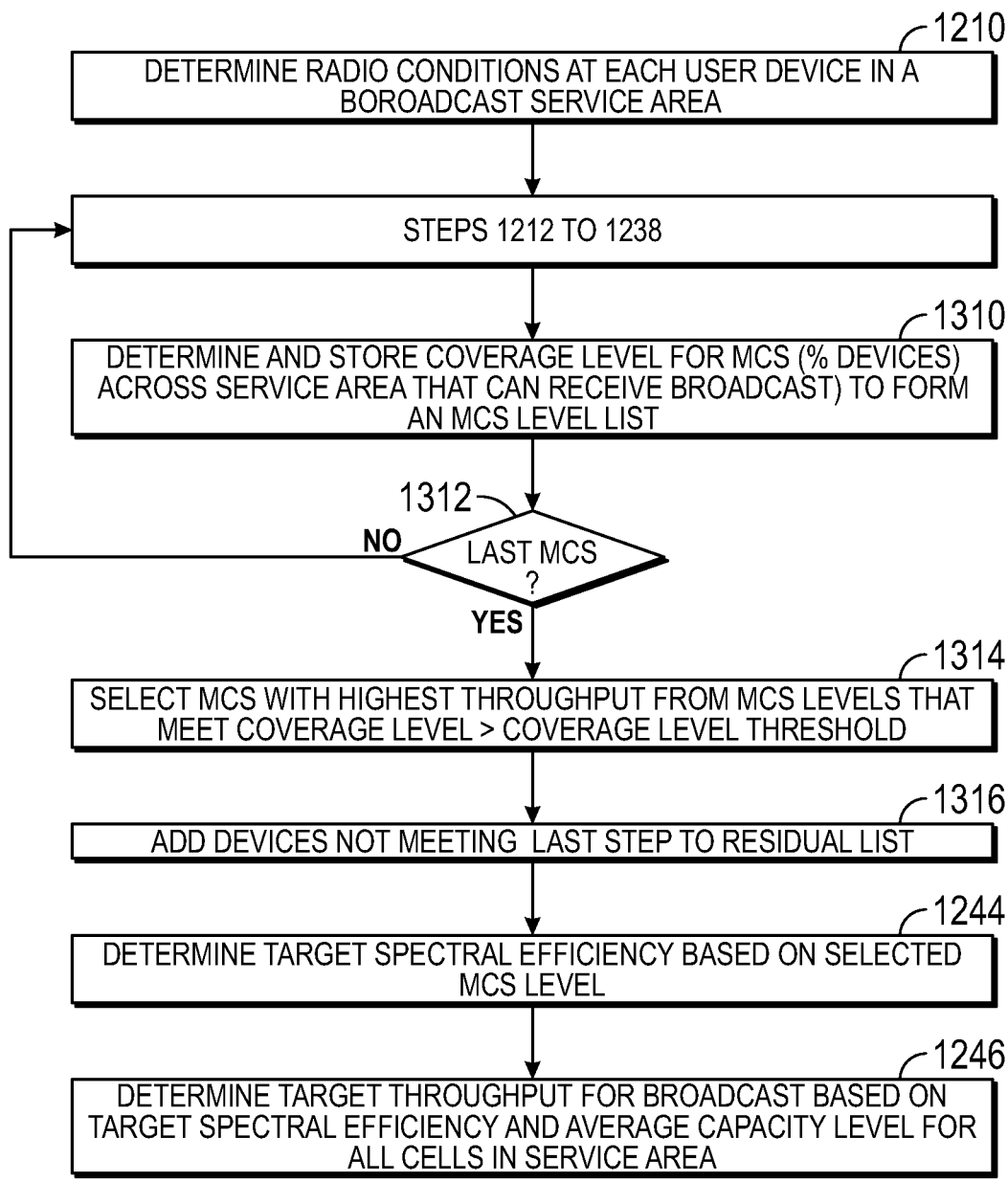
FIG. 13 is a flowchart of a method for determining throughput using a coverage threshold approach.

In FIG. 12 a throughput optimization approach is performed. In FIG. 13 below a coverage threshold approach is performed. With the throughput optimization approach, the distribution system picks the MCS Level (out of all possible MCS levels) that provides the maximum average throughput across all target devices in the broadcast service area. In step 1212 a candidate a candidate MCS level is selected. In step 1214 a target spectral efficiency based on the selected candidate MCS level is determined. For example, in a 4G or 5G system, spectral efficiency (SE) (bits/s/Hz) can be calculated=((Symbol Rate per subcarrier*bits/symbol)*Coding Rate)/bandwidth (Hz) per subcarrier.

The below determinations are performed for every cell and every device within a cell. In step 1216 a selected cell is selected. In step 1218, the available capacity for the selected cell is determined. In step 1220 the throughput possible (possible throughput) for the selected cell based on the target SE level from step 1214 and the capacity available for the broadcast in this cell is set forth by:

Throughput=Spectral-Efficiency(bits/s/Hz)*Capacity-Available (Hz)

In step 1222 a selected device within the selected cell is selected for analysis. In step 1224 the potential throughputs that each device would be able to receive is determined at the target spectral efficiency is determined. In step 1226, the radio conditions of the selected device are compared to a radio condition threshold that corresponds to a radio condition needed to receive content at the target spectral efficiency then the throughput for the device is set to that of step 1220 (the possible throughput) is associated with the device in step 1228. In step 1230 no throughput is associated with the selected device when the radio conditions are not above the radio condition threshold and a residual list is formed in step 1226. The residual list of devices (those devices that cannot receive the broadcast because their radio conditions fall below that required by the chosen SE level) can be delivered to real-time via unicast (for real-time consumption) or can be unicasted or broadcasted to later (if this delivery is for non-real-time consumption, as in a file download or a content pre-positioning scenarios).

In step 1232 when the last device has been analyzed, steps 1222 through 1230 are performed for the other devices in the cell. When the last device is selected in step 1232 it is determined whether the last cell has been analyzed. When the last cell has not been analyzed in step 1234 steps 1216 through 1234 are again performed so that all the cells and all the devices within the cells are analyzed based on the capacity of the selected cells.

For each MCS level, step 1236 is performed. In step 1236 the average device throughput for all the devices within all the cells at the target spectral capacity is determined for each of the candidate MCS levels. In step 1238, the average throughput for the MCS level is stored in the content distribution system. In step 1238, determined whether the last MCS level has been checked, period. In step 1240, when the last MCS level has not been checked, steps 1212 through 1240 are performed. In step 1240 when the last MCS level has been checked, step 1242 is performed. Step 1242 determines the MCS level with the highest average throughput is determined to obtain the selected modulation and coding stream (MCS) level.

In step 1244, the target spectral efficiency is calculated based upon the selected MCS level. In step 1246, the target throughput for the broadcast is based on the target spectral efficiency determined in step 1244 and the capacity level for all the cells in the area.

In general, if a high spectral efficiency (SE) level for the broadcast is chosen, devices that have radio conditions at or better than needed to receive at that SE level will receive throughput corresponding to the target SE. But devices that are in weaker radio states may get little or no throughput. Hence, the "good" devices get high throughputs vs. a significant number of "weaker" devices getting little or nothing. On the other hand, if a low SE target is chosen to cover a larger number of devices, many devices including the really "strong" devices, will receive the lower throughput.

The method may be applied to specifically selected (discrete) MCS levels, or to a continuum of MCS Levels optimized using a solver, artificial intelligence or machine learning. Optimization schemes involve a tradeoff between applying a higher Spectral Efficiency to a smaller set of target devices (that can receive effectively at that SE level), vs. targeting a lower throughput towards a larger population coverage of target devices.

Referring now to FIG. 13, a coverage threshold optimized approach is set forth. A coverage-optimized approach seeks a desired broadcast coverage level, while optimizing throughput at the achieved coverage level. The coverage level is defined as the % of targeted users receiving the broadcast with a packet error rate of <X %. For example, a system may require that 80% of the targeted users receive the broadcast with a packet error rate of <10%. This involves finding the MCS and spectral efficiency level that achieves highest average throughput at or above the coverage threshold. For a 4G or 5G system the method performs the same steps 1210 to 1234 as in FIG. 12. After step 1238 the coverage level for this MCS Level (% devices across Service Area that can receive the broadcast) is determined and stored at the content distribution system in step 1310 to form am MCS level list that includes a list of MCS levels that meet the coverage threshold. Thereafter, when further MCS levels are available in step 1312, step 1312 is again performed. When the last MCS level has been evaluated, step 1314. The MCS level with the highest average throughput is selected from the list of MCS levels that meets coverage threshold (for which Coverage Level>Coverage Threshold). In step 1316, devices not meeting the coverage standard are added to the residual list. That is, the residual list had the low throughput devices from step 1230 and the devices where the MSC level does not meet the coverage level.

After step 1316, steps 1244 and 1246 from FIG. 12 are performed

Figure 14A:
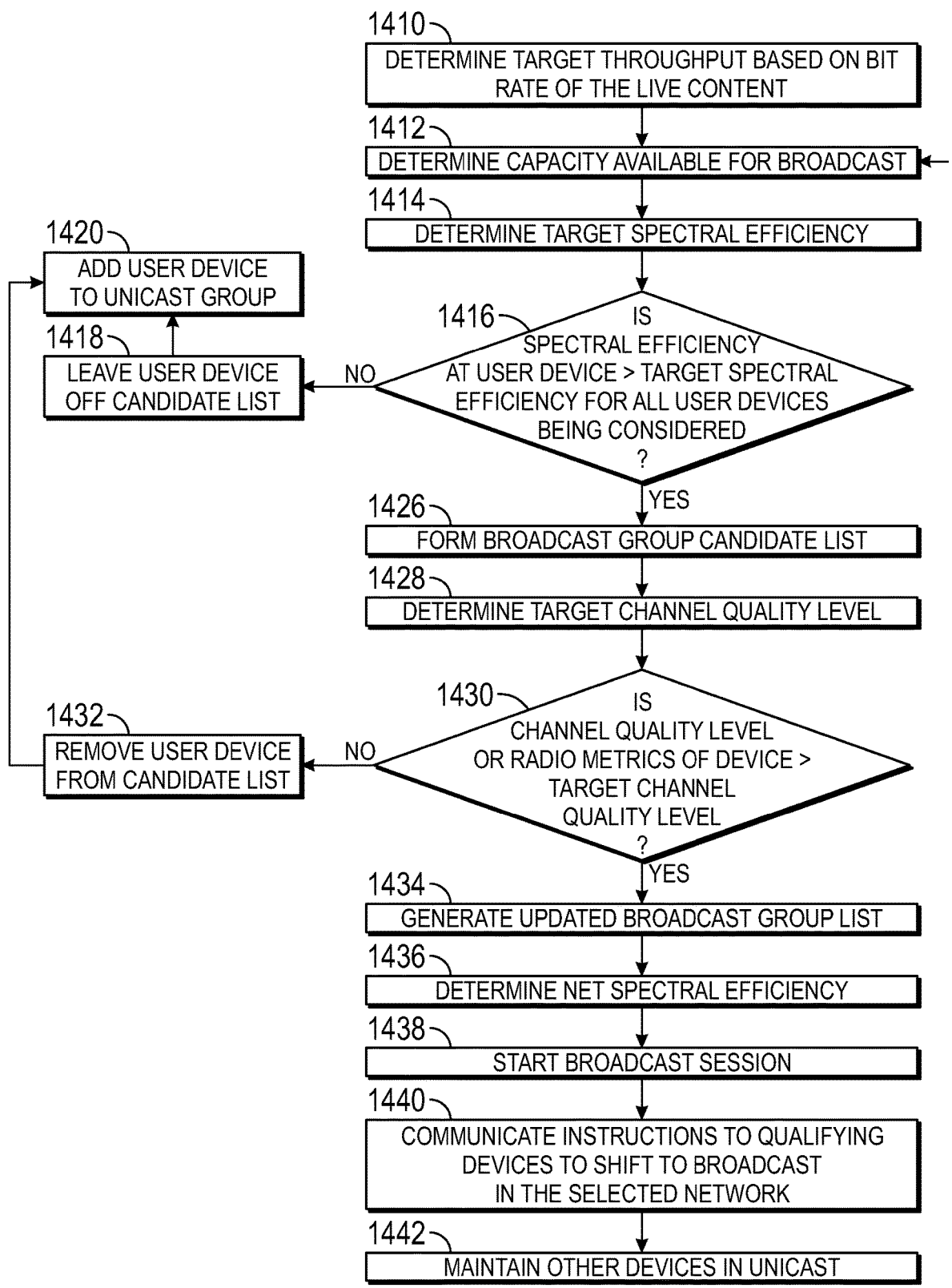
FIGS. 14A and 14B are a continued flowchart of a method for live broadcasting.

Referring now to FIG. 14A, the method for providing radio resource management for live streaming is set forth. In step 1410, a target throughput is determined. The target throughput, as mentioned above, corresponds to the bit rate of the audio/video live stream being considered for live stream. In step 1412, the percent capacity to be used for broadcasting for the particular iteration is determined. The iterations, as mentioned above, may take place using a variety of percentages for the broadcast stream. The percentages are for assumed portions of capacity (spectrum) allocated to unicast and broadcast. In one example, 0% broadcast and 100% unicast may be chosen. In each successive iteration, the amount of broadcast percentage is increased, and the unicast percentage decreased to add to 100%.6. Ultimately, an optimum distribution of capacity across broadcast and unicast deliveries is determined. The optimum blend of broadcast group size and unicast group size is determined so that it has the highest net spectral efficiency of a number of blends.

In step 1414, a target spectral efficiency is determined. The target spectral efficiency to be used for the broadcast delivery is based upon the available spectrum for broadcasting in the particular iteration. In this case, the percentage capacity used for broadcast times the wireless capacity is the capacity for the broadcast. Ultimately, the target spectral efficiency is determined by dividing the target throughput by the capacity of the broadcast for the particular iteration. Ultimately, the spectral efficiency at the user device is compared with the target spectral efficiency for all the devices being considered. When the spectral efficiency at the user device is not greater than the target spectral efficiency for all the devices, step 1418 leaves the user device as a unicast device and thus the considered user device is not part of the broadcasting. In step 1420, the user device in question is added to the unicast group.

Referring back to step 1416, when the spectral efficiency of a user device is greater than the target spectral efficiency, the considered user device is added to the broadcast group candidate list in step 1426.

In step 1428, a channel quality level is determined. In step 1430, when the channel quality level of the device is not greater than the target channel quality level, step 1432 removes the user device from the candidate list. Thereafter, step 1420 is performed in which the user device is added to the unicast group.

Referring back to step 1430, when the channel quality level of the device is greater than the target channel quality level, an updated broadcast group list is generated in step 1434.

Ultimately, the net spectral efficiency is determined. The net spectral efficiency in the case of both broadcasting and unicasting has both a broadcast and unicast component. This will be described in further detail in FIG. 15B. Once the net spectral efficiency is determined, the iteration with the highest net spectral efficiency that does not exceed the overall system capacity is determined. After step 1336, step 1438 starts a broadcast session with the selected percentage of broadcast and unicast for the overall available capacity. In step 1440, the instructions for receiving the broadcast signal are communicated to the devices so that a shift from unicast to broadcast may take place. In step 1442, the other devices in the system that are part of the unicast group are unicasted to.

Figure 14B:
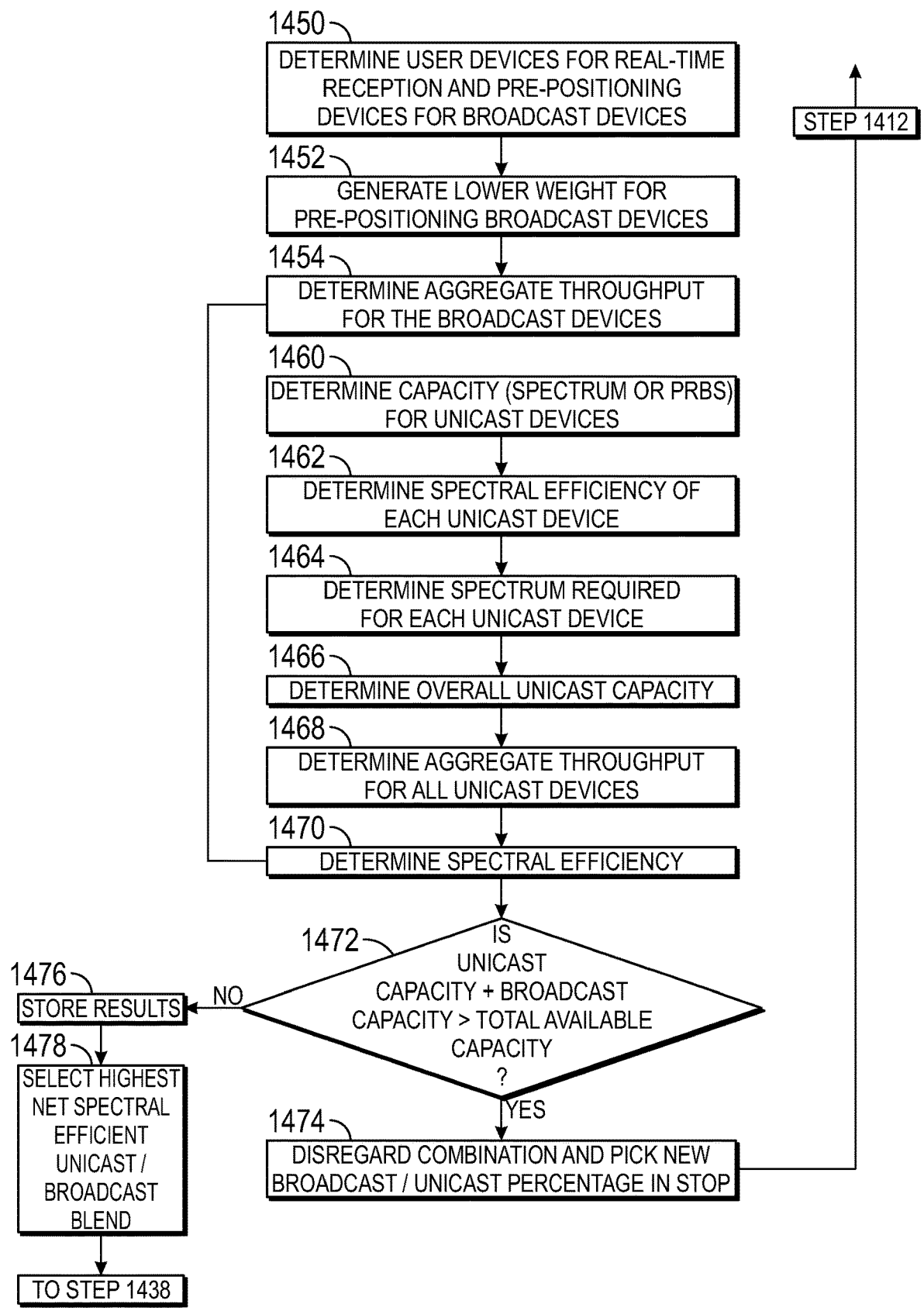

Referring now to FIG. 14B, the method of determining the net spectral efficiency is set forth in further detail. In step 1450, the user device is for real-time reception or live content reception and for prepositioning is determined. As mentioned above, the channel quality and the forecasting for such devices is described above. In step 1452, a lower weight for prepositioning at broadcast devices is provided. In step 1454, the aggregate throughput for the broadcast devices is determined. The aggregate throughput corresponds to the target throughput times the number of devices that are used for real-time reception and for prepositioning. The prepositioning may be derated by a derating factor as mentioned above with respect to the lower weight in step 1452. Ultimately, broadcasting may be using a lower pre-device spectral efficiency level than could be used by a radio disadvantaged device in a unicast mode, but the resource-sharing aspects boost the ultimate net spectral efficiency.

In step 1460, the capacity for the unicast devices is determined. In this example, each of the unicast devices are considered individually and summed. The capacity of the unicast devices may be determined as part of a spectrum or physical resource block. In step 1462, the spectral efficiency of each unicast device is determined based upon its radio conditions. The radio conditions may be communicated back to the content distribution system through feedback. In step 1464, the spectrum required for each unicast device is also determined. The spectrum required for each unicast device corresponds to the target throughput divided by the spectral efficiency for each device. Ultimately in step 1466, the overall unicast capacity is determined. The overall unicast capacity is the sum of the capacity required for all the devices across the unicast group.

In step 1468, an aggregate throughput for all the unicast devices is determined. The aggregate throughput for all the unicast devices corresponds to the target throughput times the number of unicast devices. Ultimately, steps 1454 and 1468 communicate to determine the net spectral efficiency in step 1470. Ultimately, the net spectral efficiency of the particular iteration is the sum of the aggregate throughput for the unicast group (unicast aggregate throughput) and the aggregate throughput of the broadcast group (broadcast aggregate throughput) divided by the sum of the capacity of the unicast group and the capacity of the broadcast group.

Referring now to step 1472, the unicast capacity and the broadcast capacity are summed and compared to the total capacity available (available spectrum). If the sum of the capacity of the unicast device is plus the capacity of the broadcast devices exceeds the total capacity, the sum is excluded from consideration in step 1474. In step 1474, the next iteration also changes the percentage of the broadcast capacity and unicast capacity of the system. After step 1474, step 1412 in FIG. 14A is performed.

In step 1472, when the unicast capacity plus the broadcast capacity is not greater than the total available capacity, the data is saved until a selected best or highest net spectral capacity is determined. That is, the results are stored in step 1476. After step 1476, step 1478 selects the highest net spectral efficient unicast/broadcast blend from the blends. Thereafter, step 1438 starts a broadcast session with the selected percentages.

Figure 15:
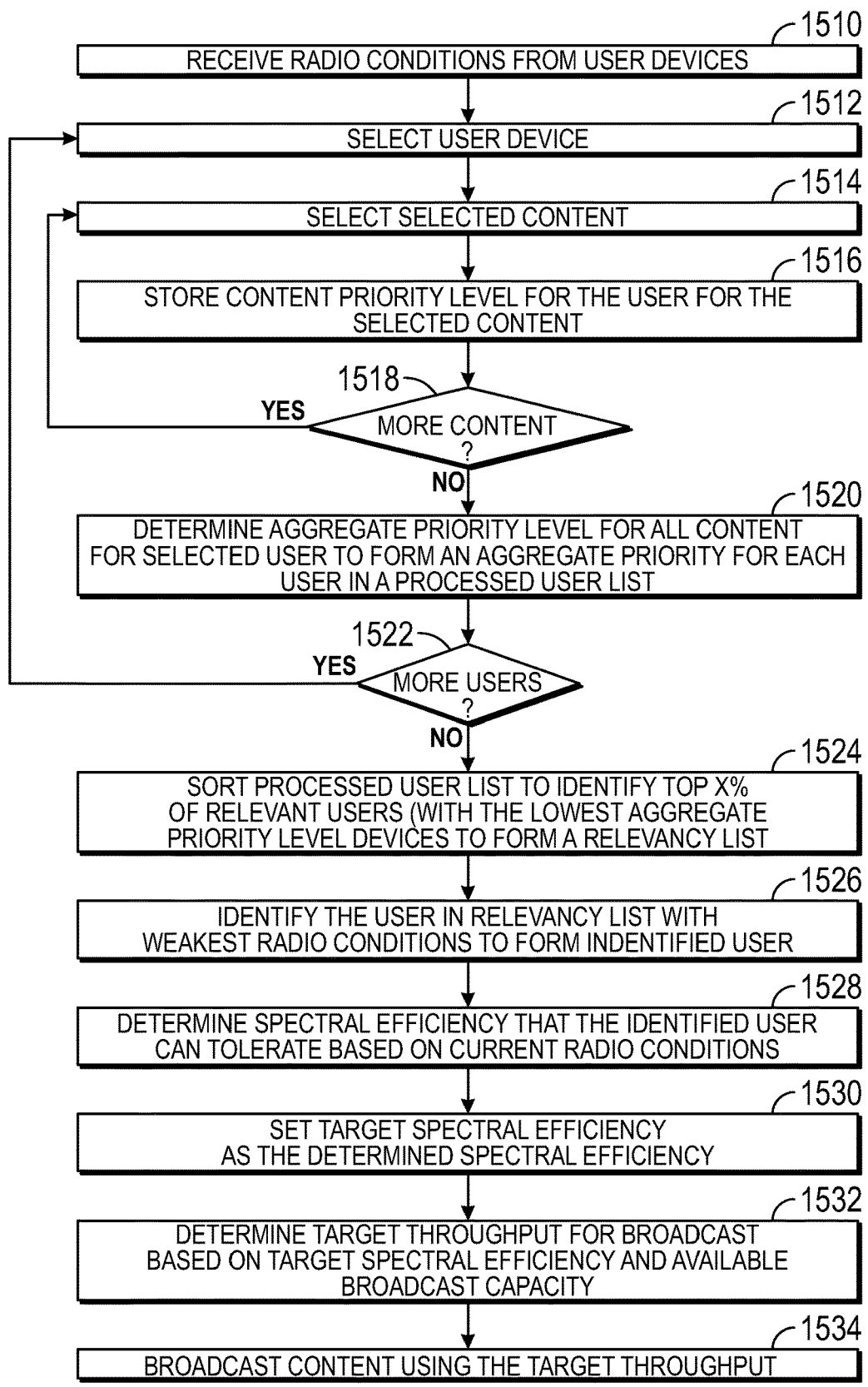
FIG. 15 is a flowchart of a method broadcasting to the most interested user devices.

Referring now to FIG. 15, in this approach takes radio resource management (and selection of wireless broadcast parameters) to the next level which truly blends in knowledge of content distribution parameters to optimize the selection of broadcast radio parameters. This represents a more holistic cross-layer approach—marrying "content distribution thinking" into the wireless layer. Here, the knowledge of the content (assets) are scheduled to be part of a broadcast to influence the selection of broadcast spectral efficiency level and associated parameters such as broadcast target throughput. Consider the cases of non-real-time content delivery or opportunistic broadcast done as part of stored streaming (both use cases described earlier). Both use cases involve the delivery of content assets files (or parts of files) that are pre-positioned/cached on a user device, for later consumption by the user.

These scenarios lend themselves well to the use of wireless broadcast technology. The content scheduler can create queues of assets to be broadcast across a service area, based on the likelihood of multiple users in the Service Area consuming these assets, i.e. based on "commonality" or "popularity" factors. Multiple factors can enable the content scheduler to identify "content commonality." For example, the following may be used: multiple users indicating overt interest in a piece of content, e.g. by placing it on a "watch list"; observation of a piece of content being popularly pulled by users for viewing, i.e. noticeably increasing in popularity; and, determination of users' interest in a content piece, based on their observed viewing patterns, and taste similarities to other users who have viewed that content.

In step 1510, the system 710 determines the radio conditions (radio channel quality feedback) from participating devices. This step was described in detail relative to step 1210 and is therefore not repeated. The following is performed for all the user devices in a service area and considers all the assets that may be potentially broadcasted. Step 1512 selects the first user service in the service area. In step 1514 the content is selected. In step 1516, based on information from the content scheduler 829, the priority level of the selected content (content priority level) is determined and stored. To determine the priority level, the content scheduler 829 may use a smart algorithm to determine content commonality in a given geographic area and make decisions on which assets to include in each of the broadcast sessions. The proposed list of content is then indicated to the wireless (broadcast) distribution layer. Information on user relevance is also provided, i.e., which users each asset in the list is relevant to. For example, the content distribution system 710 can tag each asset with a per-user priority level. For example, Asset A may be Priority 20 for User X, Priority 120 for User Y, and Priority 1200 for User Z. Asset B may be Priority 500 for User X, Priority 101 for User Y, and Priority 10 for User Z. The content distribution system 710 can select and include in the broadcast those assets with the lowest aggregate Priority Levels (across the users in the Service Area)—i.e., use the Priority Level to determine content commonality and relevance.

In step 1518, when there is more content to be considered, steps 1514 to 1518 are repeated. In step 1518 when no further content is to be considered, step 1520 determines the aggregate priority level for the user and stores the aggregate priority level with a user device identifier in the content scheduler 829 or other memory associated with the system. Essentially, this forms a user aggregate priority list. The aggregate priority level may be determined by summing all the priority levels for all the content.

In step 1522, when more users in the service area are to be considered, steps 1512 to 1520 are again performed. In step 1522 when no more users are to be considered, step 1524 is performed. In step 1524, the content scheduler (or the distribution system) sorts through the processed user aggregate priority list to identify the top N % relevant user devices (priority devices having a priority above a priority threshold). That is, the N % user devices with lowest aggregate priority levels are chosen to form a maximized population coverage. Lower priority numbers correspond to higher priorities. The highest priority may for example be 1.

In step 1526, the priority device in the N % relevancy list with the weakest radio conditions is identified using the radio conditions determined in step 1510 to for an identified user. In step 1528 the spectral efficiency that the identified user can tolerate is determined based on the current radio conditions. In step 1530 the spectral efficiency of step 1528 is set as the target spectral efficiency for the broadcast. In step 1532, the target throughput for the broadcast is determined from the target spectral efficiency and the available broadcast capacity. In step 1534, the content is broadcasted using the target throughput. The idea here is to ensure that all users "highly relevant" to the selected content are covered by the broadcast. i.e. the highest priority users (for the selected content) are all covered. Hence—selecting the spectral efficiency of the weakest of these priority devices— the weakest of these "highly relevant" devices is covered.

Ultimately knowledge of the content (assets) to be scheduled to be part of a broadcast is used to influence the selection of broadcast spectral efficiency level and associated parameters such as broadcast target throughput. The cases of non-real-time content delivery or opportunistic broadcast are done as part of stored streaming (described earlier) involve the delivery of content assets files (or parts of files) that are pre-positioned or cached on a user device, for later consumption by the user.

These scenarios lend themselves well to the use of wireless broadcast technology. The content scheduler 829 can create queues of assets to be broadcast across the service area, based on the likelihood of multiple users in the service area consuming these assets, i.e., based on commonality or popularity factors. Multiple factors can enable the content scheduler 829 to identify content commonality. The factors include but are not limited to multiple users indicating overt interest in a piece of content, e.g., by placing it on a watch list, observation of a piece of content being popularly pulled by users for viewing, i.e., noticeably increasing in popularity, determination of users' interest in a content piece, based on their observed viewing patterns, and taste similarities to other users who have viewed that content. Content commonality may include at least one of wishlists, content device indicators, content popularity profiles, viewing patterns similarities to other viewers.

The broadcast distribution layer can leverage this information to more optimally select the spectral efficiency level to target for use in the broadcast session. The distribution layer can use the above information to identify the users with the greatest relevance to the assets being broadcast, and to select a spectral efficiency level that ensures that the top N % relevant users are be covered by the broadcast.

Figure 16:
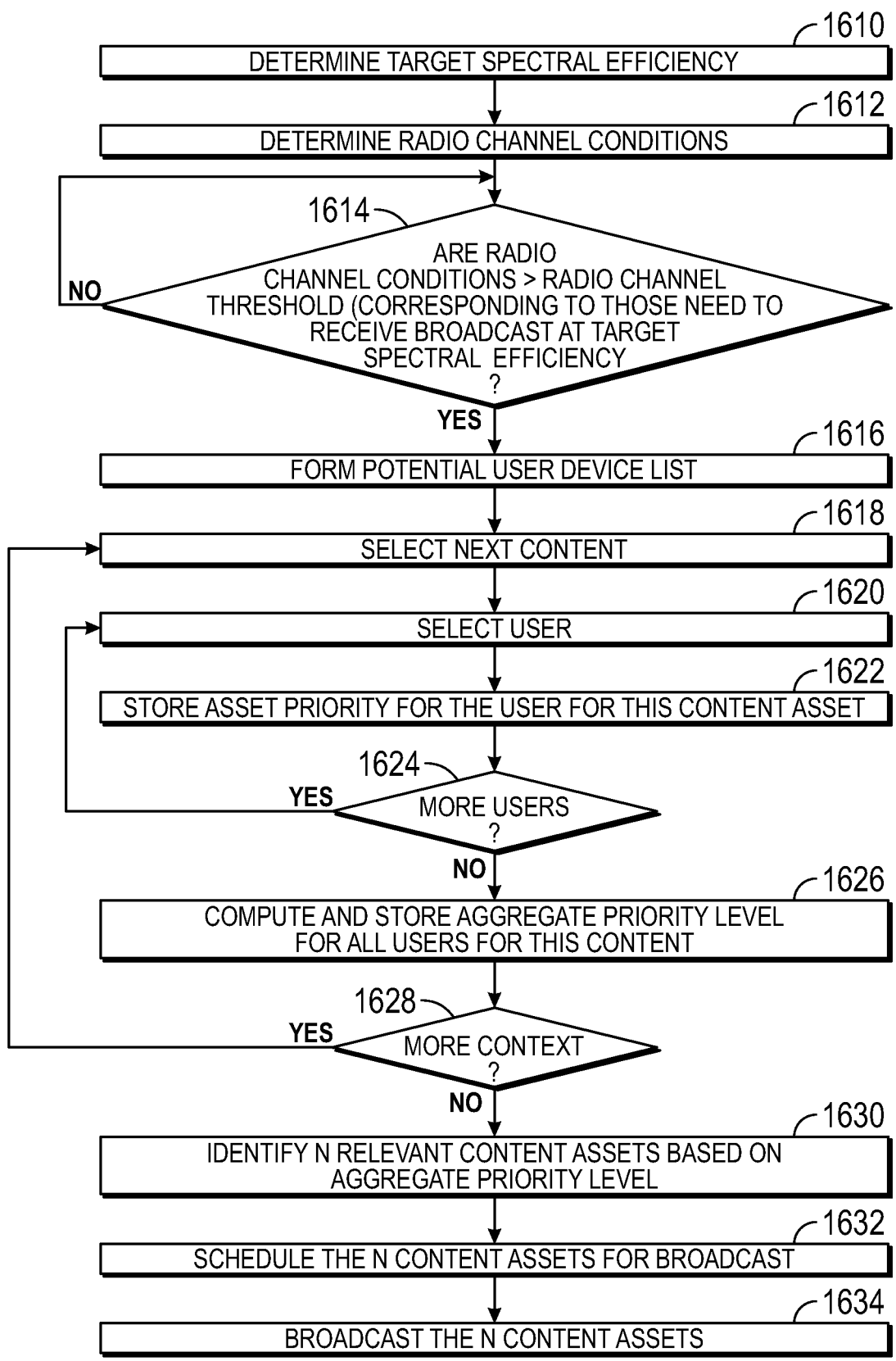
FIG. 16 is a flowchart of a method for broadcast using radio aware content scheduling.

Referring now to FIG. 16, the converse of the ideas discussed in FIG. 15 is performed, i.e. leverage knowledge of the target devices' radio conditions to influence scheduling of content (assets) to be included in a broadcast. The idea here is to create a content delivery schedule tailored to users who are likely to receive the broadcast.

In this case, the content distribution system 12 may have selected a target spectral efficiency level to be applied to the broadcast, based on one of the radio optimization schemes described earlier. The idea here is to use this knowledge to fine-tune the list of content assets to be scheduled in the broadcast. Based on the spectral efficiency cutoff point, the content distribution system 12/710 knows which devices are likely to receive the broadcast. The distribution system can then schedule—for delivery—content that is of most interest to this target group of users that will receive the broadcast reliably.

In step 1610, the content distribution 710 system selects a target spectral efficiency level to be applied to the broadcast. This may be performed based on one of the radio optimization schemes described earlier. The idea here is to use this knowledge to fine-tune the list of content assets to be scheduled in the broadcast. In step 1612, the radio conditions for the radio channels may be determined for all the user devices in the service area. In step 1614 is performed for each user device. In step 1614 the radio conditions for each user device are compared to a radio condition threshold that corresponds to the radio conditions needed to receive the broadcast at the target spectral efficiency. In step 1616 a potential device list of user and/or intermediate devices with radio channel conditions at or better than needed to receive the broadcast at the target spectral efficiency level is stored in the content distribution system.

The iterations are performed for each content in the candidate list to be broadcasted. In step 1618 the first content is evaluated for each user. In step 1620, the first user is selected. In step 1622 the priority level for the content for the selected user is stored in the content distribution system 710.

In step 1624, when more users are to be evaluated, steps 1620 through 1624 are performed until all the asset priorities for all the user devices for the asset is determined.

In step 1626 an aggregate priority level across all users for the content asset is determined and stored in the content distribution system. In this example, the priority level values are summed to form a processed user list. In step 1628, when more content assets are to be evaluated, steps 1618 through 1628 are performed.

When no more content assets are to be evaluated in step 1628, step 1630 sorts through the processed user list to identify the top N relevant assets that can be accommodated in the broadcast. In the present example, the N content assets with lowest aggregate priority levels are selected. The N assets are the ones most relevant to the target population of accessible users to obtain a maximized population coverage.

In step 1632 the N content assets are scheduled to be broadcasted by the content scheduler. On step 1634, the N content assents are broadcasted.

In summary, based on the spectral efficiency cutoff point, the content distribution system knows which devices are likely to receive the broadcast. The content distribution system can then schedule for delivery content that is of most interest to this target group of users that will receive the broadcast reliably.

Figure 17:
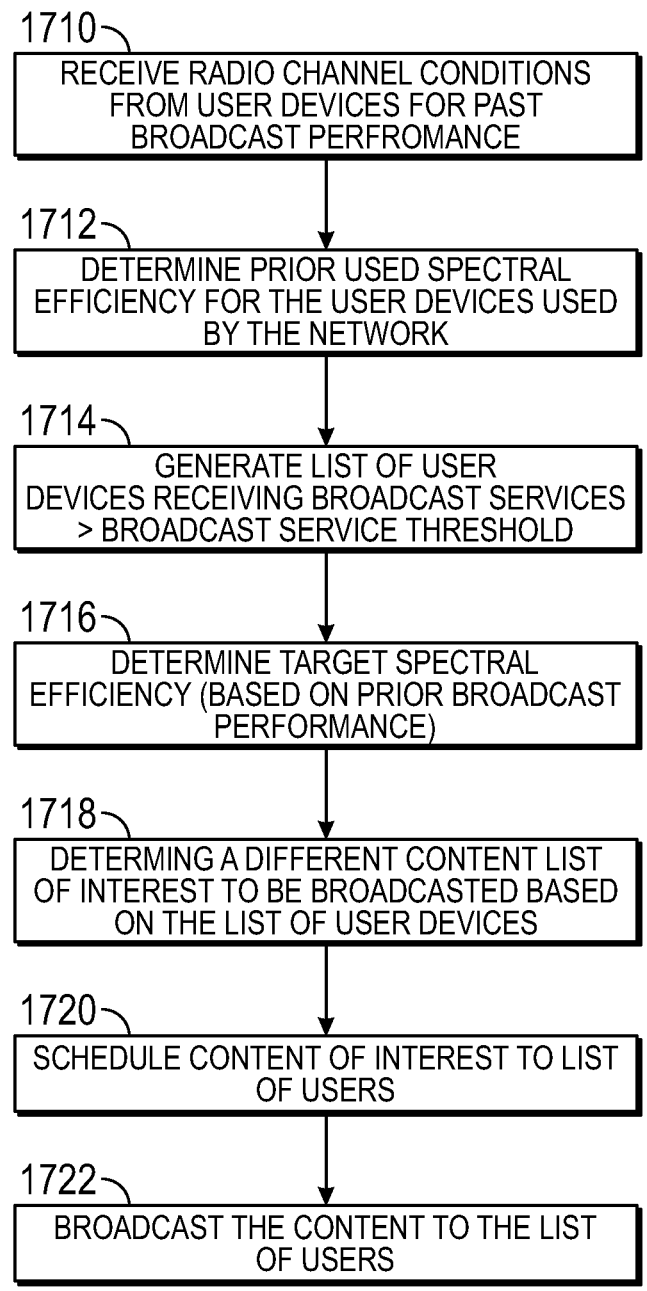
FIG. 17 is a flowchart of a method for broadcast using radio aware content scheduling using broadcast performance observations.

Referring now to FIG. 17 radio aware content scheduling based on broadcast performance observation. This is a special case covered in FIG. 16. In step 1710 the radio channel conditions from the user devices for past broadcasts is determined. In step 1712, the spectral efficiency level being used by the wireless network is determined. In step 1714, a list of devices in the service area that have been receiving satisfactory broadcast service in the recent past is determined based on the radio conditions and the performance feedback at that spectral efficiency. The list of devices becomes the list of devices for the future broadcast. In step 1716, the content distribution system 710 selects the spectral efficiency level to apply to an upcoming broadcast, based on prior broadcast performance.

In step 1716 a different content list is determined based on the list of users successfully receiving the content. That is, the content priority relative to the list of user devices receiving the content successfully is determined. The broadcast list of devices may be increased or decreased. The determination of the priority level is set forth above. That is, the system knows which user devices are likely to receive the broadcast and forms a modified device list. To summarize, a first a target spectral efficiency is selected. Then, determining which devices will receive the broadcast, if done at this spectral efficiency level are chosen, i.e. which devices have good enough radio conditions. Then, the content (assets) are selected that are most relevant to this subset of users. The distribution system can then schedule for delivery the content that is of most interest to this target group of users on the modified device list that will likely receive the broadcast reliably in step 1718. This may be referred to as a maximized population coverage above a priority threshold. In step 1720, the content on the different content list is communicated to the user devices that satisfactorily received the previous content.

The method is useful because, for example, in past broadcasts to the service area, the content distribution system may have selected a target optimal spectral efficiency level (based on radio efficiency calculations set forth above) and set a target throughput level for the broadcast based on the target spectral efficiency level. The wireless network, however, may have chosen to apply a lower spectral efficiency level, but still provides the target throughput by supplying more capacity to the broadcast. The broadcast may have accommodated more user devices including ones in less radio-favorable conditions than the calculations of the content distribution system may have determined. The fine-tuned the list of content assets to be scheduled in the broadcast. The system knows which users (devices) are likely to receive the broadcast. The distribution system can then schedule—for delivery—content that is of most interest to this target group of users that will likely receive the broadcast reliably.

In the following sections, various methods for broadcasting and managing the broadcasting of content are set forth. The methods provide schemes for optimizing reliability and effectiveness of wireless content broadcasting. As mentioned above, each broadcast uses a target spectral efficiency level that influences the target modulation and coding levels. It is likely that some devices in the target population will receive little or none of the broadcast, as their radio conditions are worse than needed to successfully demodulate transmissions issued at the target spectral efficiency level. The content distribution system may apply a preemptive or proactive mechanisms to improve broadcast delivery effectiveness and yield to ensure that broadcast yield is maximized, i.e., the percentage of content not received by devices is kept to a minimum. These schemes apply to both content consumed in real-time (e.g., streamed content) and non-real-time (pre-positioned or downloaded content). The content distribution system may also apply reactive mechanisms to track assets not received by devices, and to institute recovery mechanisms to ensure these devices ultimately receive the missed content fragments. These mechanisms make sense primarily to non-real-time transmissions since retransmission recovery actions are suboptimal for scenarios such as live or stored streaming.

Figure 18:
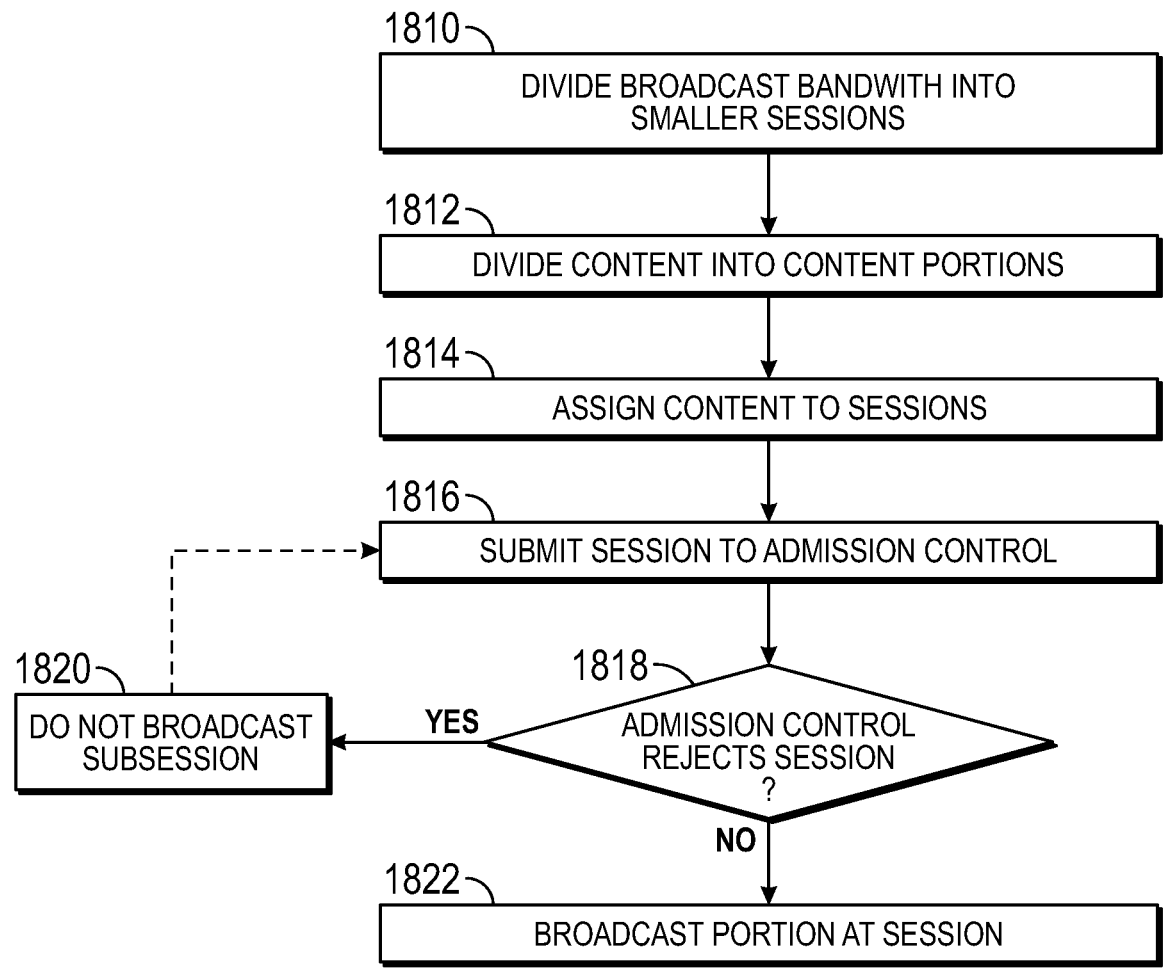
FIG. 18 is a flowchart of a method for broadcasting using sub-sessions.

Referring now to FIG. 18, a method of using division of broadcast delivery sessions into sessions is the proactive approach set forth below. In step 1810 the content distribution system divides a bigger content (such as for a whole content) into smaller sessions that share the overall throughput load. The content may be divided into fragments or portions to fit into the sessions in step 1812. In step 1814, the content portions are assigned to the sessions. In step 1816 the sessions are submitted to admission control. In step 1818, when the session is rejected by the admission control, step 1820 does not broadcast the content. After step 1820, the system may optionally resubmit the session to admission control in step 181. This may allow a system that has fluctuation in capacity to broadcast the content. In step 1818 when the admission control does not reject the session, the system broadcasts the content in 1822.

The granular approach takes care of situations where the wireless network's admission control is unable to admit the entire broadcast period load (i.e., some sessions may be declined as described relative to FIG. 10). The divide-and-rule approach of FIG. 18 typically prevents an entire large content session from being declined. Sessions may be denied, but at least some of the sessions end up getting admitted into the wireless network. The approach is pre-emptive in nature and seeks to increase the yield of the original larger broadcast transmission. Because only an entire content broadcast may be missing, only the missing session and not the entire content is retransmitted. This, system resources are conserved.

Figure 19:
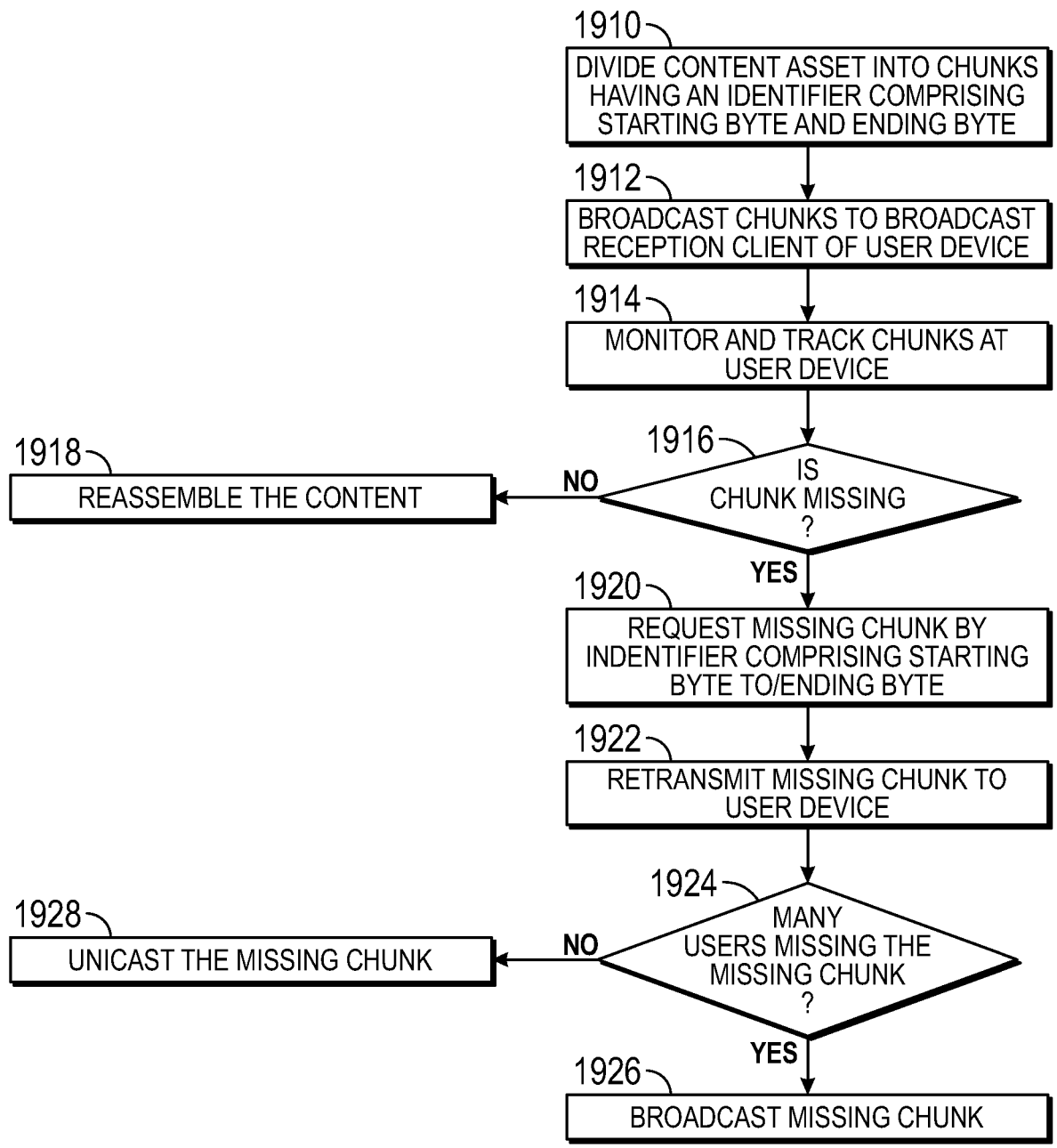
FIG. 19 is a flowchart of a method for broadcasting using chunks.

Referring now to FIG. 19, content fragment segmentation and reassembly is a proactive approach that may be performed in the present system. Analogous to the session splitting approach, the distribution system also employs content asset fragmentation to limit the effect of delivery failures, and to improve the broadcast delivery yield. In step 1910, the system divides content asset files into smaller blocks or "chunks." A chunk may be part of a file and can be identified by its starting and ending byte numbers within the file. The start and end byte numbers can be indicated to the broadcast reception client within the receiving device either via explicit signaling messaging, or by including the byte numbers within the chunk identifier (name). In one example, the chunk name can be identified by the original file name and the start and end byte numbers of the chunk.

In step 1912, the chunk along with its identifier is broadcast to the user device and to the broadcast reception client of the user device. In step 1914, the chunk name (with its start and end byte numbers) enables the broadcast reception client to monitor and track which chunks are from within which files it has received. The broadcast reception client enables the distribution system, which may be located in the cloud to keep track of which subset chunks of which files have been received by which device. In step 1916, the broadcast reception client uses the chunk file names (original file names+Start/End Byte Numbers) to reassemble chunks back in the right sequence and reconstruct the original asset files. The idea behind chunking is to provide smaller files for the broadcast delivery subsystem to work on (this can optimize processing on the broadcast delivery machine and save on horsepower and number of delivery resources required). Chunking also increases the granularity of asset delivery management. That is, if a file is not received by a device, it is a smaller chunk that is not received. The small chunk rather than the large file would need to be retransmitted. This helps to limit the effect of device reception failures and the work required on the broadcast delivery side to redeliver assets.

In step 1916 when a chunk is missing, step 1920 requests the chunk using the starting identifier and/or the file name. In step 1922 the chunk may be retransmitted to the user device. Retransmission may use unicast or broadcast to communicate the chunk. In step 1924 the number of users missing the particular chunk or chunks is determined. If many users are missing the chunk (above a missing chunk threshold), step 1926 broadcasts the missing chunk or chunks. In step 1924 when the number of users is below the missing chunk threshold, step 1928 unicasts the chunk.

The delivery monitoring and retransmission is a reactive approach. The distribution system can monitor the broadcast delivery process at the chunk level and track which chunks (original file names+Start/End Byte Numbers within the files) have been successfully received by which devices as part of the broadcast in step 1924 above. The use of the reactive approach makes sense only for non-real-time transmissions. Real-time consumption scenarios such as live or stored streaming cannot afford to wait for missing segments to be retransmitted at later times. Because only a chunk is missing only the chunk and not the entire content is retransmitted. This, system resources are conserved.

Figure 20:
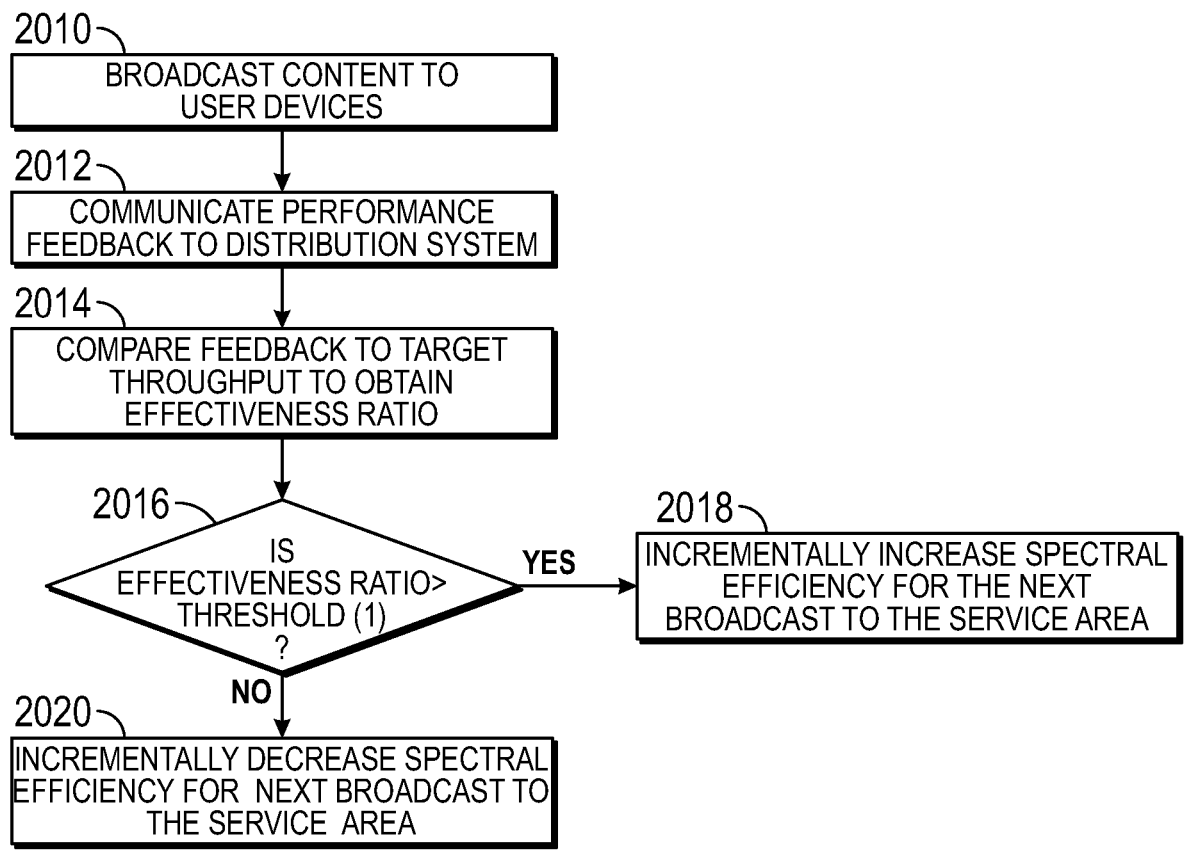
FIG. 20 is a flowchart of a method changing a spectral efficiency based on the broadcast performance.

Referring now to FIG. 20, delivery feedback mechanisms may be used to monitor the broadcasts. In step 2010 the content is broadcasted to a plurality of user devices. The distribution system can use performance feedback from participating devices to determine the effectiveness of the broadcast in step 2012. For example, each device can report the bytes (or throughput) actually received by it. When the bytes received over a time period are aggregated together the achieved capacity utilization is obtained. This can be referred to as the total throughput. That is the sum of the bytes received over a time period corresponds to the throughput. The content distribution system can also determine the average throughput achieved from the broadcast across the target device population. By comparing this to the original target throughput set, an effectiveness ratio can be calculated in step 2014. In step 2016 may be compared to a performance threshold (such as 1 in this example). The effectiveness ratio may be used to adjust the broadcast spectral efficiency for this service area. For example, in step 2016 when the effectiveness ratio is in a good range (e.g., close to 1), the spectral efficiency can be incrementally increased, since the applied spectral efficiency level has resulted in a highly effective broadcast in step 2018. In step 2016 when the effectiveness ratio is below a threshold (i.e., the broadcast delivery was not effective enough), the spectral efficiency may be incrementally decreased for the next broadcast to this service area in step 2020. The overall target capacity utilization goal may be reduced to a second utilization goad based on the achieved utilization or the other performance feedback.

The delivery feedback may include precise indications from devices as to which asset chunks (or portions of files)

they have received successfully by which devices. This is necessary for the distribution system to monitor the broadcast delivery process and determine which chunks to retransmit. This provides a coverage level.

Figure 21:
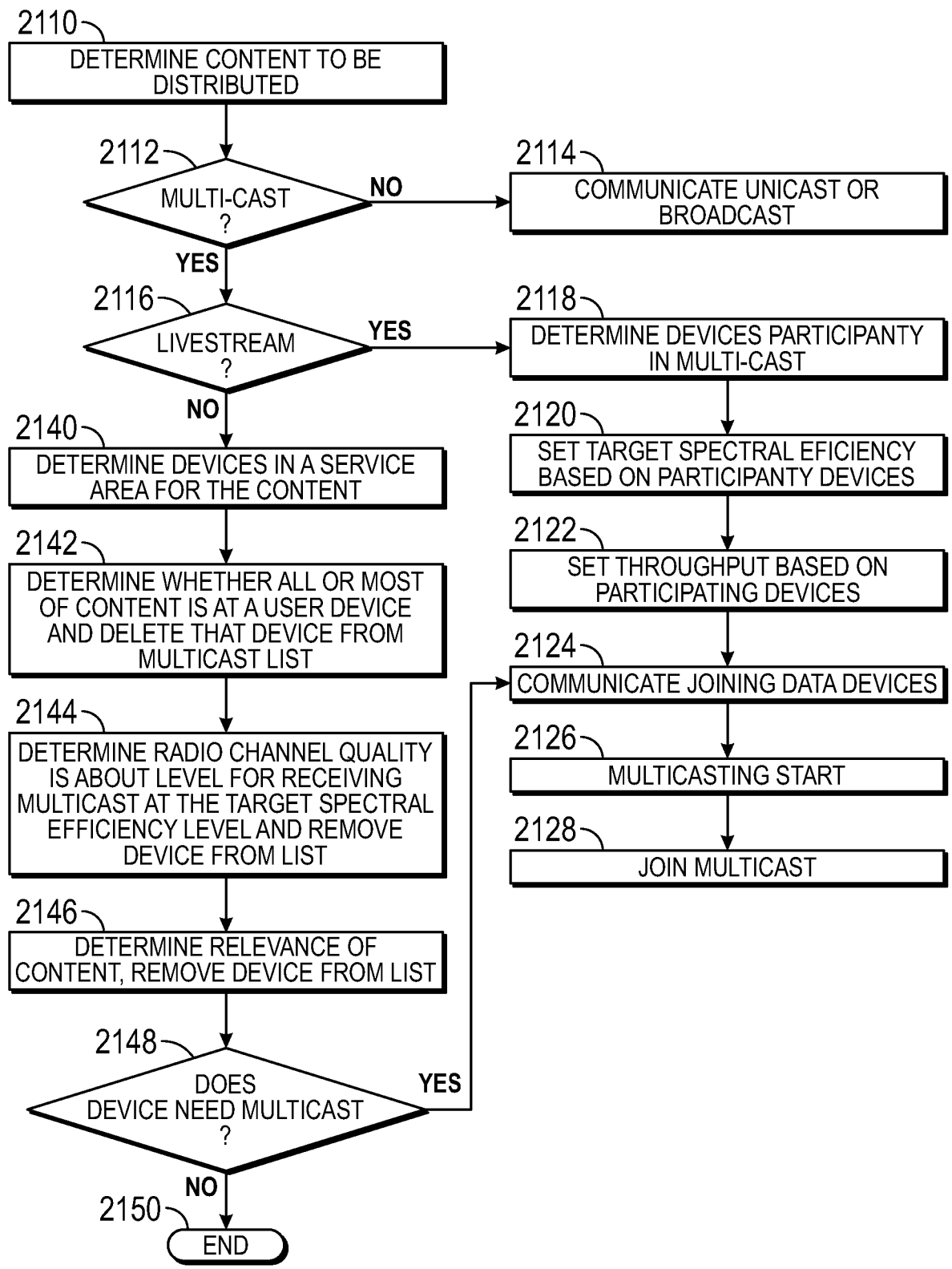
FIG. 21 is a flowchart of a method multicasting content.

Referring now to FIG. 21, multicast capabilities of a system may be advantageously used when available. That is some wireless networks offer multicast capabilities. For example, the 3G (UMTS) MBMS service included multicast. The emerging 5G Multicast Broadcast System (5G MBS) standard (in the specification process as of the filing date of this application) may focus on multicast as its core broadcasting capability. Multicast is a specific type of broadcasting capability, where a device needs to explicitly join a multicast session to receive the service. The system supports join signals and leave signal, which are control plane procedures, enabling devices to join and leave sessions. A multicast session may have a subset of the overall device population in the service area participating in it. The devices explicitly join the session via join procedures.

In step 2110 content to be distributed may be determined. In step 2122 it is determined whether multicasting is available for the content. When multicasting is not available in step 2112, step 2114 communicates the content in a non-multicasting way such as unicasting or broadcasting. In step 2112 when multicasting is available through the network, step 2116 determines whether a livestream is required for the content. A livestream may be formed from a live event or from content communicated at a predefined time (e.g., linear content delivery) to a plurality of devices that can be stored or consumed in real time. The delivery bit rate or throughput should be at least the size/speed of the content to prevent latency issues. This is in contrast to non-real time communication where the bit rates vary, and the content is delivered over time with the expectation the content is not consumed as it is stored in the device. The innovations described above can all avail of multicasting capabilities that networks offer. For a livestream content, after step 2116, step 2118 determines the participating devices in the livestream. The content distribution system can set target spectral efficiency in step 2120 and in step 2122 throughput levels based on knowing the precise list of devices participating in the multicast. In step 2124 joining data signals are communicated to the participating devices. In step 2126 the multicasting is started. In step 2128 the multicast is joined by the participating devices.

In step 2116, when non-livestreaming is to be performed (e.g., content pre-positioning, certain download scenarios), the distribution system determines which devices need to join session in step 2140. Using an over-the-top protocol, the system can inform devices as to whether they should join the multicast or not. In step 2142 the system can delete from the multicast device list devices that have already received all, or a defined bulk of the assets about to be multicasted. Radio channel condition may not allow the user device to receive the multicast, as their radio channel conditions are below the level required to receive the multicast at the target spectral efficiency level in step 2144. Step 2144 allows removes the device from the multicast list. In step 2146 multicast is not needed if the assets to be multicasted are of low relevance to those users. Step 2146 may remove those references. The deleted devices will then respond to the over-the-top commands by simply not joining the multicast. In step 2148 it is determined from the remaining devices on the list whether the devices need to join the multicast. When the multicast should be joined in step 2148, steps 2124 to 2128 allow joining of the multicast. In step 2148 when device does not need to join the multicast, step 2150 ends the process.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of broadcasting comprising:
   determining an identified content for a broadcast to a broadcast group comprising a plurality of devices in a service area;
   determining a priority for the identified content for each of the plurality of devices,
   determining radio conditions for each of the plurality of devices in the service area; and
   determining an available network capacity of a network for broadcasting in the service area;
   determining, at a content distribution system, a target spectral efficiency for the broadcast to achieve a performance target for a maximized population coverage across the plurality of devices, said target spectral efficiency based on the priority for the identified content for each of the plurality of devices, the radio conditions, the available network capacity and a modulation scheme and a coding scheme for the broadcast;
   broadcasting the identified content to the plurality of devices in the service area based on the target spectral efficiency for the broadcast;
   communicating performance feedback data from each of the plurality of devices to a performance module;
   adjusting the target spectral efficiency to form an adjusted spectral efficiency based upon the performance feedback data; and
   broadcasting the identified content to the plurality of devices based on the adjusted spectral efficiency.

2. The method of claim 1 further comprising determining a target throughput from the spectral efficiency and wherein broadcasting comprises broadcasting the identified content to the plurality of devices in the service area based on the spectral efficiency corresponding to the target throughput.

3. The method of claim 2 further comprising communicating the target throughput to a network controller and wherein broadcasting the identified content comprises broadcasting the identified content based on the target throughput.

4. The method of claim 1 further comprising determining the performance target by determining the maximized population coverage across the plurality of devices in the service area.

5. The method of claim 1 further comprising determining the performance target by determining the maximized population coverage across the plurality of devices with the priority for the identified content above a priority threshold.

6. The method of claim 1 wherein determining the priority for the identified content is based on at least one of a wishlist or a content device indicator.

7. The method of claim 1 wherein determining the priority is based on at least one of content popularity, a likelihood of content consumption, content popularity profiles, viewing patterns of the plurality of devices in the service area and similarities to other viewers.

8. The method of claim 1 wherein determining the available network capacity comprises determining dormant capacity and wherein broadcasting comprises broadcasting the identified content using the dormant capacity of the network.

9. The method of claim 1 wherein determining the available network capacity comprises determining dormant capacity available for broadcasting and wherein broadcasting comprises broadcasting the identified content using the dormant capacity of the network.

10. The method of claim 1 further comprising communicating the performance feedback data from the plurality of devices to the content distribution system and broadcasting the identified content using an alternate spectral efficiency for the broadcast based on the performance feedback data;
when the performance feedback data is above a performance threshold, increasing the spectral efficiency to a second spectral efficiency greater than the spectral efficiency;
when the performance feedback data is less than the performance threshold, decreasing the spectral efficiency to a third spectral efficiency less than the spectral efficiency; and
broadcasting a second content to the plurality of devices in the service area using the second spectral efficiency or the third spectral efficiency.

11. The method of claim 1 wherein determining the available network capacity comprises determining the available network capacity based on a quality of service by determining, by the network, a total capacity of the network and subtracting a high quality of service network allocation, and further comprising allocating a lower quality of service network allocation to broadcasting to at least a portion of the available network capacity.

12. The method of claim 1 further comprising forming the broadcast group from a plurality of intermediate devices, a first intermediate device of the plurality of intermediate devices associated with a first user device communicating content therethrough for real-time consumption and a second intermediate device of the plurality of intermediate devices storing the identified content and communicating the identified content to a second user device for non-real-time consumption at a future time after the identified content is stored in second intermediate device.

13. The method of claim 1 further comprising forming the broadcast group from a plurality of user devices.

14. The method of claim 1 wherein determining radio conditions for each of the plurality of devices in the service area comprises determining at least one of a signal-to-noise ratio, a signal-interference-and-noise ratio and a channel quality indicator.

15. The method of claim 1 wherein broadcasting the identified content comprises establishing a plurality of broadcast sessions for portions of the identified content and broadcasting the identified content using the broadcast sessions.

16. The method of claim 15 wherein broadcasting the identified content using the broadcast sessions comprises ensuring that at least portions of the identified content may be received successfully rather than an entire content not being received.

17. The method of claim 16 further comprising determining a target throughput based on the spectral efficiency, communicating the target throughput to a network controller and wherein broadcasting the identified content comprises communicating the identified content using broadcast sessions based on the target throughput.

18. The method of claim 17 wherein establishing the plurality of broadcast sessions comprises establishing at least one broadcast session based on the available network capacity.

19. The method of claim 18 further comprising determining a first session of the plurality of broadcast sessions is missing at a first device of a plurality of devices and transmitting the first session to the first device.

20. The method of claim 1 wherein broadcasting the identified content comprises dividing the identified content into a plurality of chunks and broadcasting the chunks to the plurality of devices.

21. The method of claim 20 further comprising determining a missing chunk at a device of the plurality of devices and requesting the missing chunk using a chunk identifier.

22. The method of claim 21 further comprising unicasting the missing chunk to the device.

23. The method of claim 20 further comprising determining a missing chunk in at least some of the plurality of the devices and requesting the missing chunk using a chunk identifier.

24. The method of claim 23 further comprising broadcasting the missing chunk to the at least some of the devices.

25. The method of claim 20 further comprising reporting performance feedback data and wherein requesting a missing chunk comprises requesting the missing chunk using an over-the-top protocol between devices and a content distribution system.

26. The method of claim 1 wherein broadcasting the identified content comprises broadcasting a livestream for real-time consumption.

27. The method of claim 1 wherein broadcasting the identified content comprises broadcasting a livestream for real-time consumption by some of the plurality of devices and storing the livestream for non-real-time consumption by other devices at a future time.

28. The method of claim 1 wherein broadcasting the identified content comprises multicasting the identified content.

29. The method of claim 1 wherein
for each cell of a plurality of cells of the service area of a first network,
receiving a capacity usage report from the cell;
determining an available cell capacity of the cell based on the capacity usage report;
determining a target available capacity utilization goal of the cell based on the available cell capacity;
determining an overall target available capacity utilization goal of the plurality of cells in the service area of the first network, based on the target available capacity utilization goal of each cell of the plurality of cells of the service area;
further comprising determining a target throughput for communicating the identified content based on the spectral efficiency and the overall target available capacity utilization goal of the plurality of cells; and
wherein broadcasting the identified content comprises broadcasting the identified content to the plurality of devices in the service area based on the target throughput.

30. The method of claim 29 wherein the overall target available capacity utilization goal is an average target available capacity determined across all cells in the service area or a minimum target available capacity determined across all cells in the service area.

31. The method of claim 29 wherein broadcasting the identified content comprises establishing a plurality of broadcast sessions for portions of the identified content and broadcasting the identified content using the broadcast sessions.

32. The method of claim 31 further comprising communicating performance feedback data by determining at least one of a percentage of devices receiving the identified content and percentage of a target throughput achieved across the plurality of cells of the service area during the broadcast.

33. The method of claim 32 further comprising changing the overall target available capacity utilization goal to a second overall target available capacity utilization goal different from the overall target available capacity utilization goal based on the performance feedback data, to match an achieved capacity utilization across the plurality of cells of the service area during the broadcast; and
broadcasting a second content to the plurality of devices in the service area using the second overall target available capacity utilization goal.

34. The method of claim 33 wherein broadcasting comprises broadcasting the identified content using an alternate number of broadcast sessions to achieve the second overall target available capacity utilization goal.

35. A system for broadcasting comprising:
a plurality of devices; and
a content distribution system in communication with the plurality of devices programmed to determine an identified content for a broadcast to a broadcast group comprising the plurality of devices in a service area;
the content distribution system programmed to determine a priority for the identified content for each of the plurality of devices,
the content distribution system programmed to determine radio conditions for each of the plurality of devices in the service area;
the content distribution system programmed to determine an available network capacity of a network for broadcasting in the service area;
the content distribution system programmed to determine a target spectral efficiency for the broadcast to achieve a performance target for a maximized population coverage across the plurality of devices, said target spectral efficiency based on the priority for the identified content for each of the plurality of devices, the radio conditions, the available network capacity and a modulation scheme and a coding scheme for the broadcast;
the content distribution system programmed to broadcast the identified content to the plurality of devices in the service area based on the spectral efficiency for the broadcast;
the content distribution system programmed to receive performance feedback data from each of the plurality of devices;
the content distribution system programmed adjust the target spectral efficiency to form an adjusted spectral efficiency based upon the performance feedback data; and
the content distribution system programmed to broadcast the identified content to the plurality of devices based on the adjusted spectral efficiency.

36. The system of claim 35 wherein the content distribution system is programmed to determine a target throughput from the spectral efficiency and wherein the content distribution system is programmed to broadcast the identified content to the plurality of devices in the service area based on the spectral efficiency corresponding to the target throughput.

37. The system of claim 36 wherein the content distribution system is programmed to communicate the target throughput to a network controller and wherein the content distribution system is programmed to broadcast the identified content based on the target throughput.

38. The system of claim 35 wherein the performance target comprises the maximized population coverage across the plurality of devices in the service area.

39. The system of claim 35 wherein the performance target comprises the maximized population coverage across the plurality of devices with the priority for the identified content above a priority threshold.

40. The system of claim 35 wherein the priority for the identified content is based on at least one of a wishlist or a content device indicator.

41. The system of claim 35 wherein the priority is based on at least one of content popularity, a likelihood of content consumption, content popularity profiles, viewing patterns of the plurality of devices in the service area and similarities to other viewers.

42. The system of claim 35 wherein the available network capacity comprises dormant capacity and wherein the content distribution system is programmed to broadcast the identified content using the dormant capacity of the network.

43. The system of claim 35 wherein the available network capacity comprises dormant capacity available for broadcasting and wherein the content distribution system is programmed to broadcast the identified content using the dormant capacity of the network.

44. The system of claim 35 wherein the content distribution system is programmed to determine the spectral efficiency by determining a modulation scheme and a coding scheme for the broadcast.

45. The system of claim 43 wherein the plurality of devices communicates performance feedback data from the plurality of devices to the content distribution system and wherein the content distribution system is programmed to broadcast the identified content using an alternate spectral efficiency for the broadcast based on the performance feedback data;
wherein the content distribution system is programmed to increase the spectral efficiency to a second spectral efficiency greater than the spectral efficiency when the performance feedback data is above a performance threshold;
wherein the content distribution system is programmed to decrease the spectral efficiency to a third spectral efficiency less than the spectral efficiency when the performance feedback data is less than the performance threshold; and
wherein the content distribution system is programmed to broadcast a second content to the plurality of devices in the service area using the second spectral efficiency or the third spectral efficiency.

46. The system of claim 35 wherein the content distribution system is programmed to determine the available network capacity based on a quality of service by determining a total capacity of the network and subtracting a high quality of service network allocation, and wherein the content distribution system is programmed to allocate a lower quality of service network allocation to broadcasting to at least a portion of the available network capacity.

47. The system of claim 35 wherein the content distribution system is programmed to form the broadcast group from a plurality of intermediate devices, a first intermediate device of the plurality of intermediate devices associated with a first user device communicating content therethrough for real-time consumption and a second intermediate device of the plurality of intermediate devices storing the identified content and communicating the identified content to a second user device for non-real-time consumption at a future time after the identified content is stored in second intermediate device.

48. The system of claim 35 wherein the broadcast group comprises a plurality of user devices.

49. The system of claim 35 wherein the radio conditions at least one of a signal-to-noise ratio, a signal-interference-and-noise ratio and a channel quality indicator.

50. The system of claim 35 wherein the content distribution system is programmed to broadcast the identified content by establishing a plurality of broadcast sessions for portions of the identified content and broadcasting the identified content using the broadcast sessions.

51. The system of claim 50 wherein the content distribution system is programmed to broadcast the identified content using the broadcast sessions ensuring that at least portions of the identified content may be received successfully rather than an entire content not being received.

52. The system of claim 51 wherein the content distribution system is programmed to determine a target throughput based on the spectral efficiency, communicate the target throughput to a network controller and broadcast the identified content comprises by communicating the identified content using broadcast sessions based on the target throughput.

53. The system of claim 52 wherein the content distribution system is programmed to establish the plurality of broadcast sessions by establishing at least one broadcast session based on the available network capacity.

54. The system of claim 53 wherein the content distribution system is programmed to determine a first session of the plurality of broadcast sessions is missing at a first device of a plurality of devices and transmit the first session to the first device.

55. The system of claim 35 wherein the content distribution system is programmed to broadcast the identified content by dividing the identified content into a plurality of chunks and broadcasting the chunks to the plurality of devices.

56. The system of claim 55 wherein the content distribution system is programmed to determine a missing chunk at a device of the plurality of devices and request the missing chunk using a chunk identifier.

57. The system of claim 56 wherein the content distribution system is programmed to unicast the missing chunk to the device.

58. The system of claim 55 wherein the content distribution system is programmed to determine a missing chunk in at least some of the plurality of the devices and request the missing chunk using a chunk identifier.

59. The system of claim 58 wherein the content distribution system is programmed to broadcast the missing chunk to the at least some of the devices.

60. The system of claim 59 wherein the content distribution system is programmed to request the missing chunk using an over-the-top protocol between devices and a content distribution system.

61. The system of claim 35 wherein the content distribution system is programmed to broadcast the identified content comprises broadcasting a livestream for real-time consumption.

62. The system of claim 35 wherein the content distribution system is programmed to broadcast the identified content by a livestream and wherein a portion of the plurality of devices Is consumed by some user devices and storing the livestream for non-real-time consumption by other devices at a future time.

63. The system of claim 35 wherein the content distribution system is programmed to broadcast the identified content.

64. The system of claim 35 wherein
for each cell of a plurality of cells of the service area of a first network,
wherein the content distribution system is programmed to receive a capacity usage report from the cell;
determine an available cell capacity of the cell based on the capacity usage report; and
determine a target available capacity utilization goal of the cell based on the available cell capacity;
wherein the content distribution system is programmed to determine an overall target available capacity utilization goal of the plurality of cells in the service area of the first network, based on the target available capacity utilization goal of each cell of the plurality of cells of the service area;
wherein the content distribution system is programmed to determine a target throughput for communicating the identified content based on the spectral efficiency and the overall target available capacity utilization goal of the plurality of cells; and
wherein the content distribution system is programmed to broadcast the identified content to the plurality of devices in the service area based on the target throughput.

65. The system of claim 64 wherein the overall target available capacity utilization goal is an average target available capacity determined across all cells in the service area or a minimum target available capacity determined across all cells in the service area.

66. The system of claim 64 wherein the content distribution system is programmed to establish a plurality of broadcast sessions for portions of the identified content and broadcast the identified content using the broadcast sessions.

67. The system of claim 66 wherein the content distribution system is programmed to determine performance feedback data by determining at least one of a percentage of devices receiving the identified content and percentage of a target throughput achieved across the plurality of cells of the service area during the broadcast.

68. The system of claim 67 further comprising
wherein the content distribution system is programmed to change the overall target available capacity utilization goal to a second overall target available capacity utilization goal different from the overall target available capacity utilization goal based on the performance feedback data, to match an achieved capacity utilization across the plurality of cells of the service area during the broadcast; and
broadcast a second content to the plurality of devices in the service area using the second overall target available capacity utilization goal.

69. The system of claim 68 wherein the content distribution system is programmed to broadcast the identified content using an alternate number of broadcast sessions to achieve the second overall target available capacity utilization goal.

* * * * *